(12) United States Patent
Aimatsu et al.

(10) Patent No.: US 10,830,935 B2
(45) Date of Patent: *Nov. 10, 2020

(54) PHASE DIFFERENCE PLATE, CIRCULARLY POLARIZING PLATE, AND IMAGE DISPLAY DEVICE

(71) Applicant: ZEON CORPORATION, Tokyo (JP)

(72) Inventors: Masashi Aimatsu, Tokyo (JP); Hitoshi Ooishi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 333 days.

This patent is subject to a terminal disclaimer.

(21) Appl. No.: 15/977,837

(22) Filed: May 11, 2018

(65) Prior Publication Data

US 2018/0259699 A1    Sep. 13, 2018

Related U.S. Application Data

(62) Division of application No. 14/437,399, filed as application No. PCT/JP2013/078487 on Oct. 21, 2013, now Pat. No. 9,995,865.

(30) Foreign Application Priority Data

Oct. 22, 2012 (JP) ................ 2012-233076

(51) Int. Cl.
| | |
|---|---|
| G02F 1/1333 | (2006.01) |
| G02B 5/30 | (2006.01) |
| C08F 28/06 | (2006.01) |
| C09K 19/38 | (2006.01) |
| G02B 1/04 | (2006.01) |
| G02F 1/13363 | (2006.01) |

(52) U.S. Cl.
CPC ............ *G02B 5/3083* (2013.01); *C08F 28/06* (2013.01); *C09K 19/3838* (2013.01); *G02B 1/04* (2013.01); *G02F 1/13363* (2013.01); *G02F 2001/133633* (2013.01); *G02F 2001/133637* (2013.01)

(58) Field of Classification Search
CPC ......... G02B 5/3083; G02B 1/04; C08F 28/06; C09K 19/3838; G02F 1/1333; G02F 1/13363; G02F 2001/133633; G02F 2001/133637
USPC .................................................. 252/299.01
See application file for complete search history.

(56) References Cited

U.S. PATENT DOCUMENTS

| | | | |
|---|---|---|---|
| 6,400,433 | B1 | 6/2002 | Arakawa et al. |
| 6,565,974 | B1 | 5/2003 | Uchiyama et al. |
| 8,257,611 | B2 | 9/2012 | Uehira et al. |
| 9,690,022 | B2 | 6/2017 | Aimatsu |
| 2010/0249323 | A1 | 9/2010 | Iida et al. |
| 2013/0100367 | A1 | 4/2013 | Takahashi et al. |
| 2014/0107247 | A1 | 4/2014 | Sakamoto et al. |
| 2014/0142266 | A1 | 5/2014 | Sakamoto et al. |
| 2015/0285979 | A1 | 10/2015 | Aimatsu |
| 2018/0259699 | A1* | 9/2018 | Aimatsu .................. G02B 1/04 |

FOREIGN PATENT DOCUMENTS

| | | |
|---|---|---|
| EP | 1045261 A1 | 10/2000 |
| EP | 2703385 A1 | 3/2014 |
| JP | 10-68816 A | 3/1998 |
| JP | 10-90521 A | 4/1998 |
| JP | 11-52131 A | 2/1999 |
| JP | 2000-284126 A | 10/2000 |
| JP | 2001-004837 A | 1/2001 |
| JP | 2005-208415 A | 8/2005 |
| JP | 2010-070505 A | 4/2010 |
| JP | 2010-084032 A | 4/2010 |
| JP | 2010-230743 A | 10/2010 |
| JP | 2011-207765 A | 10/2011 |
| JP | 2012-008170 A | 1/2012 |
| WO | 00/026705 A1 | 5/2000 |
| WO | 2012/141245 A1 | 10/2012 |
| WO | 2012/147904 A1 | 11/2012 |
| WO | 2015/025793 A1 | 2/2015 |

OTHER PUBLICATIONS

Nov. 19, 2013 Written Opinion of the International Search Authority issued in Interntional Patent Application No. PCT/JP2013/078487.
May 25, 2016 Extended Search Report issued in European Patent Application No. 13848764.0.

* cited by examiner

*Primary Examiner* — Geraldina Visconti
(74) *Attorney, Agent, or Firm* — Oliff PLC

(57) ABSTRACT

A phase difference plate including an optically anisotropic layer obtained by curing a composition (A) containing a polymerizable liquid crystal compound with reverse wavelength dispersion and a polymerizable monomer, wherein the polymerizable liquid crystal compound with reverse wavelength dispersion has a main chain mesogen and a side chain mesogen bonded to the main chain mesogen in the molecule thereof; the main chain mesogen and the side chain mesogen are oriented in different directions, whereby a birefringence Δn of the optically anisotropic layer has reverse wavelength dispersion property; and retardations of a layer obtained by curing a composition (A0) in which the polymerizable monomer in the composition (A) is replaced by the polymerizable liquid crystal compound with reverse wavelength dispersion and retardations of the optically anisotropic layer satisfy specific relationship; and a circularly polarizing plate and a display device including the same.

10 Claims, 9 Drawing Sheets

PHASE DIFFERENCE PLATE, CIRCULARLY POLARIZING PLATE, AND IMAGE DISPLAY DEVICE

This is a Division of application Ser. No. 14/437,399 filed Apr. 21, 2015, which in turn is a National Stage Entry of PCT/JP2013/078487 filed on Oct. 21, 2013, which claims the benefit of Japanese Patent Application No. 2012-233076 filed Oct. 22, 2012. The disclosure of the prior applications is hereby incorporated by reference herein in its entirety.

FIELD

The present invention relates to a phase difference plate, a circularly polarizing plate, and an image display device. In particular, the present invention relates to a phase difference plate, a circularly polarizing plate, and an image display device whose reverse wavelength dispersion property can be easily controlled.

BACKGROUND

A phase difference plate is widely used as a component of a display device such as a liquid crystal display device. It is preferable that a phase difference plate used in a display device expresses a desired phase difference of $\lambda/4$, $\lambda/2$, or the like in the entire wavelength region for displaying (usually visible region). In order to express such a phase difference, it is necessary that the phase difference plate has so-called reverse wavelength dispersion, i.e., wavelength dispersion in which anisotropy for light with a long wavelength is higher than that for light with a short wavelength. As a phase difference plate exhibiting reverse wavelength dispersion property, e.g., those described in Patent Literatures 1 to 6 are known.

CITATION LIST

Patent Literature

Patent Literature 1: Japanese Patent Application Laid-open No. Hei 10-68816 A
Patent Literature 2: Japanese Patent Application Laid-open No. Hei 10-90521 A
Patent Literature 3: Japanese Patent Application Laid-open No. Hei 11-52131 A
Patent Literature 4: Japanese Patent Application Laid-Open No. 2000-284126 A (corresponding foreign publication: U.S. Pat. No. 6,400,433B1)
Patent Literature 5: Japanese Patent Application Laid-Open No. 2001-4837
Patent Literature 6: International publication WO 2000/026705 (corresponding foreign publication: European Pat. Application Publication No. 1045261A1 and U.S. Pat. No. 6,565,974B1)

SUMMARY

Technical Problem

In order to improve performance of a display device, it is necessary to adjust reverse wavelength dispersion of a phase difference plate used in the display device such that the reverse wavelength dispersion is slightly increased or decreased in accordance with the design of the display device. However, in prior art, it is difficult to configure the phase difference plate so as to have desired reverse wavelength dispersion property without impairing optical performance and mechanical performance.

Therefore, an object of the present invention is to provide a phase difference plate that has reverse wavelength dispersion property that can be easily controlled with precision.

Another object of the present invention is to provide a display device that includes the phase difference plate that has reverse wavelength dispersion property that can be easily controlled with precision, is inexpensive, and has good display performance due to the phase difference plate, and a component thereof.

Solution to Problem

The present inventor has studied to solve the problems. As a result, the inventor has found that the problems can be solved when a compound having specific mesogens in the molecule is used as a polymerizable liquid crystal compound with reverse wavelength dispersion and the compound is oriented in combination with a polymerizable monomer to form an optically anisotropic layer having a certain optical property. Thus, the present invention has been accomplished.

Accordingly, the present invention provides as follows.

(1) A phase difference plate comprising an optically anisotropic layer obtained by curing a composition (A) containing a polymerizable liquid crystal compound with reverse wavelength dispersion and a polymerizable monomer, wherein:

the polymerizable liquid crystal compound with reverse wavelength dispersion has a main chain mesogen and a side chain mesogen bonded to the main chain mesogen in the molecule thereof;

the main chain mesogen and the side chain mesogen of the polymerizable liquid crystal compound with reverse wavelength dispersion are oriented in different directions in the optically anisotropic layer, whereby a birefringence $\Delta n$ of the optically anisotropic layer has reverse wavelength dispersion property; and retardations Re0 (450 nm), Re0 (550 nm), and Re0 (650 nm) at wavelengths of 450 nm, 550 nm, and 650 nm of a layer obtained by curing a composition (A0) in which the polymerizable monomer in the composition (A) is replaced by the polymerizable liquid crystal compound with reverse wavelength dispersion and retardations Re (450 nm), Re (550 nm), and Re (650 nm) at wavelengths of 450 nm, 550 nm, and 650 nm of the optically anisotropic layer satisfy relationship of the following expressions (i) and (ii):

$$Re0(450\ nm)/Re0(550\ nm) > Re(450\ nm)/Re(550\ nm) \quad \text{Expression (i)}$$

$$Re0(650\ nm)/Re0(550\ nm) < Re(650\ nm)/Re(550\ nm) \quad \text{Expression (ii).}$$

(2) A phase difference plate comprising an optically anisotropic layer obtained by curing a composition (A) containing a polymerizable liquid crystal compound with reverse wavelength dispersion and a polymerizable monomer, wherein:

the polymerizable liquid crystal compound with reverse wavelength dispersion has a main chain mesogen and a side chain mesogen bonded to the main chain mesogen in the molecule thereof;

the main chain mesogen and the side chain mesogen of the polymerizable liquid crystal compound with reverse wavelength dispersion are oriented in different directions in the optically anisotropic layer, whereby a birefringence $\Delta n$ of the optically anisotropic layer has reverse wavelength dispersion property; and retardations Re0 (450 nm), Re0 (550 nm), and Re0 (650 nm) at wavelengths of 450 nm, 550 nm, and 650 nm of a layer obtained by curing a composition (A0) in which the polymerizable monomer in the composition (A) was replaced by the polymerizable liquid crystal compound with reverse wavelength dispersion and retardations Re (450 nm), Re (550 nm), and Re (650 nm) at wavelengths of 450 nm, 550 nm, and 650 nm of the optically anisotropic layer satisfy relationship of the following expressions (iii) and (iv):

Re0(450 nm)/Re0(550 nm)<Re(450 nm)/Re(550 nm)　　　Expression (iii)

Re0(650 nm)/Re0(550 nm)>Re(650 nm)/Re(550 nm)　　　Expression (iv).

(3) The phase difference plate according to (1) or (2), wherein the polymerizable liquid crystal compound with reverse wavelength dispersion is a compound represented by the following formula (I):

[Chemical Formula 1]

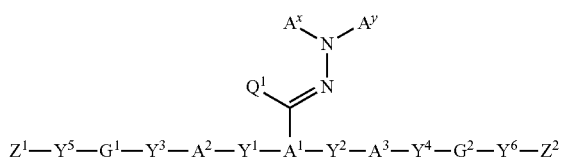

[in the formula, $Y^1$ to $Y^6$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group having 1 to 6 carbon atoms;

$G^1$ and $G^2$ are each independently a divalent aliphatic group having 1 to 20 carbon atoms and optionally having a substituent [the aliphatic group may have one or more of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted thereinto per one aliphatic group, provided that a case where two or more —O— groups or —S— groups are adjacently inserted is excluded, wherein R$^2$ is a hydrogen atom or an alkyl group having 1 to 6 carbon atoms];

$Z^1$ and $Z^2$ are each independently an alkenyl group having 2 to 10 carbon atoms that may be substituted by a halogen atom;

$A^x$ is an organic group of 2 to 30 carbon atoms having at least one aromatic ring selected from the group consisting of an aromatic hydrocarbon ring and an aromatic heterocyclic ring; $A^y$ is a hydrogen atom, an alkyl group having 1 to 12 carbon atoms and optionally having a substituent, an alkenyl group having 2 to 12 carbon atoms and optionally having a substituent, a cycloalkyl group having 3 to 12 carbon atoms and optionally having a substituent, —C(=O)—R$^3$, —SO$_2$—R$^6$, or an organic group of 2 to 30 carbon atoms having at least one aromatic ring selected from the group consisting of an aromatic hydrocarbon ring and an aromatic heterocyclic ring, wherein the aromatic ring of $A^x$ and $A^y$ may have a substituent, and $A^x$ and $A^y$ may together form a ring, and wherein R$^3$ is an alkyl group having 1 to 12 carbon atoms and optionally having a substituent, an alkenyl group having 2 to 12 carbon atoms and optionally having a substituent, and a cycloalkyl group having 3 to 12 carbon atoms and optionally having a substituent, and R$^6$ is an alkyl group having 1 to 12 carbon atoms, an alkenyl group having 2 to 12 carbon atoms, a phenyl group, or a 4-methylphenyl group;

$A^1$ is a trivalent aromatic group optionally having a substituent;

$A^2$ and $A^3$ are each independently a divalent aromatic group having 6 to 30 carbon atoms and optionally having a substituent; and $Q^1$ is a hydrogen atom or an alkyl group having 1 to 6 carbon atoms and optionally having a substituent].

(4) The phase difference plate according to (1) or (2), wherein the polymerizable liquid crystal compound with reverse wavelength dispersion is a compound represented by the following formula (V):

[Chemical Formula 2]

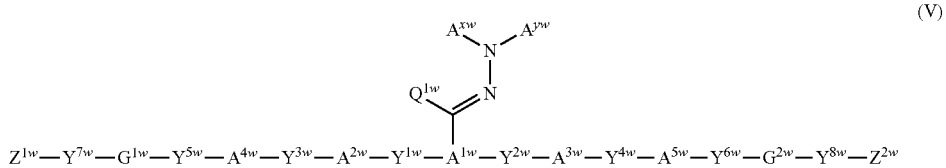

[in the formula $Y^{1w}$ to $Y^{8w}$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group having 1 to 6 carbon atoms;

$G^{1w}$ and $G^{2w}$ are each independently a divalent linear aliphatic group having 1 to 20 carbon atoms and optionally having a substituent, wherein the linear aliphatic group may have one or more of —O—, —S—, —O—C(=O)—, —C(=O)—O—, —O—C(=O)—O—, —NR$^{2w}$—C(=O)—, —C(=O)—NR$^{2w}$—, —NR$^{2w}$—, or —C(=O)— inserted thereinto per one aliphatic group, provided that a case where two or more —O— groups or —S— groups are adjacently inserted is excluded, and wherein R$^{2w}$ is a hydrogen atom or an alkyl group having 1 to 6 carbon atoms;

$Z^{1w}$ and $Z^{2w}$ are each independently an alkenyl group having 2 to 10 carbon atoms that may be substituted by a halogen atom;

$A^{xw}$ is an organic group of 2 to 30 carbon atoms having at least one aromatic ring selected from the group consisting of an aromatic hydrocarbon ring and an aromatic heterocyclic ring;

$A^{yw}$ is a hydrogen atom, an alkyl group having 1 to 20 carbon atoms and optionally having a substituent, an alkenyl group having 2 to 20 carbon atoms and optionally having a substituent, an alkynyl group having 2 to 20 carbon atoms and optionally having a substituent, a cycloalkyl group having 3 to 12 carbon atoms and optionally having a substituent, —C(=O)—$R^{3w}$, —$SO_2$—$R^{4w}$, —C(=S)NH—$R^{9w}$, or an organic group of 2 to 30 carbon atoms having at least one aromatic ring selected from the group consisting of an aromatic hydrocarbon ring and an aromatic heterocyclic ring, wherein $R^{3w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic hydrocarbon group having 5 to 12 carbon atoms, $R^{4w}$ is an alkyl group having 1 to 20 carbon atoms, an alkenyl group having 2 to 20 carbon atoms, a phenyl group, or a 4-methylphenyl group, and $R^{9w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic group having 5 to 20 carbon atoms and optionally having a substituent, wherein the aromatic ring of $A^{xw}$ and $A^{yw}$ may have a substituent, and $A^{xw}$ and $A^{yw}$ may together form a ring;

$A^{1w}$ is a trivalent aromatic group optionally having a substituent;

$A^{2w}$ and $A^{3w}$ are each independently a divalent alicyclic hydrocarbon group having 3 to 30 carbon atoms and optionally having a substituent;

$A^{4w}$ and $A^{5w}$ are each independently a divalent aromatic group having 6 to 30 carbon atoms and optionally having a substituent; and $Q^{1w}$ is a hydrogen atom or an alkyl group having 1 to 6 carbon atoms and optionally having a substituent].

(4.1) The aforementioned phase difference plate, wherein the total number of π electrons included in the aforementioned $A^{xw}$ and $A^{yw}$ is 4 or more and 24 or less.

(4.2) The aforementioned phase difference plate, wherein the aforementioned $A^{1w}$ is a trivalent benzene ring group or a trivalent naphthalene ring group that may have a substituent.

(4.3) The aforementioned phase difference plate, wherein the aforementioned $Y^{1w}$ to $Y^{8w}$ are each independently a chemical single bond, —O—, —O—C(=O)—, —C(=O)—O—, or —O—C(=O)—O—.

(4.4) The aforementioned phase difference plate, wherein the aforementioned $Z^{1w}$ and $Z^{2w}$ are each independently $CH_2$=CH—, $CH_2$=C($CH_3$)—, or $CH_2$=C(Cl)—.

(4.5) The aforementioned phase difference plate, wherein the aforementioned $G^{1w}$ and $G^{2w}$ are each independently a divalent aliphatic group having 1 to 20 carbon atoms and optionally having a substituent (the aliphatic group may have one or more of —O—, —O—C(=O)—, —C(=O)—O—, or —C(=O)— inserted thereinto per one aliphatic group, provided that a case where two or more —O— groups are adjacently inserted is excluded).

(4.6) The aforementioned phase difference plate, wherein the aforementioned $G^{1w}$ and $G^{2w}$ are each independently an alkylene group having 1 to 12 carbon atoms.

(5) The phase difference plate according to (3), wherein the polymerizable monomer is a non-liquid crystal compound represented by the following formula (III):

[Chemical Formula 3]

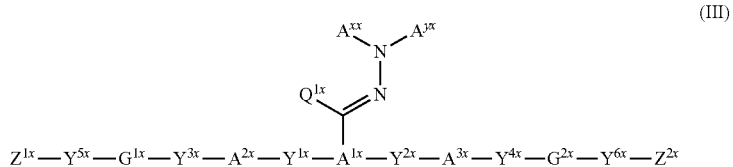

$$Z^{1x}-Y^{5x}-G^{1x}-Y^{3x}-A^{2x}-Y^{1x}-A^{1x}-Y^{2x}-A^{3x}-Y^{4x}-G^{2x}-Y^{6x}-Z^{2x}$$

(in the formula (III), $Y^{1x}$ to $Y^{6x}$, $G^{1x}$, $G^{2x}$, $Z^{1x}$, $Z^{2x}$, $A^{xx}$, $A^{yx}$, $A^{1X}$ to $A^{3x}$, and $Q^{1x}$ have the same meanings as $Y^1$ to $Y^6$, $G^1$, $G^2$, $Z^1$, $Z^2$, $A^x$, $A^y$, $A^1$ to $A^3$, and $Q^1$, respectively, in the formula (I), and at least one of them is different from the corresponding group in the co-used compound (I)).

(6) The phase difference plate according to any one of (1) to (5), wherein the polymerizable monomer has a mesogen, and the mesogen of the polymerizable monomer is oriented in parallel to a main chain mesogen of the polymerizable liquid crystal compound with reverse wavelength dispersion in the optically anisotropic layer.

(7) The phase difference plate according to any one of (1) to (5), wherein the polymerizable monomer has a mesogen, and the mesogen of the polymerizable monomer is oriented in parallel to a side chain mesogen of the polymerizable liquid crystal compound with reverse wavelength dispersion in the optically anisotropic layer.

(8) The phase difference plate according to any one of (1) to (7), wherein a ratio of the polymerizable monomer in the composition (A) is 1 to 100 parts by weight relative to 100 parts by weight of the polymerizable liquid crystal compound with reverse wavelength dispersion.

(9) A circularly polarizing plate comprising the phase difference plate according to any one of (1) to (8) and a linear polarizer.

(10) The circularly polarizing plate according to (9), wherein a phase difference of the phase difference plate at a wavelength of 550 nm is 100 to 150 nm, and an angle between a slow axis of the phase difference plate and a transmission axis of the linear polarizer is 45°.

(11) An image display device comprising the phase difference plate according to any one of (1) to (8).

Advantageous Effects of Invention

The phase difference plate of the present invention has reverse wavelength dispersion property that can be easily controlled with precision. Therefore, the circularly polarizing plate of the present invention and the image display device of the present invention that include the phase difference plate of the present invention can provide a display device that is inexpensive and has favorable display performance and components thereof.

DESCRIPTION OF EMBODIMENTS

Figure 1:
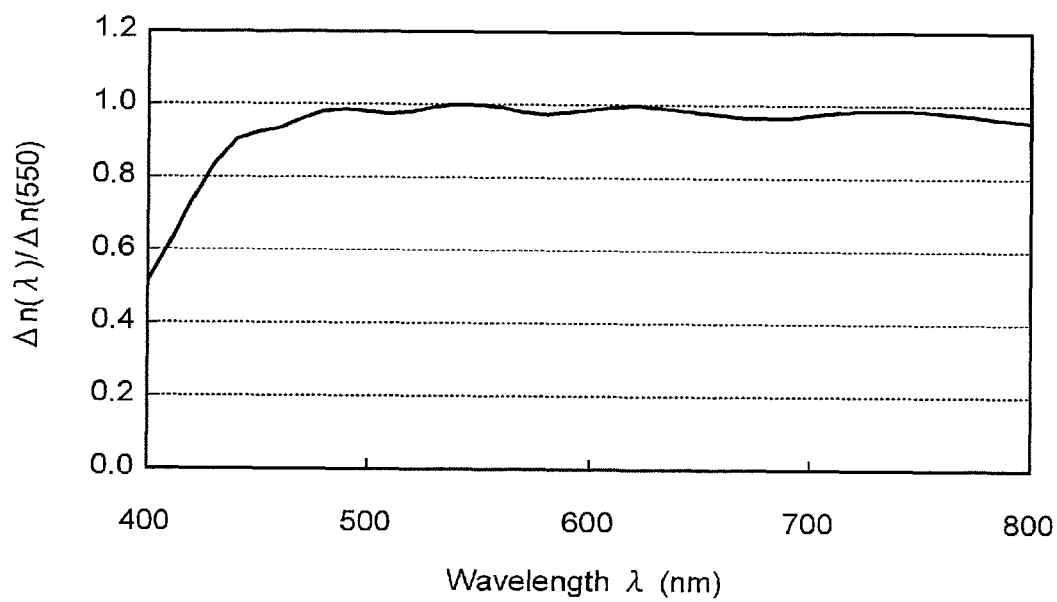
FIG. 1 is a graph showing wavelength dispersion property of birefringence Δn of a phase difference plate, which is measured in Comparative Example 1.

The present invention will be described hereinbelow in detail with reference to illustrations and embodiments, but the present invention is not limited to the following illustrations and embodiments and may be implemented with any optional modifications without departing from the scope of the claims of the present invention and equivalents thereof.

Unless otherwise specified, "retardation" of an optically anisotropic layer in a phase difference plate herein means a retardation Re in an in-plane direction. Retardation and birefringence Δn have a relationship of Re=Δn×d (wherein d is the thickness of the optically anisotropic layer).

[1. Phase Difference Plate]

The phase difference plate of the present invention has an optically anisotropic layer. The optically anisotropic layer is a layer obtained by curing a composition (A) containing a polymerizable liquid crystal compound with reverse wavelength dispersion and a polymerizable monomer.

[1.1. Polymerizable Liquid Crystal Compound with Reverse Wavelength Dispersion]

In this application, a liquid crystal compound as a component of the composition (A) is a compound that is capable of exhibiting a liquid crystal phase when the compound is mixed in the composition (A) and oriented. A polymerizable liquid crystal compound is a liquid crystal compound polymerization of which in a state of the liquid crystal phase in the composition (A) can be performed, whereby the compound can form a polymer in which the orientation of molecules in the liquid crystal phase is maintained. Further, a polymerizable liquid crystal compound with reverse wavelength dispersion is a polymerizable liquid crystal compound the resulting polymer of which when polymerized in such a manner shows reverse wavelength dispersion.

In this application, compounds having polymerizability (polymerizable liquid crystal compound, other compounds having polymerizability, etc.) as the component of the composition (A) are sometimes collectively referred to as "polymerizable compound".

In the present invention, the polymerizable liquid crystal compound with reverse wavelength dispersion has a main chain mesogen and a side chain mesogen bonded to the main chain mesogen in the molecule thereof. In a state where the polymerizable liquid crystal compound with reverse wavelength dispersion is oriented, the side chain mesogen may be oriented in a direction different from that of the main chain mesogen. Therefore, the main chain mesogen and the side chain mesogen may be oriented in different directions in the optically anisotropic layer. As a result of this orientation, the birefringence Δn of the optically anisotropic layer exhibits reverse wavelength dispersion property.

[1.2. Compound (I)]

Examples of the polymerizable liquid crystal compound with reverse wavelength dispersion may include a compound represented by the following formula (I) (this may be referred to hereinbelow as "compound (I)").

[Chemical Formula 4]

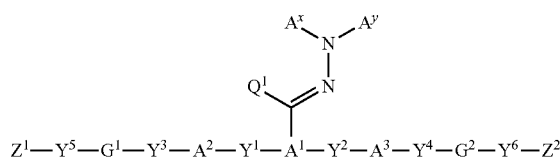

When the polymerizable liquid crystal compound with reverse wavelength dispersion is the compound (I), a —Y³-

$A^2$-$Y^1$-$A^1$-$Y^2$-$A^3$-$Y^4$— group is the main chain mesogen, and a >$A^1$-C($Q^1$)=N—N($A^x$)$A^y$ group is the side chain mesogen. The $A^1$ group affects nature of both the main chain mesogen and the side chain mesogen.

In the formula, $Y^1$ to $Y^6$ are each independently a chemical single bond, —O—, —S—, —O—C(=O)—, —C(=O)—O—, —O—C(=O)—O—, —$NR^1$—C(=O)—, —C(=O)—$NR^1$—, —O—C(=O)—$NR^1$—, —$NR^1$—C(=O)—O—, —$NR^1$—C(=O)—$NR^1$—, —O—$NR^1$—, or —$NR^1$—O—.

Herein, $R^1$ is a hydrogen atom or an alkyl group having 1 to 6 carbon atoms.

Examples of the alkyl group having 1 to 6 carbon atoms of $R^1$ may include a methyl group, an ethyl group, a n-propyl group, an isopropyl group, a n-butyl group, a sec-butyl group, a tert-butyl group, a n-pentyl group, and a n-hexyl group.

Herein, $R^1$ is preferably a hydrogen atom or an alkyl group having 1 to 4 carbon atoms.

Among these, it is preferable that $Y^1$ to $Y^6$ are each independently a chemical single bond, —O—, —O—C(=O)—, —C(=O)—O—, or —O—C(=O)—O—.

$G^1$ and $G^2$ are each independently a divalent aliphatic group having 1 to 20 carbon atoms and optionally having a substituent.

Examples of the divalent aliphatic group having 1 to 20 carbon atoms may include an aliphatic group having a linear structure; and an aliphatic group having an alicyclic structure such as a saturated cyclic hydrocarbon (cycloalkane) structure and an unsaturated cyclic hydrocarbon (cycloalkene) structure.

Examples of the substituent may include a halogen atom such as a fluorine atom, a chlorine atom, a bromine atom, and an iodine atom; and an alkoxy group having 1 to 6 carbon atoms such as a methoxy group, an ethoxy group, a n-propoxy group, an isopropoxy group, a n-butoxy group, a sec-butoxy group, a tert-butoxy group, a n-pentyloxy group, and a n-hexyloxy group. A fluorine atom, a methoxy group, and an ethoxy group are preferable.

The aliphatic group may have one or more of —O—, —S—, —O—C(=O)—, —C(=O)—O—, —O—C(=O)—O—, —$NR^2$—C(=O)—, —C(=O)—$NR^2$—, —$NR^2$—, or —C(=O)— inserted thereinto per one aliphatic group (provided that a case where two or more —O— groups or —S— groups are adjacently inserted is excluded).

Among these, —O—, —O—C(=O)—, —C(=O)—O—, and —O—C(=O)—O— are preferable.

Herein, $R^2$ is a hydrogen atom or an alkyl group having 1 to 6 carbon atoms, like the aforementioned $R^1$. A hydrogen atom and a methyl group are preferable.

Specific examples of the aliphatic group having these groups inserted thereinto may include —$CH_2$—$CH_2$—O—$CH_2$—$CH_2$—, —$CH_2$—$CH_2$—S—$CH_2$—$CH_2$—, —$CH_2$—$CH_2$—O—C(=O)—$CH_2$—$CH_2$—, —$CH_2$—$CH_2$—C(=O)—O—$CH_2$—$CH_2$—, —$CH_2$—$CH_2$—C(=O)—O—$CH_2$—, —$CH_2$—O—C(=O)—O—$CH_2$—$CH_2$—, —$CH_2$—$CH_2$—$NR^2$—C(=O)—$CH_2$—$CH_2$—, —$CH_2$—$CH_2$—C(=O)—$NR^2$—$CH_2$—, —$CH_2$—$NR^2$—$CH_2$—$CH_2$—, and —$CH_2$—C(=O)—$CH_2$—.

Among these, from the viewpoint of favorably expressing the desired effect of the present invention, it is preferable that $G^1$ and $G^2$ are each independently an aliphatic group having a linear structure such as an alkylene group having 1 to 20 carbon atoms and an alkenylene group having 2 to 20 carbon atoms. They each are more preferably an alkylene group having 1 to 12 carbon atoms such as a methylene group, an ethylene group, a trimethylene group, a propylene group, a tetramethylene group, a pentamethylene group, a hexamethylene group, and an octamethylene group, and particularly preferably a tetramethylene group [—($CH_2$)$_4$—] and a hexamethylene group [—($CH_2$)$_6$—]

$Z^1$ and $Z^2$ are each independently an alkenyl group having 2 to 10 carbon atoms that may be substituted by a halogen atom.

It is preferable that the number of carbon atoms in the alkenyl group is 2 to 6. Examples of the halogen atom that is a substituent on the alkenyl group of $Z^1$ and $Z^2$ may include a fluorine atom, a chlorine atom, and a bromine atom. A chlorine atom is preferable.

Specific examples of the alkenyl group having 2 to 10 carbon atoms of $Z^1$ and $Z^2$ may include $CH_2$=CH—, $CH_2$=C($CH_3$)—, $CH_2$=CH—$CH_2$—, $CH_3$—CH=CH—, $CH_2$=CH—$CH_2$—$CH_2$—, $CH_2$=C($CH_3$)—$CH_2$—$CH_2$—, ($CH_3$)$_2$C=CH—$CH_2$—, ($CH_3$)$_2$C=CH—$CH_2$—$CH_2$—, $CH_2$=C(Cl)—, $CH_2$=C($CH_3$)—$CH_2$—, and $CH_3$—CH=CH—$CH_2$—.

Among these, from the viewpoint of favorably expressing the desired effect of the present invention, it is preferable that $Z^1$ and $Z^2$ are each independently $CH_2$=CH—, $CH_2$=C($CH_3$)—, $CH_2$=C(Cl)—, $CH_2$=CH—$CH_2$—, $CH_2$=C($CH_3$)—$CH_2$—, or $CH_2$=C($CH_3$)—$CH_2$—$CH_2$—. They each are more preferably $CH_2$=CH—, $CH_2$=C($CH_3$)—, or $CH_2$=C(Cl)—, and further more preferably $CH_2$=CH—.

$A^x$ is an organic group of 2 to 30 carbon atoms having at least one aromatic ring selected from the group consisting of an aromatic hydrocarbon ring and an aromatic heterocyclic ring.

In the present invention, "aromatic ring" means a cyclic structure having aromaticity in the broad sense based on Huckel rule, i.e., a cyclic conjugated structure having (4n+2) π electrons, and a structure that exhibits aromaticity by the involvement of a lone electron pair of heteroatom such as sulfur, oxygen, and nitrogen, typified by thiophene, furan, benzothiazole, and the like, in a π electron system.

The organic group of 2 to 30 carbon atoms having at least one aromatic ring selected from the group consisting of an aromatic hydrocarbon ring and an aromatic heterocyclic ring, of $A^x$, may have a plurality of aromatic rings, and may have an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a condensed aromatic heterocyclic ring such as a benzothiazole ring, a benzoxazole ring, a quinoline ring, a phthalazine ring, a benzimidazole ring, a benzopyrazole ring, a benzofuran ring, and a benzothiophene ring.

The aromatic ring of $A^x$ may have a substituent. Examples of the substituent may include a halogen atom such as a fluorine atom and a chlorine atom; a cyano group; an alkyl group having 1 to 6 carbon atoms such as a methyl group, an ethyl group, and a propyl group; an alkenyl group having 2 to 6 carbon atoms such as a vinyl group and an allyl group; a halogenated alkyl group having 1 to 6 carbon atoms such as a trifluoromethyl group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; —C(=O)—$R^4$;

—C(=O)—OR$^4$; and —SO$_2$R$^4$. Herein, R$^4$ is an alkyl group having 1 to 6 carbon atoms or an aryl group having 6 to 14 carbon atoms.

The aromatic ring of A$^x$ may have a plurality of substituents that are the same or different, and two adjacent substituents may be bonded together to form a ring. The formed ring may be a monocyclic ring or a condensed polycyclic ring.

The "number of carbon atoms" in the organic group having 2 to 30 carbon atoms of A$^x$ means the total number of carbon atoms in the entire organic group, although carbon atoms in the substituents are excluded therefrom (the same applies to A$^y$ which will be described later).

Examples of the organic group of 2 to 30 carbon atoms having at least one aromatic ring selected from the group consisting of an aromatic hydrocarbon ring and an aromatic heterocyclic ring of A$^x$ may include an aromatic hydrocarbon ring group; an aromatic heterocyclic ring group; an alkyl group of 3 to 30 carbon atoms having at least one aromatic ring selected from the group consisting of an aromatic hydrocarbon ring group and an aromatic heterocyclic ring group; an alkenyl group of 4 to 30 carbon atoms having at least one aromatic ring selected from the group consisting of an aromatic hydrocarbon ring group and an aromatic heterocyclic ring group; and an alkynyl group of 4 to 30 carbon atoms having at least one aromatic ring selected from the group consisting of an aromatic hydrocarbon ring group and an aromatic heterocyclic ring group.

A$^y$ is a hydrogen atom, an alkyl group having 1 to 12 carbon atoms and optionally having a substituent, an alkenyl group having 2 to 12 carbon atoms and optionally having a substituent, a cycloalkyl group having 3 to 12 carbon atoms and optionally having a substituent, —C(=O)—R$^3$, —SO$_2$—R$^6$, or an organic group of 2 to 30 carbon atoms having at least one aromatic ring selected from the group consisting of an aromatic hydrocarbon ring and an aromatic heterocyclic ring.

Examples of an alkyl group having 1 to 12 carbon atoms in the alkyl group having 1 to 12 carbon atoms and optionally having a substituent of A$^y$ may include a methyl group, an ethyl group, a n-propyl group, an isopropyl group, a n-butyl group, a sec-butyl group, a tert-butyl group, a n-pentyl group, a n-hexyl group, a n-heptyl group, a n-octyl group, a n-nonyl group, and a n-decyl group.

Examples of a substituent in the alkyl group having 1 to 12 carbon atoms and optionally having a substituent of A$^y$ may include a halogen atom such as a fluorine atom and a chlorine atom; a cyano group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; a cycloalkyl group having 3 to 8 carbon atoms such as a cyclopropyl group, a cyclopentyl group, and a cyclohexyl group; —C(=O)—R$^4$; —C(=O)—OR$^4$; and —SO$_2$R$^4$. Herein, R$^4$ has the same meanings as described above.

Examples of an alkenyl group having 2 to 12 carbon atoms in the alkenyl group having 2 to 12 carbon atoms and optionally having a substituent of A$^y$ may include a vinyl group, a propenyl group, an isopropenyl group, a butenyl group, and a pentenyl group.

Examples of a cycloalkyl group having 3 to 12 carbon atoms in the cycloalkyl group having 3 to 12 carbon atoms and optionally having a substituent of A$^y$ may include a cyclopropyl group, a cyclobutyl group, a cyclopentyl group, a cyclohexyl group, and a cyclooctyl group.

Examples of substituents in the alkenyl group having 2 to 12 carbon atoms and optionally having a substituent and the cycloalkyl group having 3 to 12 carbon atoms and optionally having a substituent of A$^y$ may include a halogen atom such as a fluorine atom and a chlorine atom; a cyano group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; a cycloalkyl group having 3 to 8 carbon atoms such as a cyclopropyl group, a cyclopentyl group, and a cyclohexyl group; —C(=O)—R$^4$; —C(=O)—OR$^4$; and —SO$_2$R$^4$. Herein, R$^4$ has the same meanings as described above.

In the group represented by —C(=O)—R$^3$ of A$^y$, R$^3$ is an alkyl group having 1 to 12 carbon atoms and optionally having a substituent, an alkenyl group having 2 to 12 carbon atoms and optionally having a substituent, or a cycloalkyl group having 3 to 12 carbon atoms and optionally having a substituent. Specific examples thereof may include those exemplified as the examples of the alkyl group having 1 to 12 carbon atoms and optionally having a substituent, the alkenyl group having 2 to 12 carbon atoms and optionally having a substituent, and the cycloalkyl group having 3 to 12 carbon atoms and optionally having a substituent of the aforementioned A$^y$.

In the group represented by —SO$_2$—R$^6$ of A$^y$, R$^6$ is an alkyl group having 1 to 12 carbon atoms, an alkenyl group having 2 to 12 carbon atoms, a phenyl group, or a 4-methylphenyl group.

Specific examples of the alkyl group having 1 to 12 carbon atoms and the alkenyl group having 2 to 12 carbon atoms of R$^6$ may include those exemplified as the examples of the alkyl group having 1 to 12 carbon atoms and the alkenyl group having 2 to 12 carbon atoms of the aforementioned A$^y$.

The aromatic ring of the aforementioned A$^x$ and A$^y$ may have a substituent. The aforementioned A$^x$ and A$^y$ may together form a ring.

Examples of the organic group of 2 to 30 carbon atoms having at least one aromatic ring selected from the group consisting of an aromatic hydrocarbon ring and an aromatic heterocyclic ring of A$^y$ may include those exemplified as the examples regarding the aforementioned A$^x$.

The aromatic ring of A$^y$ may have a substituent on any position. Examples of the substituent may include those exemplified as the examples of the substituent on the aromatic ring of the aforementioned A$^x$.

Specific examples of the aromatic ring of A$^x$ and A$^y$ are as follows. However, in the present invention, the aromatic ring of A$^x$ and A$^y$ is not limited to the following examples. In the following compounds, [-] represents an atomic bond of the aromatic ring (the same applies to the following).

[Chemical Formula 5]

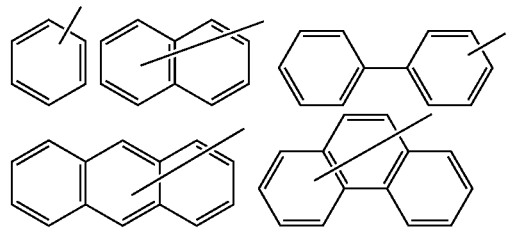

-continued
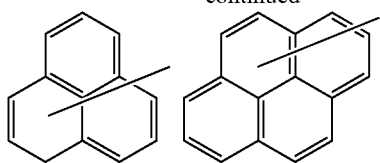
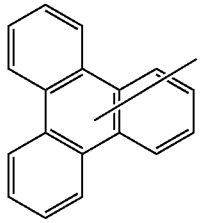
[Chemical Formula 6]
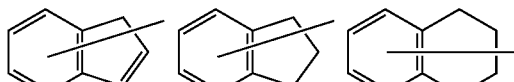
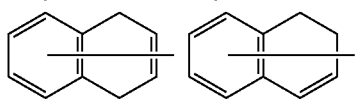
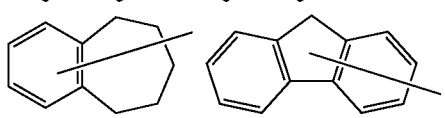
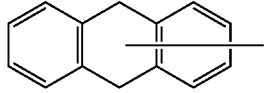
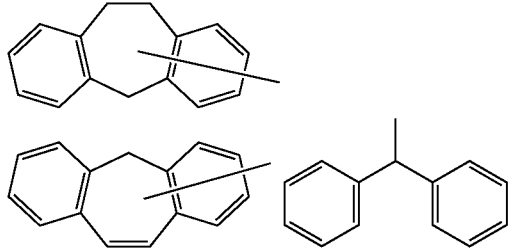
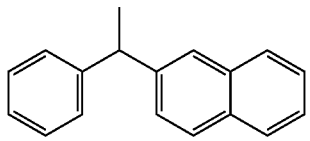
[Chemical Formula 7]
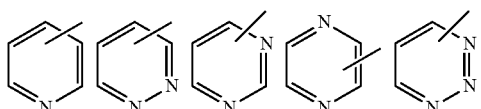
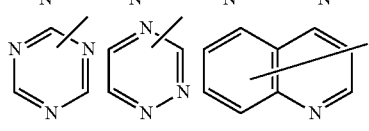
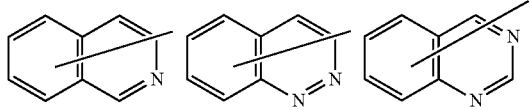
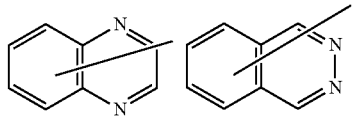
[Chemical Formula 8]
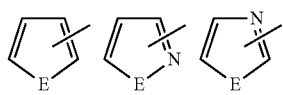
In the formulae, E is $NR^5$, an oxygen atom, or a sulfur atom. Herein, $R^5$ is a hydrogen atom; or an alkyl group having 1 to 6 carbon atoms such as a methyl group and an ethyl group.
[Chemical Formula 9]
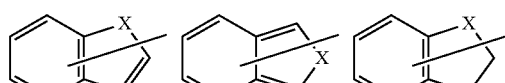
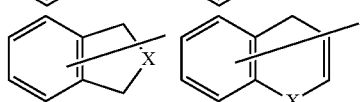
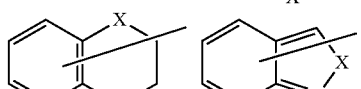
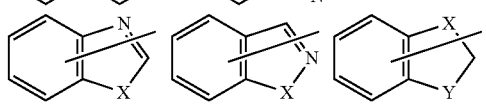
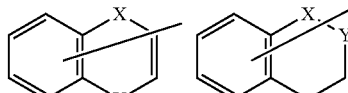
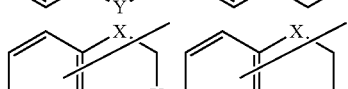
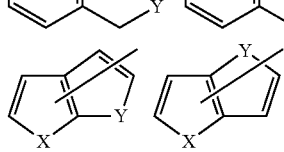
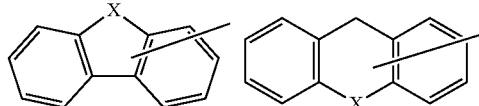
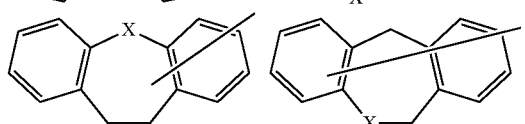
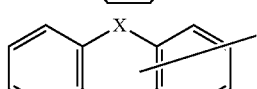
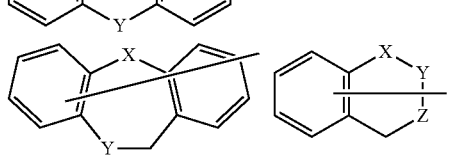

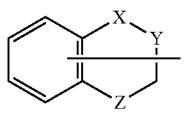

In the formulae, X, Y, and Z are each independently $NR^5$, an oxygen atom, a sulfur atom, —SO—, or —$SO_2$— (provided that a case where oxygen atoms, sulfur atoms, —SO— groups, or —$SO_2$— groups are adjacent is excluded). $R^5$ has the same meanings as described above.

Among the aforementioned aromatic rings, the aromatic ring of $A^x$ and $A^y$ is preferably as follows.

[Chemical Formula 10]

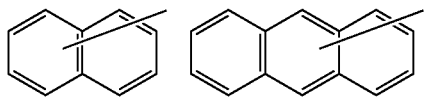

[Chemical Formula 11]

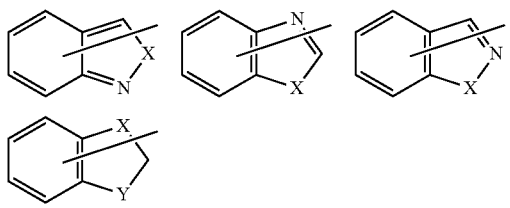

The aromatic ring of $A^x$ and $A^y$ is particularly preferably as follows.

[Chemical Formula 12]

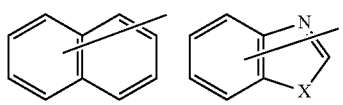

$A^x$ and $A^y$ may together form a ring. In particular, it is preferable that $A^x$ and $A^y$ form an unsaturated heterocyclic ring having 4 to 30 carbon atoms or an unsaturated carbon ring having 6 to 30 carbon atoms, wherein these rings may optionally have a substituent.

The unsaturated heterocyclic ring having 4 to 30 carbon atoms and the unsaturated carbon ring having 6 to 30 carbon atoms are not particularly restricted, and may or may not have aromaticity. Examples thereof may include rings shown in the following. The rings shown in the following are a moiety represented by:

[Chemical Formula 13]

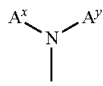

in the formula (I).

[Chemical Formula 14]

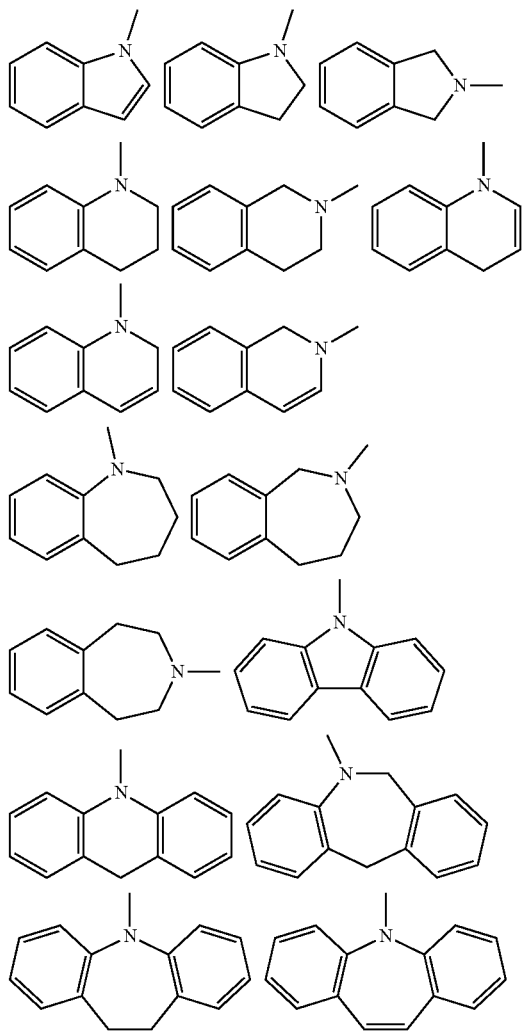

[Chemical Formula 15]

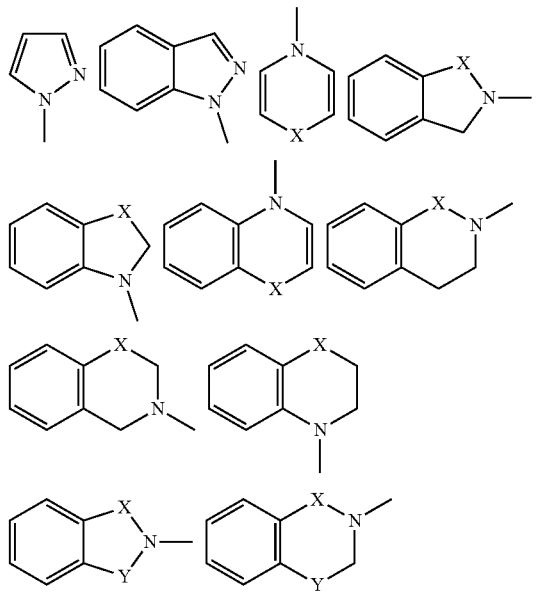

-continued

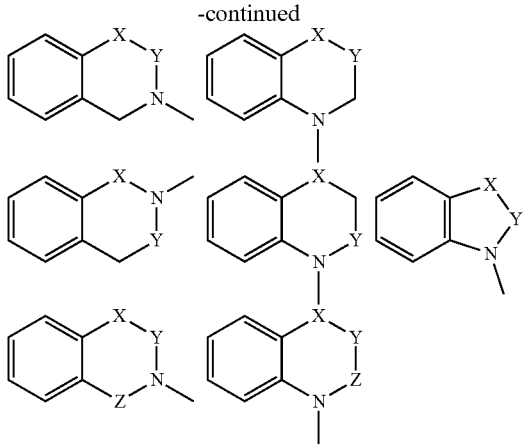

[Chemical Formula 16]

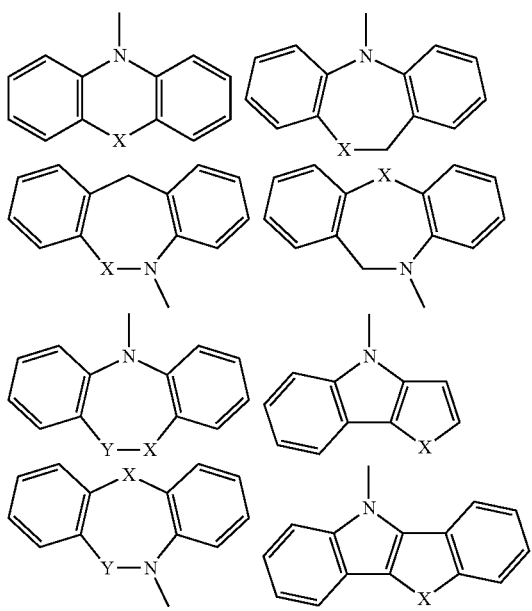

In the formulae, X, Y, and Z have the same meanings as described above.

The rings may have a substituent.

Examples of the substituent may include a halogen atom, a cyano group, an alkyl group having 1 to 6 carbon atoms, an alkoxy group having 1 to 6 carbon atoms, a nitro group, —C(=O)—$R^4$, —C(=O)—$OR^4$, and —$SO_2R^4$. Herein, $R^4$ has the same meanings as described above.

The total number of π electrons included in $A^x$ and $A^y$ is preferably 4 or more and 24 or less, and more preferably 6 or more and 18 or less from the viewpoint of favorably expressing the desired effect of the present invention.

Examples of preferred combination of $A^x$ and $A^y$ may include a combination of an aromatic group having 4 to 30 carbon atoms as $A^x$ and a hydrogen atom or an alkyl group optionally having a substituent as $A^y$, and a combination in which $A^x$ and $A^y$ together form an unsaturated heterocyclic ring or an unsaturated carbon ring. Preferred examples of a substituent in the alkyl group optionally having a substituent may include a cycloalkyl group, a cyano group, and a halogen atom such as a fluorine atom.

The combination is preferably a combination of the following structure as $A^x$ and a hydrogen atom or an alkyl group optionally having a substituent as $A^y$.

[Chemical Formula 17]

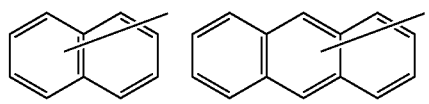

[Chemical Formula 18]

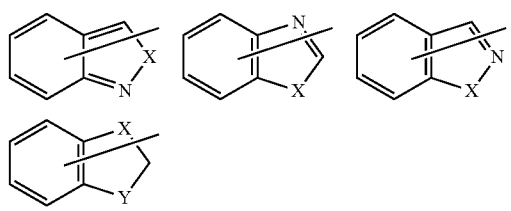

The combination is particularly preferably a combination of the following structure as $A^x$ and a hydrogen atom or an alkyl group optionally having a substituent as $A^y$. In the combination, a preferred substituent in the alkyl group optionally having a substituent is a cycloalkyl group, a cyano group, or a halogen atom such as a fluorine atom. In the formulae, X and Y have the same meanings as described above.

[Chemical Formula 19]

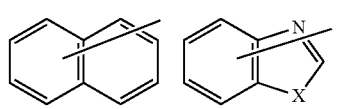

$A^1$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent carbocyclic aromatic group is preferable, and a trivalent benzene ring group and a trivalent naphthalene ring group represented by the following formulae are more preferable. In the following formulae, substituents $Y^1$ and $Y^2$ are shown for the sake of convenience to clearly show a bonding state ($Y^1$ and $Y^2$ have the same meanings as described above, and the same applies to the following).

[Chemical Formula 20]

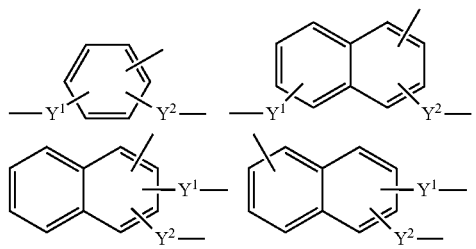

In particular, it is preferable that $A^1$ is a group represented by each of the formulae (A11) to (A22), and more preferably a group represented by the formula (A11).

[Chemical Formula 21]

(A11) 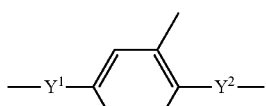

(A12) 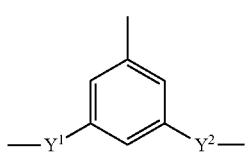

(A13) 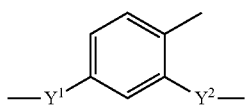

(A14) 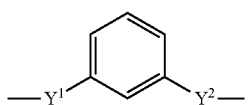

(A15) 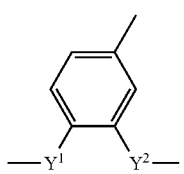

(A16) 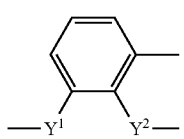

(A17) 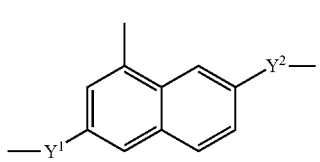

(A18) 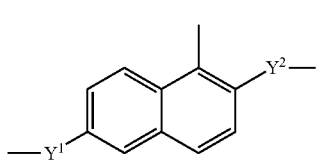

(A19) 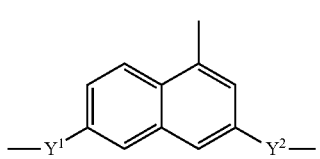

(A20) 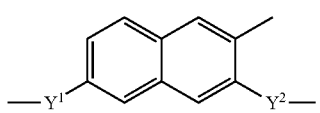

(A21) 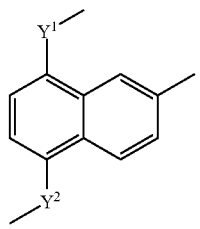

(A22) 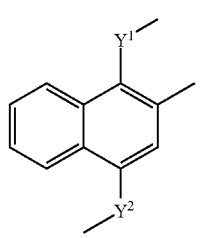

Examples of a substituent that may be included in the trivalent aromatic group of $A^1$ may include those exemplified as the examples of the substituent on the aromatic group of the aforementioned $A^x$. It is preferable that $A^1$ is a trivalent aromatic group having no substituent.

$A^2$ and $A^3$ are each independently a divalent aromatic group having 6 to 30 carbon atoms and optionally having a substituent.

The aromatic group of $A^2$ and $A^3$ may be monocyclic or polycyclic.

Specific examples of $A^2$ and $A^3$ may include the following groups.

[Chemical Formula 22]

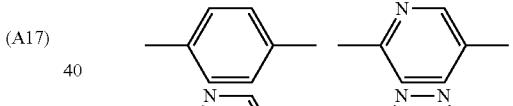

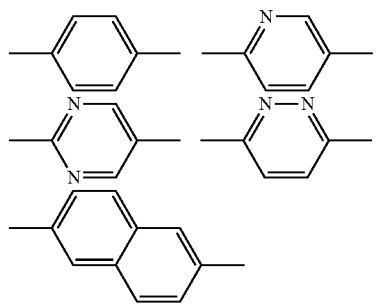

The organic groups enumerated as the specific examples of the aforementioned $A^2$ and $A^3$ may have a substituent on any position. Examples of the substituent may include a halogen atom, a cyano group, a hydroxyl group, an alkyl group having 1 to 6 carbon atoms, an alkoxy group having 1 to 6 carbon atoms, a nitro group, and a —C(=O)—OR group. Herein, R is an alkyl group having 1 to 6 carbon atoms. Among these, a halogen atom, an alkyl group, and alkoxy group are preferable. As the halogen atom, a fluorine atom is more preferable. As the alkyl group, a methyl group, an ethyl group, and a propyl group are more preferable. As the alkoxy group, a methoxy group and an ethoxy group are more preferable.

Among these, it is preferable that $A^2$ and $A^3$ are each independently a group represented by the following formulae (A23) and (A24) that may optionally have a substituent from the viewpoint of favorably expressing the desired effect of the present invention, and the group represented by the formula (A23) and optionally having a substituent is more preferable.

[Chemical Formula 23]

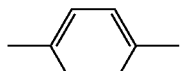
(A23)

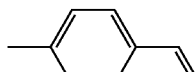
(A24)

$Q^1$ is a hydrogen atom or an alkyl group having 1 to 6 carbon atoms and optionally having a substituent.

Examples of the alkyl group having 1 to 6 carbon atoms and optionally having a substituent may include those exemplified as the examples regarding the aforementioned $A^x$.

Among these, $Q^1$ is preferably a hydrogen atom or an alkyl group having 1 to 6 carbon atoms, and more preferably a hydrogen atom or a methyl group.

Specific examples of the compound (I) may include compounds represented by the following formulae (I)-1 to (I)-3.

All the compound represented by the formula (I) is not limited to a compound that is capable of exhibiting a liquid crystal phase. However, whether or not the compound is capable of exhibiting a liquid crystal phase can be easily determined by, e.g., preparing a composition (A) and actually orienting the composition.

[1.3. Method for Producing Compound (I)]

The compound (I) may be produced by, e.g., the following reaction.

[Chemical Formula 25]

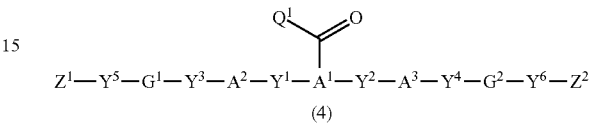

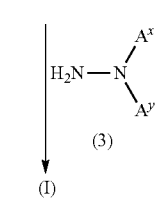

(wherein $Y^1$ to $Y^6$, $G^1$, $G^2$, $Z^1$, $Z^2$, $A^x$, $A^y$, $A^1$ to $A^3$, and $Q^1$ have the same meanings as described above.)

[Chemical Formula 24]

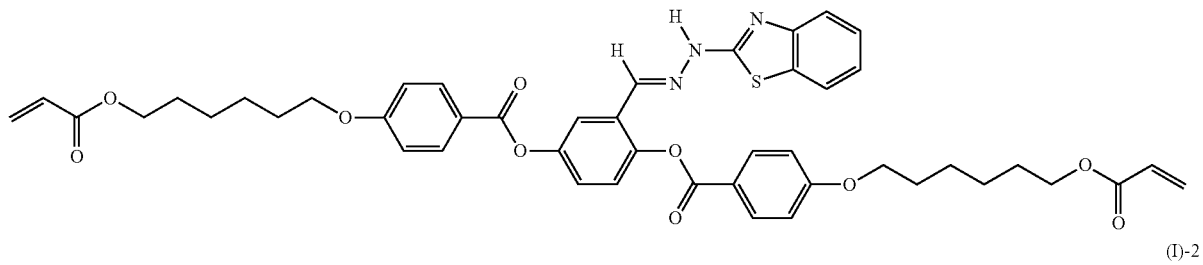
(I)-1

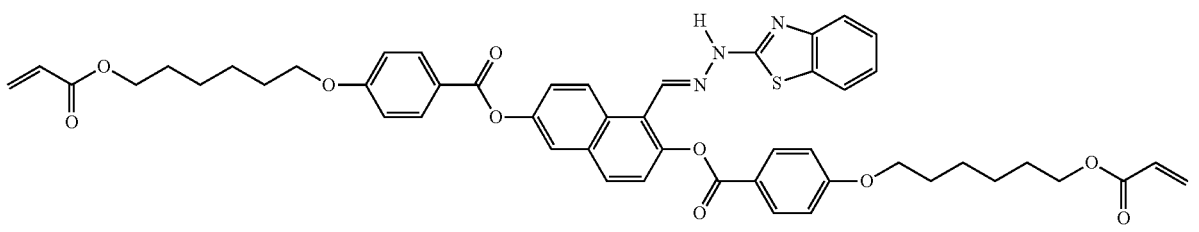
(I)-2

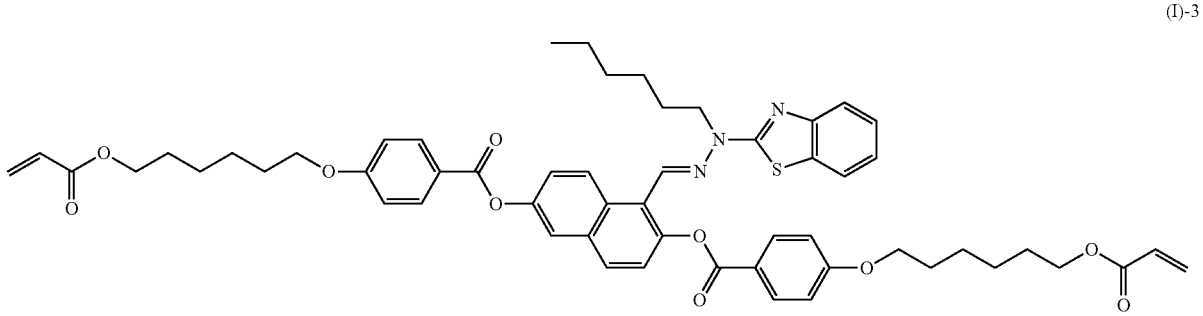
(I)-3

Specifically, a hydrazine compound represented by the formula (3) (hydrazine compound (3)) may be reacted with a carbonyl compound represented by the formula (4) (carbonyl compound (4)) at a molar ratio of [hydrazine compound (3) carbonyl compound (4)] of 1:2 to 2:1, and preferably 1:1.5 to 1.5:1 to highly selectively produce a target compound represented by the formula (I) in high yield.

In this case, an acid catalyst, such as an organic acid such as (±)-10-camphorsulfonic acid and p-toluene sulfonic acid; and an inorganic acid such as hydrochloric acid and sulfuric acid, may be added to perform the reaction. The addition of the acid catalyst may shorten the reaction time and may improve the yield. The amount of the acid catalyst to be added is usually 0.001 to 1 mol relative to 1 mol of the carbonyl compound (4). The acid catalyst may be added as it is, or as a solution form in which the acid catalyst is dissolved in an appropriate solution.

The solvent used in the reaction is not particularly limited so long as it is inert to the reaction. Examples of the solvent may include an alcohol solvent such as methyl alcohol, ethyl alcohol, n-propyl alcohol, isopropyl alcohol, n-butyl alcohol, isobutyl alcohol, sec-butyl alcohol, tert-butyl alcohol, n-pentyl alcohol, and amyl alcohol; an ether solvent such as diethyl ether, tetrahydrofuran, 1,2-dimethoxyethane, 1,4-dioxane, and cyclopentyl methyl ether; an ester solvent such as ethyl acetate, propyl acetate, and methyl propionate; an aromatic hydrocarbon-based solvent such as benzene, toluene, and xylene; an aliphatic hydrocarbon-based solvent such as n-pentane, n-hexane, and n-heptane; an amide-based solvent such as N,N-dimethylformamide, N-methylpyrrolidone, and triamide hexamethylphosphate; a sulfur-containing solvent such as dimethyl sulfoxide and sulfolane; and a mixed solvent of two or more types thereof.

Among these, the alcohol solvent, the ether solvent, and a mixed solvent of the alcohol solvent and the ether solvent are preferable.

The amount of the solvent to be used is not particularly limited, and may be appropriately determined in consideration of type of compound to be used and reaction scale. The amount is usually 1 to 100 g relative to 1 g of the hydrazine compound (3).

The reaction smoothly proceeds in a temperature range of −10° C. to the boiling point of the solvent to be used. The reaction time of each reaction may vary depending on the reaction scale, and is usually several minutes to several hours.

The hydrazine compound (3) may be produced as follows.

[Chemical Formula 26]

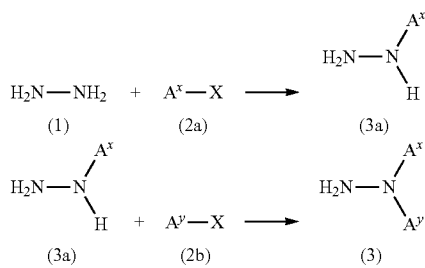

(wherein $A^x$ and $A^y$ have the same meanings as described above. X is a leaving group such as a halogen atom, a methanesulfonyloxy group, and a p-toluenesulfonyloxy group.)

Specifically, a compound represented by the formula (2a) may be reacted with hydrazine (1) in an appropriate solvent at a molar ratio of (compound (2a) hydrazine (1)) of 1:1 to 1:20, and preferably 1:2 to 1:10, to obtain a corresponding hydrazine compound (3a). Further, the hydrazine compound (3a) may be reacted with a compound represented by the formula (2b) to obtain the hydrazine compound (3).

As hydrazine (1), hydrazine monohydrate is usually used. As hydrazine (1), a commercially available product may be used as it is.

The solvent used in the reaction is not particularly limited so long as it is inert to the reaction. Examples of the solvent may include an alcohol solvent such as methyl alcohol, ethyl alcohol, n-propyl alcohol, isopropyl alcohol, n-butyl alcohol, isobutyl alcohol, sec-butyl alcohol, tert-butyl alcohol, n-pentyl alcohol, and amyl alcohol; an ether solvent such as diethyl ether, tetrahydrofuran, 1,2-dimethoxyethane, 1,4-dioxane, and cyclopentyl methyl ether; an aromatic hydrocarbon-based solvent such as benzene, toluene, and xylene; an aliphatic hydrocarbon-based solvent such as n-pentane, n-hexane, and n-heptane; an amide-based solvent such as N,N-dimethylformamide, N-methylpyrrolidone, and triamide hexamethylphosphate; a sulfur-containing solvent such as dimethyl sulfoxide and sulfolane; and a mixed solvent of two or more types thereof.

Among these, the alcohol solvent, the ether solvent, and a mixed solvent of the alcohol solvent and the ether solvent are preferable.

The amount of the solvent to be used is not particularly limited, and may be appropriately determined in consideration of type of compound to be used and reaction scale. The amount is usually 1 to 100 g relative to 1 g of hydrazine.

The reaction smoothly proceeds in a temperature range of −10° C. to the boiling point of the solvent to be used. The reaction time of each reaction may vary depending on the reaction scale, and is usually several minutes to several hours.

The hydrazine compound (3) may also be produced by reducing a diazonium salt (5) through a publicly known method, as described in the following.

[Chemical Formula 27]

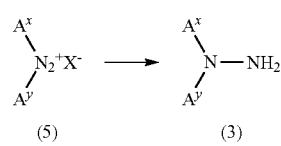

In the formula (5), $A^x$ and $A^y$ have the same meanings as described above. $X^-$ is an anion that is a counter ion of diazonium. Examples of $X^-$ may include an inorganic anion such as a hexafluorophosphate ion, a fluoroborate ion, a chloride ion, and a sulfate ion; and an organic anion such as a polyfluoroalkyl carboxylate ion, a polyfluoroalkyl sulfonate ion, a tetraphenyl borate ion, an aromatic carboxylate ion, and an aromatic sulfonate ion.

Examples of the reducing agent used in the reaction may include a metal salt reducing agent.

The metal salt reducing agent is generally a compound containing low-valent metal or a compound having a metal ion and a hydride source (see "Yuki Gosei Jikkenhou Handbook (Organic synthesis experimental method handbook)", 1990, edited by The Society of Synthetic Organic Chemistry, Japan, published by Maruzen Co., Ltd., p. 810).

Examples of the metal salt reducing agent may include NaAlH$_4$, NaAlH$_n$(OR)$_m$, LiAlH$_4$, iBu$_2$AlH, LiBH$_4$, NaBH$_4$, SnCl$_2$, CrCl$_2$, and TiCl$_3$.

In the reduction reaction, a known reaction condition may be adopted. For example, the reaction may be carried out under a condition described in Publications such as Japanese Patent Application Laid-Open No. 2005-336103 A, "Shin Jikken Kagaku Koza (New course of experimental chemistry)", 1978, published by Maruzen Co., Ltd., vol. 14, and "Jikken Kagaku Koza (Course of experimental chemistry)", 1992, published by Maruzen Co., Ltd., vol. 20.

The diazonium salt (5) may be produced from a compound such as aniline by a conventional method.

The carbonyl compound (4) may be typically produced by appropriately bonding and modifying a plurality of known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NHC(=O)—).

An ether linkage may be formed, e.g., as follows.

(i) A compound represented by the formula: D1-hal (hal represents a halogen atom, and the same applies to the following) and a compound represented by a formula: D2-OMet (Met represents an alkaline metal (mainly sodium), and the same applies to the following) are mixed and condensed (Williamson synthesis). In the formulae, D1 and D2 are optional organic groups (the same applies to the following)

(ii) A compound represented by the formula: D1-hal and a compound represented by the formula: D2-OH are mixed in the presence of a base such as sodium hydroxide or potassium hydroxide and condensed.

(iii) A compound represented by the formula: D1-J (J represents an epoxy group) and a compound represented by the formula: D2-OH are mixed in the presence of a base such as sodium hydroxide or potassium hydroxide and condensed.

(iv) A compound represented by the formula: D1-OFN (OFN represents a group having an unsaturated bond) and a compound represented by the formula: D2-OMet are mixed in the presence of a base such as sodium hydroxide or potassium hydroxide and subjected to an addition reaction.

(v) A compound represented by the formula: D1-hal and a compound represented by the formula: D2-OMet are mixed in the presence of copper or cuprous chloride and condensed (Ullmann condensation).

An ester linkage and an amide linkage may be formed, e.g., as follows.

(vi) A compound represented by the formula: D1-COOH and a compound represented by the formula: D2-OH or D2-NH$_2$ are subjected to dehydration condensation in the presence of a dehydration condensation agent (N,N-dicyclohexylcarbodiimide, etc.).

(vii) A compound represented by the formula: D1-COOH is reacted with a halogenating agent to obtain a compound represented by the formula: D1-CO-hal, and the compound is reacted with a compound represented by the formula: D2-OH or D2-NH$_2$ in the presence of a base.

(viii) A compound represented by the formula: D1-COOH is reacted with an acid anhydride to obtain a mixed acid anhydride, and the mixed acid anhydride is reacted with a compound represented by the formula: D2-OH or D2-NH$_2$.

(ix) A compound represented by the formula: D1-COOH and a compound represented by the formula: D2-OH or D2-NH$_2$ are subjected to dehydration condensation in the presence of an acid catalyst or a base catalyst.

More specifically, among the carbonyl compound (4), a compound (4') in which a group represented by the formula: Z$^2$—Y$^6$-G$^2$-Y$^4$-A$^3$-Y$^2$— in the formula (4) is the same as a group represented by the formula: Z$^1$—Y$^5$-G$^1$-Y$^3$-A$^2$-Y$^1$—, and Y$^1$ is a group represented by Y$^{11}$—C(=O)—O— may be produced by the following reaction.

[Chemical Formula 28]

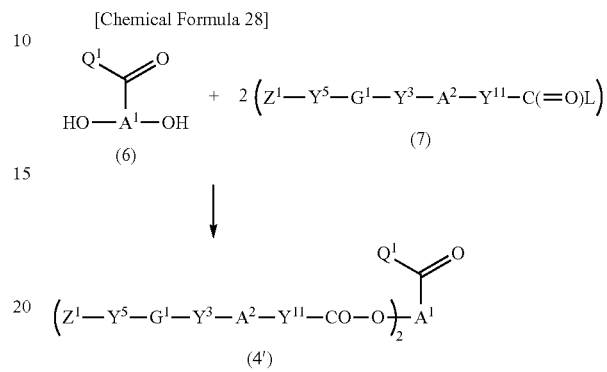

(wherein Y$^3$, Y$^5$, G$^1$, Z$^1$, A$^1$, A$^2$, and Q$^1$ have the same meanings as described above. Y$^{11}$ is a group having a structure such that Y$^{11}$—C(=O)—O— corresponds to Y$^1$. Y$^1$ has the same meanings as described above. L is a leaving group such as a hydroxyl group, a halogen atom, a methanesulfonyloxy group, or a p-toluenesulfonyloxy group.)

In the reaction, a dihydroxy compound represented by the formula (6) (compound (6)) may be reacted with a compound represented by the formula (7) (compound (7)) at a molar ratio of (compound (6):compound (7)) of 1:2 to 1:4, and preferably 1:2 to 1:3 to highly selectively produce a target compound (4') in high yield.

When the compound (7) is a compound in which L in the formula (7) is a hydroxyl group (carboxylic acid), the reaction may be carried out in the presence of a dehydration condensation agent such as 1-ethyl-3-(3-dimethylaminopropyl)carbodiimide hydrochloride or dicyclohexyl carbodiimide to obtain a target compound.

The amount of the dehydration condensation agent to be used is usually 1 to 3 mol relative to 1 mol of the compound (7).

When the compound (7) is a compound in which L in the formula (7) is a halogen atom (acid halide), the reaction may be carried out in the presence of a base to obtain a target compound.

Examples of the base for use may include an organic base such as triethylamine and pyridine; and an inorganic base such as sodium hydroxide, sodium carbonate, and sodium hydrogen carbonate.

The amount of the base to be used is usually 1 to 3 mol relative to 1 mol of the compound (7).

A case where the compound (7) is a compound in which L in the formula (7) is a methanesulfonyloxy group or a p-toluenesulfonyloxy group (mixed acid anhydride) is also the same as in the case in which L is a halogen atom.

Examples of the solvent used in the reaction may include a chlorinated solvent such as chloroform and methylene chloride; an amide-based solvent such as N-methylpyrrolidone, N,N-dimethyl formamide, N,N-dimethyl acetamide, and triamide hexamethylphosphate; an ether such as 1,4-dioxane, cyclopentyl methyl ether, tetrahydrofuran, tetrahydropyran, and 1,3-dioxolan; a sulfur-containing solvent such as dimethyl sulfoxide and sulfolane; an aromatic hydrocarbon-based solvent such as benzene, toluene, and xylene; an aliphatic hydrocarbon-based solvent such as n-pentane, n-hexane, and n-octane; an alicyclic hydrocarbon-based solvent such as cyclopentane and cyclohexane; and a mixed solvent of two or more types thereof.

The amount of the solvent to be used is not particularly limited, and may be appropriately determined in consideration of type of compound to be used and reaction scale. The amount is usually 1 to 50 g relative to 1 g of the hydroxy compound (6).

Many of the compounds (7) are known compounds, and may be produced by appropriately bonding and modifying a plurality of known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NHC(=O)—).

In any of the reactions, a usual post-treatment operation in organic synthesis chemistry may be carried out after completion of the reactions, and if desired, a known separation and purification operation such as column chromatography, recrystallization, and distillation may be carried out to isolate a target compound.

The structure of the target compound may be identified by, e.g., measurements such as NMR spectrometry, IR spectrometry, and mass spectrometry, as well as elemental analysis.

[1.4. Compound (V)]

Other examples of the polymerizable liquid crystal compound with reverse wavelength dispersion may include a compound represented by the following formula (V) (this may be referred to hereinbelow as "compound (V)").

[Chemical Formula 29]

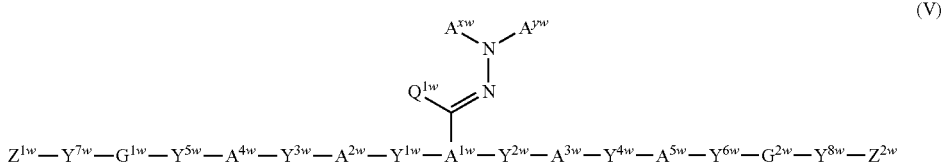

(V)

When the polymerizable liquid crystal compound with reverse wavelength dispersion is the compound (V), a —$Y^{5w}$-$A^{4w}$-$Y^{3w}$-$A^{2w}$-$A^{3w}$-$Y^{4w}$-$A^{5w}$-$Y^{2w}$-$A^{3w}$-$Y^{4w}$-$A^{5w}$-$Y^{6w}$— group is the main chain mesogen, and a >$A^{1w}$-C($Q^{1w}$)=N—N($A^{xw}$)$A^{yw}$ group is the side chain mesogen. The $A^{1w}$ group affects nature of both the main chain mesogen and the side chain mesogen.

In the formula, $Y^{1w}$ to $Y^{8w}$ are each independently a chemical single bond, —O—, —S—, —O—C(=O)—, —C(=O)—O—, —O—C(=O)—O—, —$NR^1$—C(=O)—, —C(=O)—$NR^1$—, —O—C(=O)—$NR^1$—, —$NR^1$—C(=O)—O—, —$NR^1$—C(=O)—$NR^1$—, —O—$NR^1$—, or —$NR^1$—O—.

Herein, definition of $R^1$ and preferred examples of $Y^{1w}$ to $Y^{8w}$ are the same as those described regarding $Y^1$ to $Y^6$ of the formula (I).

$G^{1w}$ and $G^{2w}$ are each independently a divalent aliphatic group having 1 to 20 carbon atoms and optionally having a substituent.

Examples of the divalent aliphatic group having 1 to 20 carbon atoms may include a divalent aliphatic group having a linear structure such as an alkylene group having 1 to 20 carbon atoms and an alkenylene group having 2 to 20 carbon atoms; and a divalent aliphatic group such as a cycloalkanediyl group having 3 to 20 carbon atoms, a cycloalkenediyl group having 4 to 20 carbon atoms, and a divalent alicyclic condensed ring group having 10 to 30 carbon atoms.

Examples of the substituent on the divalent aliphatic group of $G^{1w}$ and $G^{2w}$ may include a halogen atom such as a fluorine atom, a chlorine atom, a bromine atom, and an iodine atom; and an alkoxy group having 1 to 6 carbon atoms such as a methoxy group, an ethoxy group, a n-propoxy group, an isopropoxy group, a n-butoxy group, a sec-butoxy group, a tert-butoxy group, a n-pentyloxy group, and a n-hexyloxy group. Among these, a fluorine atom, a methoxy group, and an ethoxy group are preferable.

The aliphatic group may have one or more of —O—, —S—, —O—C(=O)—, —C(=O)—O—, —O—C(=O)—O—, —$NR^{2w}$—C(=O)—, —C(=O)—$NR^{2w}$—, —$NR^{2w}$—, or —C(=O)— inserted thereinto per one aliphatic group, provided that a case where two or more —O— groups or —S— groups are adjacently inserted is excluded. Herein, $R^{2w}$ is a hydrogen atom or an alkyl group having 1 to 6 carbon atoms, like $R^1$, and preferably a hydrogen atom or a methyl group.

It is preferable that the group inserted into the aliphatic group is —O—, —O—C(=O)—, —C(=O)—O—, or —C(=O)—.

Specific examples of the aliphatic group having these groups inserted thereinto may include —$CH_2$—$CH_2$—O—$CH_2$—$CH_2$—, —$CH_2$—$CH_2$—S—$CH_2$—$CH_2$—, —$CH_2$—$CH_2$—O—C(=O)—$CH_2$—$CH_2$—, —$CH_2$—$CH_2$—C(=O)—O—$CH_2$—$CH_2$—, —$CH_2$—$CH_2$—C(=O)—O—$CH_2$—, —$CH_2$—O—C(=O)—O—$CH_2$—$CH_2$—, —$CH_2$—$CH_2$—$NR^2$—C(=O)—$CH_2$—$CH_2$—, —$CH_2$—$CH_2$—C(=O)—$NR^2$—$CH_2$—, —$CH_2$—$NR^2$—$CH_2$—$CH_2$—, and —$CH_2$—C(=O)—$CH_2$—.

Among these, from the viewpoint of favorably expressing the desired effect of the present invention, it is preferable that $G^{1w}$ and $G^{2w}$ are each independently a divalent aliphatic group having a linear structure such as an alkylene group having 1 to 20 carbon atoms and an alkenylene group having 2 to 20 carbon atoms, more preferably an alkylene group having 1 to 12 carbon atoms such as a methylene group, an ethylene group, a trimethylene group, a propylene group, a tetramethylene group, a pentamethylene group, a hexamethylene group, an octamethylene group, and a decamethylene group [—$(CH_2)_{10}$—], and particularly preferably a tetramethylene group [—$(CH_2)_4$—], a hexamethylene group [—$(CH_2)_6$—], an octamethylene group [—$(CH_2)_8$—], or a decamethylene group [—$(CH_2)_{10}$—]

$Z^{1w}$ and $Z^{2w}$ are each independently an alkenyl group having 2 to 10 carbon atoms that is unsubstituted or substituted by a halogen atom.

Preferable examples of $Z^{1w}$ and $Z^{2w}$ are the same as those described regarding $Z^1$ to $Z^2$ in the formula (I).

$A^{xw}$ is an organic group of 2 to 30 carbon atoms having at least one aromatic ring selected from the group consisting of an aromatic hydrocarbon ring and an aromatic heterocyclic ring.

The organic group of 2 to 30 carbon atoms having at least one aromatic ring selected from the group consisting of an aromatic hydrocarbon ring and an aromatic heterocyclic ring, of $A^{xw}$, may have a plurality of aromatic rings, and may have an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a condensed aromatic heterocyclic ring such as a benzothiazole ring, a benzoxazole ring, a quinoline ring, a phthalazine ring, a benzimidazole ring, a benzopyrazole ring, a benzofuran ring, a benzothiophene ring, a thiazolopyridine ring, an oxazolopyridine ring, a thiazolopyrazine ring, an oxazolopyrazine ring, a thiazolopyridazine ring, an oxazolopyridazine ring, a thiazolopyrimidine ring, and an oxazolopyrimidine ring.

The aromatic ring group of $A^{xw}$ may have a substituent. Examples of the substituent may include a halogen atom such as a fluorine atom and a chlorine atom; a cyano group; an alkyl group having 1 to 6 carbon atoms such as a methyl group, an ethyl group, and a propyl group; an alkenyl group having 2 to 6 carbon atoms such as a vinyl group and an allyl group; a halogenated alkyl group having 1 to 6 carbon atoms such as a trifluoromethyl group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; —C(=O)—$R^{5w}$; —C(=O)—$OR^{5w}$; and —$SO_2R^{6w}$. Herein, $R^{5w}$ is an alkyl group having 1 to 20 carbon atoms, an alkenyl group having 2 to 20 carbon atoms, or a cycloalkyl group having 3 to 12 carbon atoms, and $R^{6w}$ is an alkyl group having 1 to 20 carbon atoms, an alkenyl group having 2 to 20 carbon atoms, a phenyl group, or a 4-methylphenyl group, like $R^{4w}$ which will be described later.

The aromatic ring of $A^{xw}$ may have a plurality of substituents that are the same or different, and two adjacent substituents may be bonded together to form a ring. The formed ring may be a monocyclic ring or a condensed polycyclic ring, and may be an unsaturated ring or a saturated ring.

The "number of carbon atoms" in the organic group having 2 to 30 carbon atoms of $A^{xw}$ means the total number of carbon atoms in the entire organic group, although carbon atoms in the substituents are excluded therefrom (the same applies to $A^{yw}$ which will be described later).

Examples of the organic group of 2 to 30 carbon atoms having at least one aromatic ring selected from the group consisting of an aromatic hydrocarbon ring and an aromatic heterocyclic ring of $A^{xw}$ may include an aromatic hydrocarbon ring group; an aromatic heterocyclic ring group; an alkyl group of 3 to 30 carbon atoms having at least one aromatic ring selected from the group consisting of an aromatic hydrocarbon ring group and an aromatic heterocyclic ring group; an alkenyl group of 4 to 30 carbon atoms having at least one aromatic ring selected from the group consisting of an aromatic hydrocarbon ring group and an aromatic heterocyclic ring group; and an alkynyl group of 4 to 30 carbon atoms having at least one aromatic ring selected from the group consisting of an aromatic hydrocarbon ring group and an aromatic heterocyclic ring group.

Specific preferable examples of $A^{xw}$ are as follows. However, in the present invention, $A^{xw}$ is not limited to the following examples. In the following formulae, [-] represents an atomic bond extended from any position of the ring (the same applies to the following).

(1) An aromatic hydrocarbon ring group

[Chemical Formula 30]

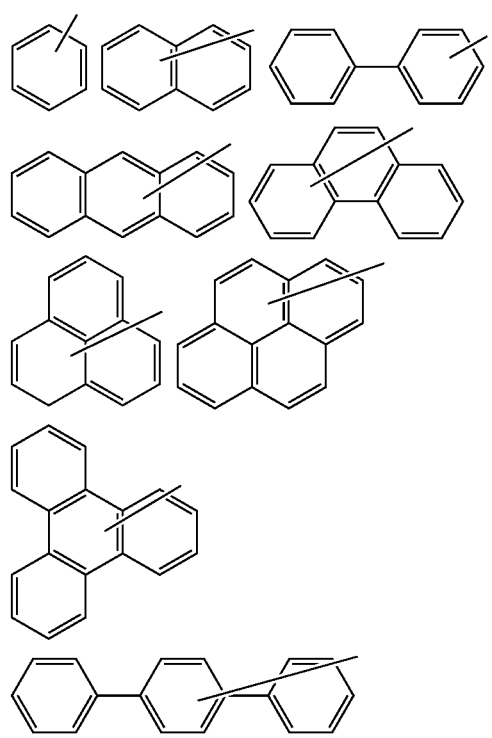

[Chemical Formula 31]

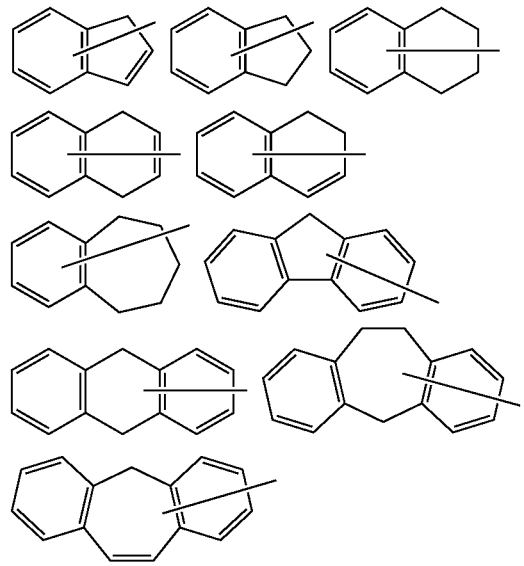

(2) An aromatic heterocyclic ring group

[Chemical Formula 32]

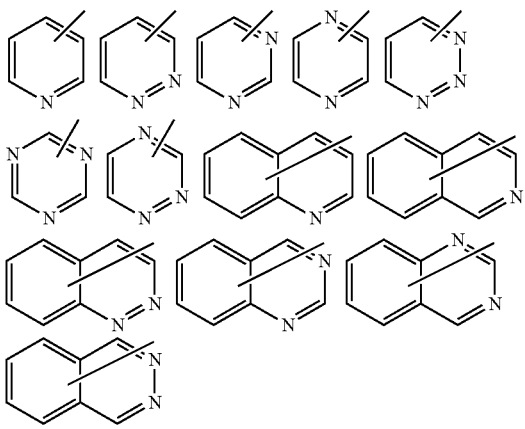

[Chemical Formula 33]

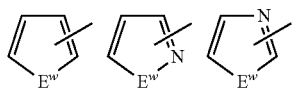

In the formulae, $E^w$ is $NR^{6w}$, an oxygen atom, or a sulfur atom. Herein, $R^{6w}$ is a hydrogen atom; or an alkyl group having 1 to 6 carbon atoms such as a methyl group, an ethyl group, and a propyl group.

[Chemical Formula 34]

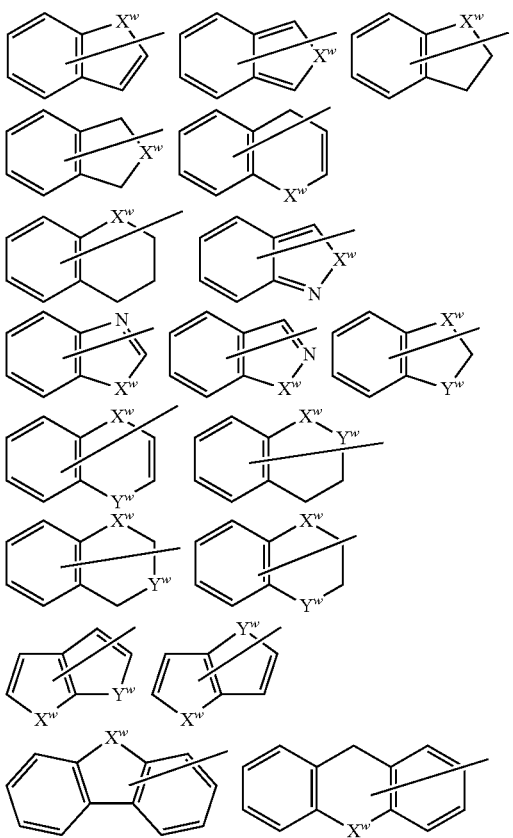

-continued

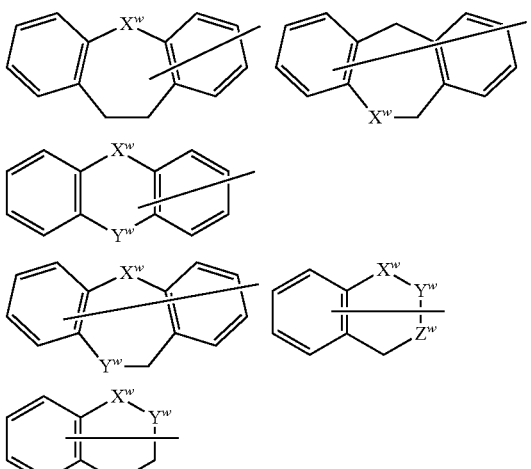

In the formulae, $X^w$, $Y^w$, and $Z^w$ are each independently $NR^{7w}$, an oxygen atom, a sulfur atom, —SO—, or —SO$_2$— (provided that a case where oxygen atoms, sulfur atoms, —SO— groups, or —SO$_2$— groups are adjacent is excluded). $R^{7w}$ is a hydrogen atom; or an alkyl group having 1 to 6 carbon atoms such as a methyl group, an ethyl group, and a propyl group, like the aforementioned $R^{6w}$.

[Chemical Formula 35]

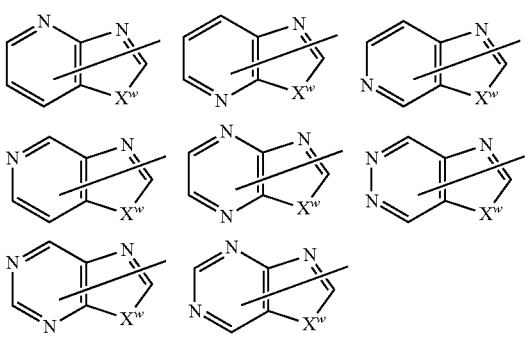

(In the formulae, $X^w$ has the same meanings as described above.)

(3) An alkyl group having at least one aromatic ring selected from the group consisting of an aromatic hydrocarbon ring group and an aromatic heterocyclic ring group

[Chemical Formula 36]

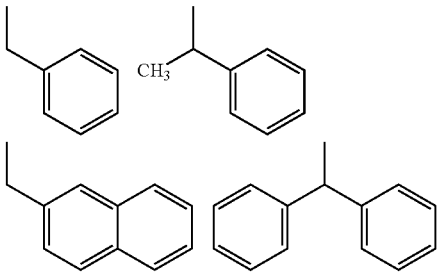

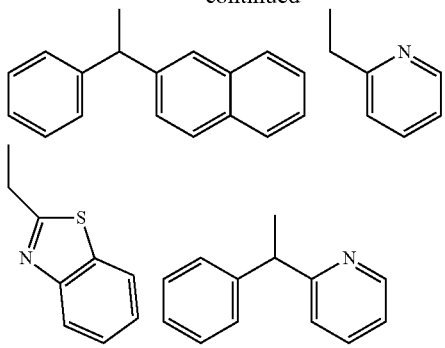

(4) An alkenyl group having at least one aromatic ring selected from the group consisting of an aromatic hydrocarbon ring group and an aromatic heterocyclic ring group

[Chemical Formula 37]

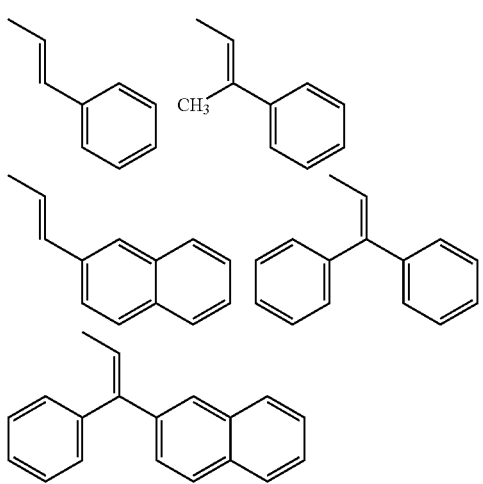

(5) An alkynyl group having at least one aromatic ring selected from the group consisting of an aromatic hydrocarbon ring group and an aromatic heterocyclic ring group

[Chemical Formula 38]

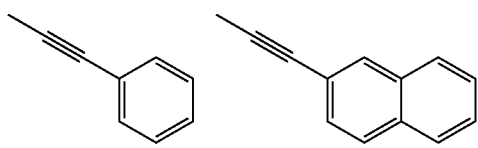

Among the groups of the aforementioned $A^{xw}$, an aromatic hydrocarbon group having 6 to 30 carbon atoms and an aromatic heterocyclic ring group having 4 to 30 carbon atoms are preferable. Any of the groups shown in the following are more preferable.

[Chemical Formula 39]

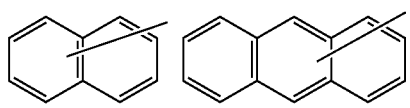

[Chemical Formula 40]

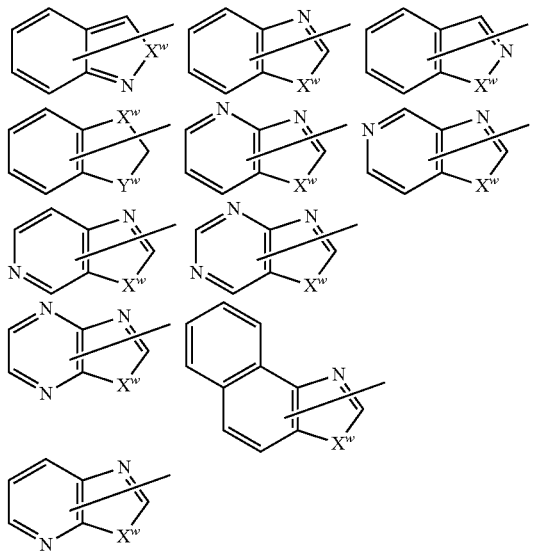

Any of the groups shown in the following are further preferable.

[Chemical Formula 41]

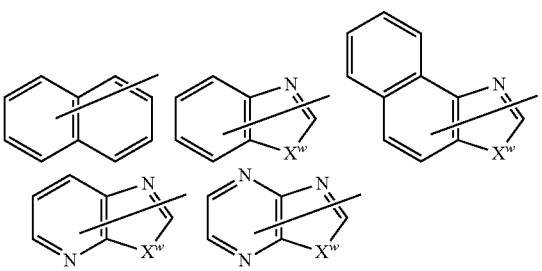

The ring of $A^{xw}$ may have a substituent. Examples of the substituent may include a halogen atom such as a fluorine atom and a chlorine atom; a cyano group; an alkyl group having 1 to 6 carbon atoms such as a methyl group, an ethyl group, and a propyl group; an alkenyl group having 2 to 6 carbon atoms such as a vinyl group and an allyl group; a halogenated alkyl group having 1 to 6 carbon atoms such as a trifluoromethyl group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; —C(=O)—OR$^{8w}$; —C(=O)—OR$^{8w}$; and —SO$_2$R$^{6w}$. Herein, R$^{8w}$ is an alkyl group having 1 to 6 carbon atoms such as a methyl group or an ethyl group; or an aryl group having 6 to 14 carbon atoms such as a phenyl group. Among these, a halogen atom, a cyano group, an alkyl group having 1 to 6 carbon atoms, and an alkoxy group having 1 to 6 carbon atoms are preferable.

The ring of $A^{xw}$ may have a plurality of substituents that are the same or different, and two adjacent substituents may be bonded together to form a ring. The formed ring may be a monocyclic ring or a condensed polycyclic ring.

The "number of carbon atoms" in the organic group having 2 to 30 carbon atoms of $A^{xw}$ means the total number of carbon atoms in the entire organic group, although carbon atoms in the substituents are excluded therefrom (the same applies to $A^{yw}$ which will be described later).

$A^{yw}$ is a hydrogen atom, an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, an alkynyl group having 2 to 20 carbon atoms and optionally having a substituent, —C(=O)—$R^{3w}$, —SO$_2$—$R^{4w}$, —C(=S)NH—$R^{9w}$, or an organic group having 2 to 30 carbon atoms and at least one aromatic ring selected from the group consisting of an aromatic hydrocarbon ring and an aromatic heterocyclic ring. Herein, $R^{3w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic hydrocarbon group having 5 to 12 carbon atoms, $R^{4w}$ is an alkyl group having 1 to 20 carbon atoms, an alkenyl group having 2 to 20 carbon atoms, a phenyl group, or a 4-methylphenyl group, and $R^{9w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic group having 5 to 20 carbon atoms and optionally having a substituent.

Examples of an alkyl group having 1 to 20 carbon atoms in the alkyl group having 1 to 20 carbon atoms and optionally having a substituent of $A^{yw}$ may include a methyl group, an ethyl group, a n-propyl group, an isopropyl group, a n-butyl group, an isobutyl group, a 1-methylpentyl group, a 1-ethylpentyl group, a sec-butyl group, a tert-butyl group, a n-pentyl group, an isopentyl group, a neopentyl group, a n-hexyl group, an isohexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group. The number of carbon atoms in the alkyl group having 1 to 20 carbon atoms and optionally having a substituent is preferably 1 to 12, and further preferably 4 to 10.

Examples of an alkenyl group having 2 to 20 carbon atoms in the alkenyl group having 2 to 20 carbon atoms and optionally having a substituent of $A^{yw}$ may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icosenyl group.

The number of carbon atoms in the alkenyl group having 2 to 20 carbon atoms and optionally having a substituent is preferably 2 to 12.

Examples of a cycloalkyl group having 3 to 12 carbon atoms in the cycloalkyl group having 3 to 12 carbon atoms and optionally having a substituent of $A^{yw}$ may include a cyclopropyl group, a cyclobutyl group, a cyclopentyl group, a cyclohexyl group, and a cyclooctyl group.

Examples of an alkynyl group having 2 to 20 carbon atoms in the alkynyl group having 2 to 20 carbon atoms and optionally having a substituent of $A^{yw}$ may include an ethynyl group, a propynyl group, a 2-propynyl group (propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of substituents in the alkyl group having 1 to 20 carbon atoms and optionally having a substituent and the alkenyl group having 2 to 20 carbon atoms and optionally having a substituent of $A^{yw}$ may include a halogen atom such as a fluorine atom and a chlorine atom; a cyano group; a substituted amino group such as a dimethylamino group; an alkoxy group having 1 to 20 carbon atoms such as a methoxy group, an ethoxy group, an isopropoxy group, and a butoxy group; an alkoxy group having 1 to 12 carbon atoms that is substituted by an alkoxy group having 1 to 12 carbon atoms such as a methoxymethoxy group and a methoxyethoxy group; a nitro group; an aryl group such as a phenyl group and a naphthyl group; a cycloalkyl group having 3 to 8 carbon atoms such as a cyclopropyl group, a cyclopentyl group, and a cyclohexyl group; a cycloalkyloxy group having 3 to 8 carbon atoms such as a cyclopentyloxy group and a cyclohexyloxy group; a cyclic ether group having 2 to 12 carbon atoms such as a tetrahydrofuranyl group, a tetrahydropyranyl group, a dioxolanyl group, and a dioxanyl group; an aryloxy group having 6 to 14 carbon atoms such as a phenoxy group and a naphthoxy group; a fluoroalkoxy group having 1 to 12 carbon atoms having at least one substitution by a fluorine atom, such as a trifluoromethyl group, a pentafluoroethyl group, and —CH$_2$CF$_3$; a benzofuryl group; a benzopyranyl group; a benzodioxolyl group; a benzodioxanyl group; —C(=O)—$R^{7w}$; —C(=O)—OR$^{7w}$; —SO$_2$R$^{8w}$; —SR$^{10w}$; an alkoxy group having 1 to 12 carbon atoms that is substituted by —SR$^{10w}$; and a hydroxyl group. Herein, $R^{7w}$ and $R^{10w}$ are each independently an alkyl group having 1 to 20 carbon atoms, an alkenyl group having 2 to 20 carbon atoms, a cycloalkyl group having 3 to 12 carbon atoms, or an aromatic hydrocarbon group having 6 to 12 carbon atoms, and $R^{8w}$ is an alkyl group having 1 to 20 carbon atoms, an alkenyl group having 2 to 20 carbon atoms, a phenyl group, or a 4-methylphenyl group, like the aforementioned $R^{4w}$.

Examples of a substituent in the cycloalkyl group having 3 to 12 carbon atoms and optionally having a substituent of $A^{yw}$ may include a halogen atom such as a fluorine atom and a chlorine atom; a cyano group; a substituted amino group such as a dimethylamino group; an alkyl group having 1 to 6 carbon atoms such as a methyl group, an ethyl group, and a propyl group; an alkoxy group having 1 to 6 carbon atoms such as a methoxy group, an ethoxy group, and an isopropoxy group; a nitro group; an aryl group such as a phenyl group and a naphthyl group; a cycloalkyl group having 3 to 8 carbon atoms such as a cyclopropyl group, a cyclopentyl group, and a cyclohexyl group; —C(=O)—$R^{7w}$; —C(=O)—OR$^{7w}$; —SO$_2$R$^{8w}$; and a hydroxyl group. Herein, $R^{7w}$ and $R^{8w}$ have the same meanings as described above.

Examples of a substituent in the alkynyl group having 2 to 20 carbon atoms and optionally having a substituent of $A^{yw}$ may include substituents that are the same as the substituents in the alkyl group having 1 to 20 carbon atoms and optionally having a substituent and the alkenyl group having 2 to 20 carbon atoms and optionally having a substituent.

In the group represented by —C(=O)—$R^{3w}$ of $A^{yw}$, $R^{3w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic hydrocarbon group having 5 to 12 carbon atoms. Specific examples thereof may include those exemplified as the examples of the alkyl group having 1 to 20 carbon atoms and optionally having a substituent, the alkenyl group having 2 to 20 carbon atoms and optionally having a substituent, and the cycloalkyl group having 3 to 12 carbon atoms and optionally having a substituent of $A^{yw}$.

In the group represented by —$SO_2$—$R^{4w}$ of $A^{yw}$, $R^{4w}$ is an alkyl group having 1 to 20 carbon atoms, an alkenyl group having 2 to 20 carbon atoms, a phenyl group or a 4-methylphenyl group.

Specific examples of the alkyl group having 1 to 20 carbon atoms and the alkenyl group having 2 to 20 carbon atoms of $R^{4w}$ may include those exemplified as the examples of the alkyl group having 1 to 20 carbon atoms and the alkenyl group having 2 to 20 carbon atoms of the aforementioned $A^{yw}$.

Examples of the organic group having 2 to 30 carbon atoms and at least one aromatic ring selected from the group consisting of an aromatic hydrocarbon ring and an aromatic heterocyclic ring of $A^{yw}$ may include those exemplified as the examples regarding $A^{xw}$.

Among these, it is preferable that $A^{yw}$ is a group represented by a hydrogen atom, an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, an alkynyl group having 2 to 20 carbon atoms and optionally having a substituent, —C(=O)—$R^{3w}$, —$SO_2$—$R^{4w}$, or an organic group having 2 to 30 carbon atoms and at least one aromatic ring selected from the group consisting of an aromatic hydrocarbon ring and an aromatic heterocyclic ring, and further preferably a group represented by a hydrogen atom, an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, an alkynyl group having 2 to 20 carbon atoms and optionally having a substituent, an aromatic hydrocarbon group having 6 to 12 carbon atoms and optionally having a substituent, an aromatic heterocyclic ring group having 3 to 9 carbon atoms and optionally having a substituent, —C(=O)—$R^{3w}$, or —$SO_2$—$R^{4w}$. Herein, $R^{3w}$ and $R^{4w}$ have the same meanings as described above.

It is preferable that substituents in the alkyl group having 1 to 20 carbon atoms and optionally having a substituent, the alkenyl group having 2 to 20 carbon atoms and optionally having a substituent, and the alkynyl group having 2 to 20 carbon atoms and optionally having a substituent of $A^{yw}$ are a halogen atom, a cyano group, an alkoxy group having 1 to 20 carbon atoms, an alkoxy group having 1 to 12 carbon atoms that is substituted by an alkoxy group having 1 to 12 carbon atoms, a phenyl group, a cyclohexyl group, a cyclic ether group having 2 to 12 carbon atoms, an aryloxy group having 6 to 14 carbon atoms, a hydroxyl group, a benzodioxanyl group, a phenylsulfonyl group, a 4-methylphenylsulfonyl group, a benzoyl group, or —$SR^{10w}$. Herein, $R^{10w}$ has the same meanings as described above.

It is preferable that substituents in the cycloalkyl group having 3 to 12 carbon atoms and optionally having a substituent, the aromatic hydrocarbon group having 6 to 12 carbon atoms and optionally having a substituent, and the aromatic heterocyclic ring group having 3 to 9 carbon atoms and optionally having a substituent of $A^{yw}$ are a fluorine atom, an alkyl group having 1 to 6 carbon atoms, an alkoxy group having 1 to 6 carbon atoms, or a cyano group.

$A^{xw}$ and $A^{yw}$ may together form a ring. Examples of the ring may include an unsaturated heterocyclic ring having 4 to 30 carbon atoms and an unsaturated carbon ring having 6 to 30 carbon atoms, wherein these rings may optionally have a substituent.

The unsaturated heterocyclic ring having 4 to 30 carbon atoms and the unsaturated carbon ring having 6 to 30 carbon atoms are not particularly restricted, and may or may not have aromaticity. Examples thereof may include rings shown in the following. The rings shown in the following are a moiety of:

[Chemical Formula 42]

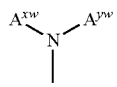

in the formula (I).

[Chemical Formula 43]

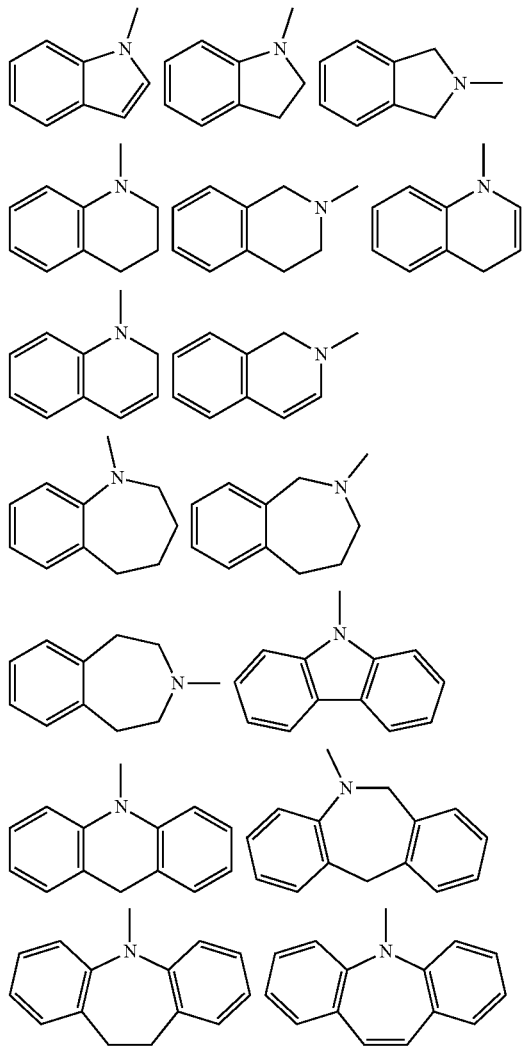

[Chemical Formula 44]

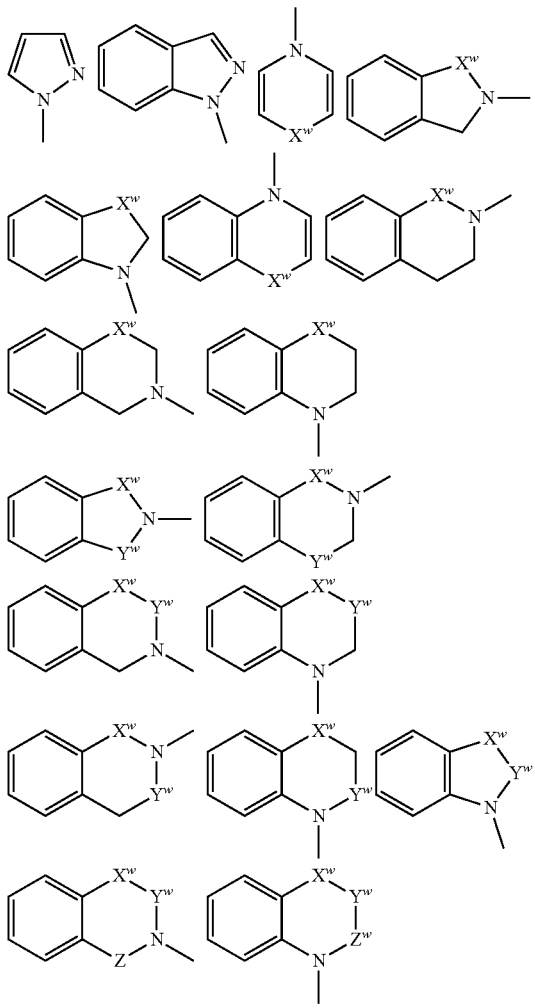

[Chemical Formula 45]

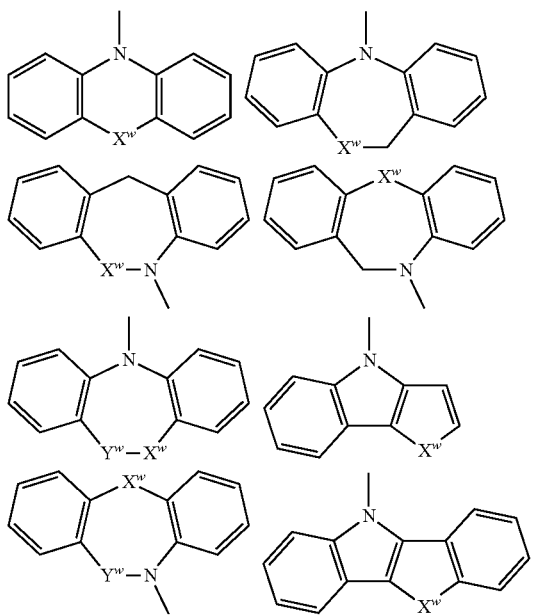

(In the formulae, $X^w$, $Y^w$, and $Z^w$ have the same meanings as described above.)

The rings may have a substituent. Examples of the substituent may include those exemplified as the examples of the substituent on the aromatic ring of $A^{xw}$ The total number of π electrons included in $A^{xw}$ and $A^{yw}$ is preferably 4 or more and 24 or less, more preferably 6 or more and 20 or less, and further preferably 6 or more and 18 or less from the viewpoint of favorably expressing the desired effect of the present invention.

Examples of preferred combination of $A^{xw}$ and $A^{yw}$ may include:

(α) a combination of $A^{xw}$ and $A^{yw}$ in which $A^{xw}$ is an aromatic hydrocarbon group or an aromatic heterocyclic ring group having 4 to 30 carbon atoms, $A^{yw}$ is a hydrogen atom, a cycloalkyl group having 3 to 8 carbon atoms, an aromatic hydrocarbon group having 6 to 12 carbon atoms and optionally having (a halogen atom, a cyano group, an alkyl group having 1 to 6 carbon atoms, an alkoxy group having 1 to 6 carbon atoms, or a cycloalkyl group having 3 to 8 carbon atoms) as a substituent, an aromatic heterocyclic ring group having 3 to 9 carbon atoms and optionally having (a halogen atom, an alkyl group having 1 to 6 carbon atoms, an alkoxy group having 1 to 6 carbon atoms, or a cyano group) as a substituent, an alkyl group having 1 to 20 carbon atoms and optionally having a substituent, an alkenyl group having 1 to 20 carbon atoms and optionally having a substituent, or an alkynyl group having 2 to 20 carbon atoms and optionally having a substituent, and the substituent is any of a halogen atom, a cyano group, an alkoxy group having 1 to 20 carbon atoms, an alkoxy group having 1 to 12 carbon atoms that is substituted by an alkoxy group having 1 to 12 carbon atoms, a phenyl group, a cyclohexyl group, a cyclic ether group having 2 to 12 carbon atoms, an aryloxy group having 6 to 14 carbon atoms, a hydroxyl group, a benzodioxanyl group, a benzenesulfonyl group, a benzoyl group, and —$SR^{10w}$; and (β) a combination in which $A^{xw}$ and $A^{yw}$ together form an unsaturated heterocyclic ring or an unsaturated carbon ring. Herein, $R^{10w}$ has the same meanings as described above.

Examples of more preferred combination of $A^{xw}$ and $A^{yw}$ may include:

(γ) a combination in which $A^{xw}$ is any of groups having the following structures, $A^{yw}$ is a hydrogen atom, a cycloalkyl group having 3 to 8 carbon atoms, an aromatic hydrocarbon group having 6 to 12 carbon atoms and optionally having (a halogen atom, a cyano group, an alkyl group having 1 to 6 carbon atoms, an alkoxy group having 1 to 6 carbon atoms, or a cycloalkyl group having 3 to 8 carbon atoms) as a substituent, an aromatic heterocyclic ring group having 3 to 9 carbon atoms and optionally having (a halogen atom, an alkyl group having 1 to 6 carbon atoms, an alkoxy group having 1 to 6 carbon atoms, or a cyano group) as a substituent, an alkyl group having 1 to 20 carbon atoms and optionally having a substituent, an alkenyl group having 1 to 20 carbon atoms and optionally having a substituent, or an alkynyl group having 2 to 20 carbon atoms and optionally having a substituent, and the substituent is any of a halogen atom, a cyano group, an alkoxy group having 1 to 20 carbon atoms, an alkoxy group having 1 to 12 carbon atoms that is substituted by an alkoxy group having 1 to 12 carbon atoms, a phenyl group, a cyclohexyl group, a cyclic ether group having 2 to 12 carbon atoms, an aryloxy group having 6 to 14 carbon atoms, a hydroxyl group, a benzodioxanyl group, a benzenesulfonyl group, a benzoyl group, and —SR$^{10w}$. Herein, R$^{10w}$ has the same meanings as described above.

[Chemical Formula 46]

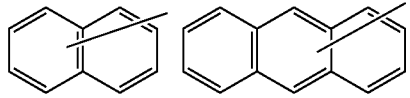

[Chemical Formula 47]

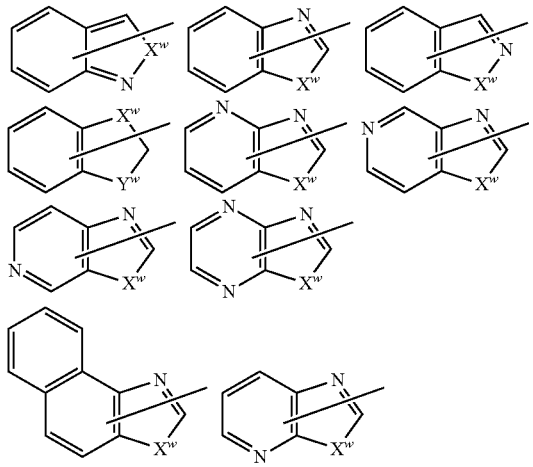

(In the formulae, X$^w$ and Y$^w$ have the same meanings as described above.)

A particularly preferred combination of A$^{xw}$ and A$^{yw}$ is (δ) a combination in which A$^{xw}$ is any of groups having the following structures, A$^{yw}$ is a hydrogen atom, a cycloalkyl group having 3 to 8 carbon atoms, an aromatic hydrocarbon group having 6 to 12 carbon atoms and optionally having (a halogen atom, a cyano group, an alkyl group having 1 to 6 carbon atoms, an alkoxy group having 1 to 6 carbon atoms, or a cycloalkyl group having 3 to 8 carbon atoms) as a substituent, an aromatic heterocyclic ring group having 3 to 9 carbon atoms and optionally having (a halogen atom, an alkyl group having 1 to 6 carbon atoms, an alkoxy group having 1 to 6 carbon atoms, or a cyano group) as a substituent, an alkyl group having 1 to 20 carbon atoms and optionally having a substituent, an alkenyl group having 1 to 20 carbon atoms and optionally having a substituent, or an alkynyl group having 2 to 20 carbon atoms and optionally having a substituent, and the substituent is any of a halogen atom, a cyano group, an alkoxy group having 1 to 20 carbon atoms, an alkoxy group having 1 to 12 carbon atoms that is substituted by an alkoxy group having 1 to 12 carbon atoms, a phenyl group, a cyclohexyl group, a cyclic ether group having 2 to 12 carbon atoms, an aryloxy group having 6 to 14 carbon atoms, a hydroxyl group, a benzodioxanyl group, a benzenesulfonyl group, a benzoyl group, and —SR$^{10w}$. In the following formulae, X has the same meanings as described above. Herein, R$^{10w}$ has the same meanings as described above.

[Chemical Formula 48]

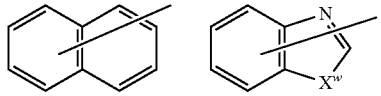

[Chemical Formula 48 -continued]

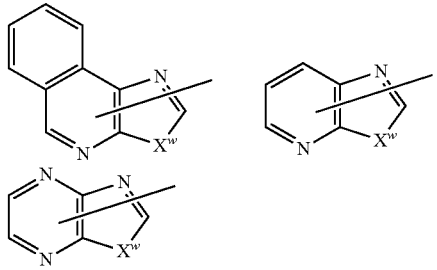

A$^{1w}$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent carbocyclic aromatic group is preferable, a trivalent benzene ring group and a trivalent naphthalene ring group are more preferable, and a trivalent benzene ring group and a trivalent naphthalene ring group represented by the following formulae are further preferable.

In the following formulae, substituents Y$^{1w}$ and Y$^{2w}$ are shown for the sake of convenience to clearly show a bonding state (Y$^{1w}$ and Y$^{2w}$ have the same meanings as described above, and the same applied to the following).

[Chemical Formula 49]

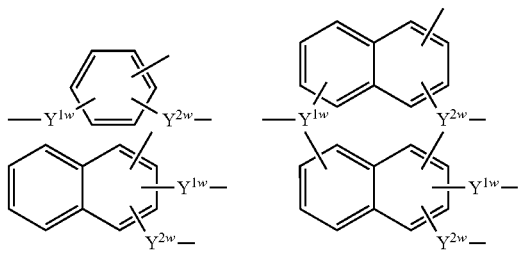

In particular, it is preferable that A$^{1w}$ is a group represented by each of the formulae (A$^w$11) to (A$^w$25), more preferably a group represented by the formula (A$^w$11), (A$^w$13), (A$^w$15), (A$^w$19), or (A$^w$23), and particularly preferably a group represented by the formula (A$^w$11) or (A$^w$23)

[Chemical Formula 50]

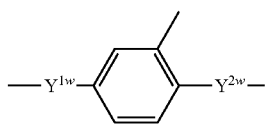

(A$^w$11)

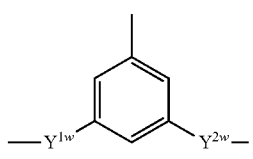

(A$^w$12)

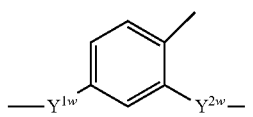

(A$^w$13)

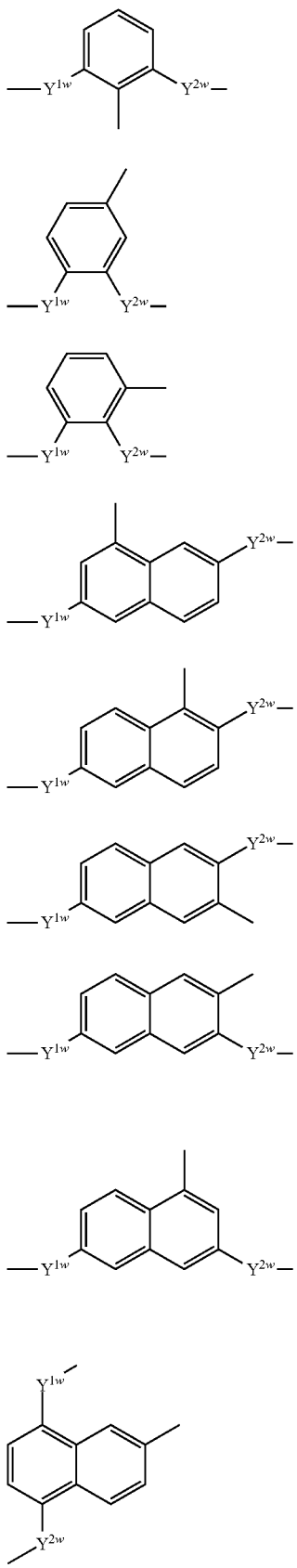

(A^w14)
(A^w15)
(A^w16)
(A^w17)
(A^w18)
(A^w19)
(A^w20)
(A^w21)
(A^w22)

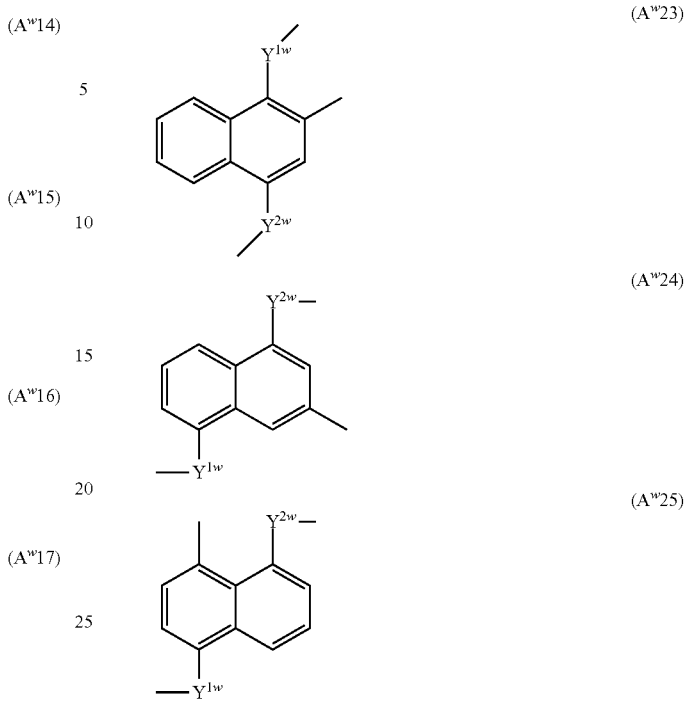

(A^w23)
(A^w24)
(A^w25)

Examples of a substituent that may be included in the trivalent aromatic group of $A^{1w}$ may include those exemplified as the examples of the substituent on the aromatic group of the aforementioned $A^{xw}$. It is preferable that $A^{1w}$ is a trivalent aromatic group having no substituent.

$A^{2w}$ and $A^{3w}$ are each independently a divalent alicyclic hydrocarbon group having 3 to 30 carbon atoms and optionally having a substituent.

Examples of the divalent alicyclic hydrocarbon group having 3 to 30 carbon atoms may include a cycloalkanediyl group having 3 to 30 carbon atoms and a divalent alicyclic condensed ring group having 10 to 30 carbon atoms.

Examples of the cycloalkanediyl group having 3 to 30 carbon atoms may include a cyclopropanediyl group; a cyclobutanediyl group such as a cyclobutane-1,2-diyl group and a cyclobutane-1,3-diyl group; a cyclopentanediyl group such as a cyclopentane-1,2-diyl group and a cyclopentane-1,3-diyl group; a cyclohexanediyl group such as a cyclohexane-1,2-diyl group, a cyclohexane-1,3-diyl group, and a cyclohexane-1,4-diyl group; a cycloheptanediyl group such as a cycloheptane-1,2-diyl group, a cycloheptane-1,3-diyl group, and a cycloheptane-1,4-diyl group; a cyclooctanediyl group such as a cyclooctane-1,2-diyl group, a cyclooctane-1,3-diyl group, a cyclooctane-1,4-diyl group, and a cyclooctane-1,5-diyl group; a cyclodecanediyl group such as a cyclodecane-1,2-diyl group, a cyclodecane-1,3-diyl group, a cyclodecane-1,4-diyl group, and a cyclodecane-1,5-diyl group; a cyclododecanediyl group such as a cyclododecane-1,2-diyl group, a cyclododecane-1,3-diyl group, a cyclododecane-1,4-diyl group, and a cyclododecane-1,5-diyl group; a cyclotetradecanediyl group such as a cyclotetradecane-1,2-diyl group, a cyclotetradecane-1,3-diyl group, a cyclotetradecane-1,4-diyl group, a cyclotetradecane-1,5-diyl group, and a cyclotetradecane-1,7-diyl group; and a cycloeicosanediyl group such as a cycloeicosane-1,2-diyl group and a cycloeicosane-1,10-diyl group.

Examples of the divalent alicyclic condensed ring group having 10 to 30 carbon atoms may include a decalindiyl group such as a decalin-2,5-diyl group and a decalin-2,7-diyl group; an adamantanediyl group such as an adamantane-1,2-diyl group and an adamantane-1,3-diyl group; and a bicyclo[2.2.1]heptanediyl group such as a bicyclo[2.2.1]heptane-2,3-diyl group, a bicyclo[2.2.1]heptane-2,5-diyl group, and a bicyclo[2.2.1]heptane-2,6-diyl group.

The divalent alicyclic hydrocarbon groups may further have a substituent on any position. Examples of the substituent may include those exemplified as the examples of the substituent on the aromatic ring of the aforementioned $A^{xw}$ Among these, it is preferable that $A^{2w}$ and $A^{3w}$ are a divalent alicyclic hydrocarbon group having 3 to 12 carbon atoms, more preferably a cycloalkanediyl group having 3 to 12 carbon atoms, further preferably a group represented by each of the following formulae ($A^{w}31$) to ($A^{w}34$):

[Chemical Formula 51]

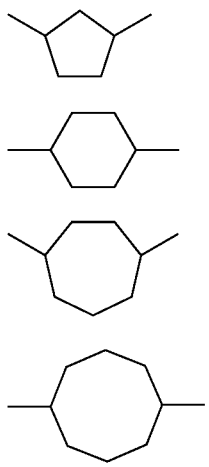

($A^{w}31$)

($A^{w}32$)

($A^{w}33$)

($A^{w}34$)

and particularly preferably the group represented by the formula ($A^{w}32$).

As the divalent alicyclic hydrocarbon group having 3 to 30 carbon atoms, there may exist cis- and trans-stereoisomers on the basis of difference of steric configuration of carbon atom bonded to $Y^{1w}$ and $Y^{3w}$ (or $Y^{2w}$ and $Y^{4w}$). For example, when the group is a cyclohexane-1,4-diyl group, a cis-isomer ($A^{w}32a$) and a trans-isomer ($A^{w}32b$) can exist, as described in the following.

[Chemical Formula 52]

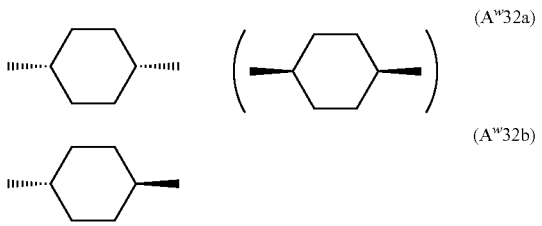

($A^{w}32a$)

($A^{w}32b$)

In the present invention, the group may be a cis-isomer, a trans-isomer, or an isomeric mixture of cis- and trans-isomers. The trans-isomer and the cis-isomer are preferable, and the trans-isomer is more preferable since orientation is favorable.

$A^{4w}$ and $A^{5w}$ are each independently a divalent aromatic group having 6 to 30 carbon atoms and optionally having a substituent.

The aromatic group of $A^{4w}$ and $A^{5w}$ may be monocyclic or polycyclic.

Specific preferable examples of $A^{4w}$ and $A^{5w}$ may include the following groups.

[Chemical Formula 53]

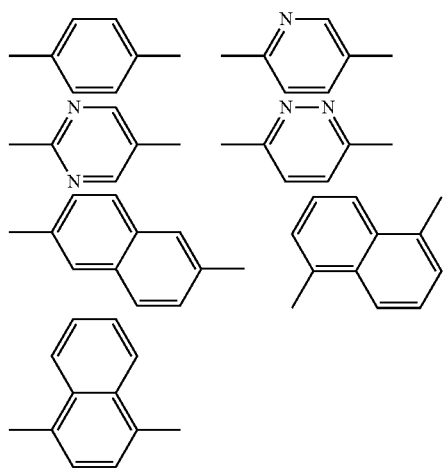

The divalent aromatic group of the aforementioned $A^{4w}$ and $A^{5w}$ may have a substituent on any position. Examples of the substituent may include a halogen atom, a cyano group, a hydroxyl group, an alkyl group having 1 to 6 carbon atoms, an alkoxy group having 1 to 6 carbon atoms, a nitro group, and a —C(=O)—OR$^{8w}$ group. Herein, R$^{8w}$ is an alkyl group having 1 to 6 carbon atoms. Among these, a halogen atom, an alkyl group having 1 to 6 carbon atoms, and an alkoxy group are preferable. Among the halogen atom, a fluorine atom is more preferable, among the alkyl group having 1 to 6 carbon atoms, a methyl group, an ethyl group, and a propyl group are more preferable, and among the alkoxy group, a methoxy group and an ethoxy group are more preferable.

Among these, it is preferable that $A^{4w}$ and $A^{5w}$ are independently a group represented by the following formulae ($A^{w}41$), ($A^{w}42$), and ($A^{w}43$) and that may optionally have a substituent from the viewpoint of favorably expressing the desired effect of the present invention, and the group represented by the formula ($A^{w}41$) and optionally having a substituent is particularly preferable.

[Chemical Formula 54]

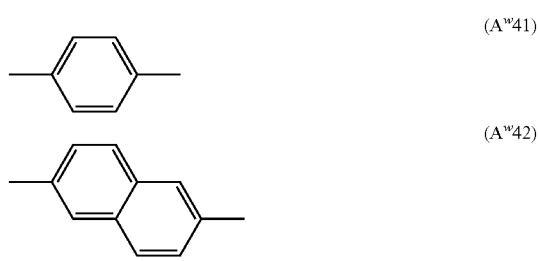

($A^{w}41$)

($A^{w}42$)

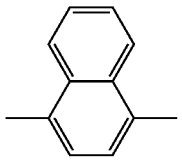

(A$^w$43)

$Q^{1w}$ is a hydrogen atom or an alkyl group having 1 to 6 carbon atoms and optionally having a substituent.

Examples of the alkyl group having 1 to 6 carbon atoms and optionally having a substituent may include those exemplified as the examples regarding the aforementioned $A^{xw}$.

Among these, $Q^{1w}$ is preferably a hydrogen atom or an alkyl group having 1 to 6 carbon atoms, and more preferably a hydrogen atom or a methyl group.

The compound (V) may be produced by, e.g., the following reaction.

[Chemical Formula 55]

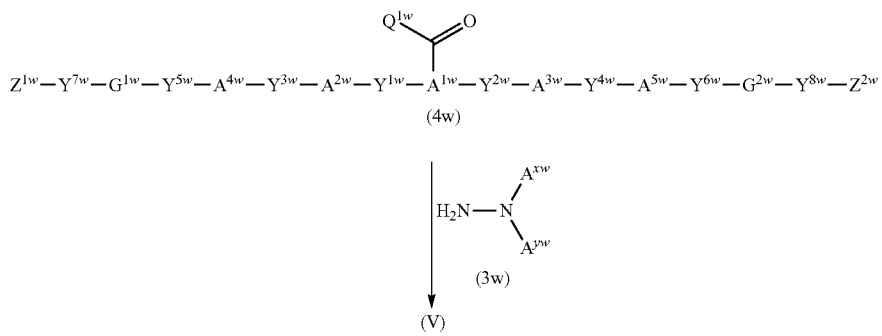

(wherein $Y^{1w}$ to $Y^{8w}$, $G^{1w}$, $G^{2w}$, $Z^{1w}$, $Z^{2w}$, $A^{xw}$, $A^{yw}$, $A^{1w}$ to $A^{5w}$, and $Q^{1w}$ have the same meanings as described above.)

Specifically, a hydrazine compound represented by the formula (3w) (hydrazine compound (3w)) may be reacted with a carbonyl compound represented by the formula (4w) (carbonyl compound (4w)) at a molar ratio of [hydrazine compound (3w):carbonyl compound (4w)] of 1:2 to 2:1, and preferably 1:1.5 to 1.5:1 to highly selectively produce a target compound (V) in high yield.

In this case, an acid catalyst, such as an organic acid such as (±)-10-camphorsulfonic acid and p-toluene sulfonic acid; and an inorganic acid such as hydrochloric acid and sulfuric acid, may be added to perform the reaction. The addition of the acid catalyst may shorten the reaction time and may improve the yield. The amount of the acid catalyst to be added is usually 0.001 to 1 mol relative to 1 mol of the carbonyl compound (4w). The acid catalyst may be added as it is, or in a solution form in which the acid catalyst is dissolved in an appropriate solution.

The solvent used in the reaction is not particularly limited so long as it is inert to the reaction. Examples of the solvent may include an alcohol solvent such as methyl alcohol, ethyl alcohol, n-propyl alcohol, isopropyl alcohol, n-butyl alcohol, isobutyl alcohol, sec-butyl alcohol, and tert-butyl alcohol; an ether solvent such as diethyl ether, tetrahydrofuran, 1,2-dimethoxyethane, 1,4-dioxane, and cyclopentyl methyl ether; an ester solvent such as ethyl acetate, propyl acetate, and methyl propionate; an aromatic hydrocarbon-based solvent such as benzene, toluene, and xylene; an aliphatic hydrocarbon-based solvent such as n-pentane, n-hexane, and n-heptane; an amide-based solvent such as N,N-dimethylformamide, N-methylpyrrolidone, and triamide hexamethylphosphate; a sulfur-containing solvent such as dimethyl sulfoxide and sulfolane; and a mixed solvent of two or more types thereof.

Among these, the alcohol solvent, the ether solvent, and a mixed solvent of the alcohol solvent and the ether solvent are preferable.

The amount of the solvent to be used is not particularly limited, and may be appropriately determined in consideration of type of compound to be used and reaction scale. The amount is usually 1 to 100 g relative to 1 g of the hydrazine compound (3w).

The reaction smoothly proceeds in a temperature range of −10° C. to the boiling point of the solvent to be used. The reaction time of each reaction may vary depending on the reaction scale, and is usually several minutes to several hours.

The hydrazine compound (3w) may be produced as follows.

[Chemical Formula 56]

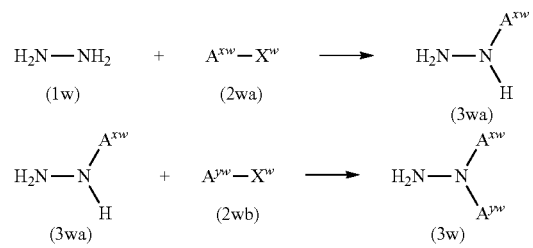

(wherein $A^{xw}$ and $A^{yw}$ have the same meanings as described above. $X^w$ is a leaving group such as a halogen atom, a methanesulfonyloxy group, and a p-toluenesulfonyloxy group.)

Specifically, a compound represented by the formula (2wa) may be reacted with hydrazine (1w) in an appropriate solvent at a molar ratio of (compound (2wa) hydrazine (1w)) of 1:1 to 1:20, and preferably 1:2 to 1:10, to obtain a corresponding hydrazine compound (3wa). Further, the hydrazine compound (3wa) may be reacted with a compound represented by the formula (2wb) to obtain the hydrazine compound (3w).

As hydrazine (1w), hydrazine monohydrate is usually used. As hydrazine (1w), a commercially available product may be used as it is.

The solvent used in the reaction is not particularly limited as long as it is inert to the reaction. Examples of the solvent may include an alcohol solvent such as methyl alcohol, ethyl alcohol, n-propyl alcohol, isopropyl alcohol, n-butyl alcohol, isobutyl alcohol, sec-butyl alcohol, and tert-butyl alcohol; an ether solvent such as diethyl ether, tetrahydrofuran, 1,2-dimethoxyethane, 1,4-dioxane, and cyclopentyl methyl ether; an aromatic hydrocarbon-based solvent such as benzene, toluene, and xylene; an aliphatic hydrocarbon-based solvent such as n-pentane, n-hexane, and n-heptane; an amide-based solvent such as N,N-dimethylformamide, N-methylpyrrolidone, and triamide hexamethylphosphate; a sulfur-containing solvent such as dimethyl sulfoxide and sulfolane; and a mixed solvent of two or more types thereof.

Among these, the alcohol solvent, the ether solvent, and a mixed solvent of the alcohol solvent and the ether solvent are preferable.

The amount of the solvent to be used is not particularly limited, and may be appropriately determined in consideration of type of compound to be used and reaction scale. The amount is usually 1 to 100 g relative to 1 g of hydrazine.

The reaction smoothly proceeds in a temperature range of −10° C. to the boiling point of the solvent to be used. The reaction time of each reaction may vary depending on the reaction scale, and is usually several minutes to several hours.

The hydrazine compound (3w) may also be produced by reducing a diazonium salt (5w) through a publicly known method, as described in the following.

[Chemical Formula 57]

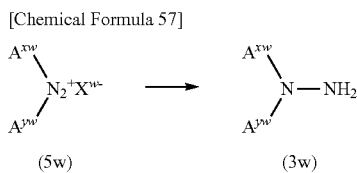

In the formula (5), $A^{xw}$ and $A^{yw}$ have the same meanings as described above. $X^{w-}$ is an anion that is a counter ion of diazonium. Examples of $X^{w-}$ may include an inorganic anion such as a hexafluorophosphate ion, a fluoroborate ion, a chloride ion, and a sulfate ion; and an organic anion such as a polyfluoroalkyl carboxylate ion, a polyfluoroalkyl sulfonate ion, a tetraphenyl borate ion, an aromatic carboxylate ion, and an aromatic sulfonate ion.

Examples of the reducing agent used in the reaction may include a metal salt reducing agent.

The metal salt reducing agent is generally a compound containing low-valent metal or a compound having a metal ion and a hydride source (see "Yuki Gosei Jikken-hou Handbook (Organic synthesis experimental method handbook)", 1990, edited by The Society of Synthetic Organic Chemistry, Japan, published by Maruzen Co., Ltd., p. 810).

Examples of the metal salt reducing agent may include $NaAlH_4$, $NaAlH_p(Or)_q$ (wherein p and q are each independently an integer of 1 to 3, p+q is 4, and r is an alkyl group having 1 to 6 carbon atoms), $LiAlH_4$, $iBu_2AlH$, $LiBH_4$, $NaBH_4$, $SnCl_2$, $CrCl_2$, and $TiCl_3$.

In the reduction reaction, a known reaction condition may be adopted. For example, the reaction may be carried out under a condition described in Publications such as Japanese Patent Application Laid-Open No. 2005-336103 A, "Shin Jikken Kagaku Koza (New course of experimental chemistry)", 1978, published by Maruzen Co., Ltd., vol. 14, and "Jikken Kagaku Koza (Course of experimental chemistry)", 1992, published by Maruzen Co., Ltd., vol. 20.

The diazonium salt (5w) may be produced from a compound such as aniline by a conventional method.

The carbonyl compound (4w) may be typically produced by appropriately bonding and modifying a plurality of known compounds having a desired structure through any combination of reactions of forming an ether linkage (—O—), an ester linkage (—C(=O)—O— and —O—C (=O)—), a carbonate linkage (—O—C(=O)—O—), and an amide linkage (—C(=O)NH— and —NH—C(=O)—).

An ether linkage may be formed, e.g., as follows.

(i) A compound represented by the formula: D1-hal (hal represents a halogen atom, and the same applies to the following) and a compound represented by the formula: D2-OMet (Met represents an alkaline metal (mainly sodium), and the same applies to the following) are mixed and condensed (Williamson synthesis). In the formulae, D1 and D2 are optional organic groups (the same applies to the following).

(ii) A compound represented by the formula: D1-hal and a compound represented by the formula: D2-OH are mixed in the presence of a base such as sodium hydroxide or potassium hydroxide and condensed.

(iii) A compound represented by the formula: D1-J (J represents an epoxy group) and a compound represented by the formula: D2-OH are mixed in the presence of a base such as sodium hydroxide or potassium hydroxide and condensed.

(iv) A compound represented by the formula: D1-OFN (OFN represents a group having an unsaturated bond) and a compound represented by the formula: D2-OMet are mixed in the presence of a base such as sodium hydroxide or potassium hydroxide and subjected to an addition reaction.

(v) A compound represented by the formula: D1-hal and a compound represented by the formula: D2-OMet are mixed in the presence of copper or cuprous chloride and condensed (Ullmann condensation).

An ester linkage and an amide linkage may be formed, e.g., as follows.

(vi) A compound represented by the formula: D1-COOH and a compound represented by the formula: D2-OH or $D2-NH_2$ are subjected to dehydration condensation in the presence of a dehydration condensation agent (N,N-dicyclohexylcarbodiimide, etc.).

(vii) A compound represented by the formula: D1-COOH is reacted with a halogenating agent to obtain a compound represented by the formula: D1-CO-hal, and the compound is reacted with a compound represented by the formula: D2-OH or $D2-NH_2$ in the presence of a base.

(viii) A compound represented by the formula: D1-COOH is reacted with an acid anhydride to obtain a mixed acid anhydride, and the mixed acid anhydride is reacted with a compound represented by the formula: D2-OH or $D2-NH_2$.

(ix) A compound represented by the formula: D1-COOH and a compound represented by the formula: D2-OH or $D2-NH_2$ are subjected to dehydration condensation in the presence of an acid catalyst or a base catalyst.

The carbonyl compound (4w) of the present invention may be more specifically produced through a process shown in the following reaction formula.

[Chemical Formula 58]

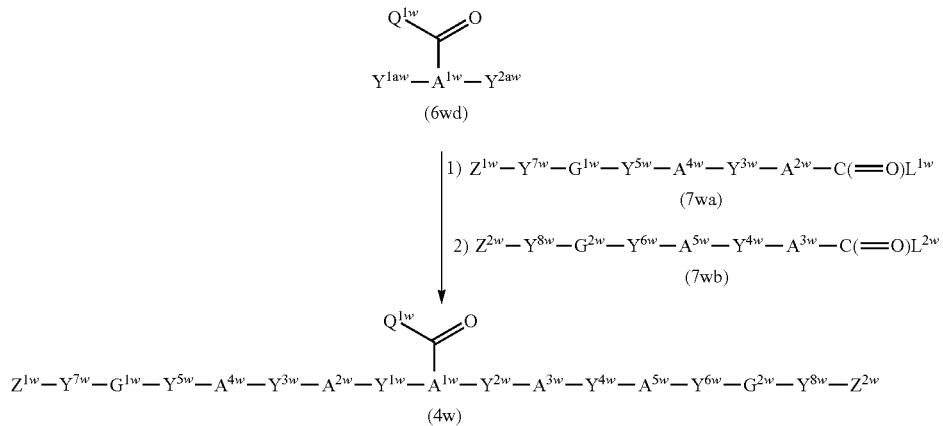

(wherein $Y^{1w}$ to $Y^{8w}$, $G^{1w}$, $G^{2w}$, $Z^{1w}$, $Z^{2w}$, $A^{1w}$ to $A^{5w}$, and $Q^{1w}$ have the same meanings as described above. $L^{1w}$ and $L^{2w}$ are a leaving group such as a hydroxyl group, a halogen atom, a methanesulfonyloxy group, and a p-toluenesulfonyloxy group. —$Y^{1aw}$ is a group that forms —$Y^{1w}$— as a result of the reaction with -$L^{1w}$, and —$Y^{2aw}$ is a group that forms —$Y^{2w}$— as a result of the reaction with -$L^{2w}$.)

That is, by using a publicly known reaction of forming an ether linkage (—O—), an ester linkage (—C(=O)—O— and —O—C(=O)—), or a carbonate linkage (—O—C(=O)—O—), the carbonyl compound (4w) of the present invention may be produced by reacting a compound represented by the formula (6wd) with a compound represented by the formula (7wa) and then reacting with a compound represented by the formula (7wb).

More specifically, a method for producing a compound (4w') wherein $Y^{1w}$ is a group represented by a $Y^{11w}$C(=O)—O— group and a group represented by a formula of $Z^{2w}$—$Y^{8w}$-$G^{2w}$-$Y^{6w}$-$A^{5w}$-$Y^{4w}$-$A^{3w}$-$Y^{2w}$— is the same as a group represented by a formula of $Z^{1w}$—$Y^{7w}$-$G^{1w}$-$Y^{5w}$-$A^{4w}$-$Y^{3w}$-$A^{2w}$-$Y^{1w}$— is as follows.

[Chemical Formula 59]

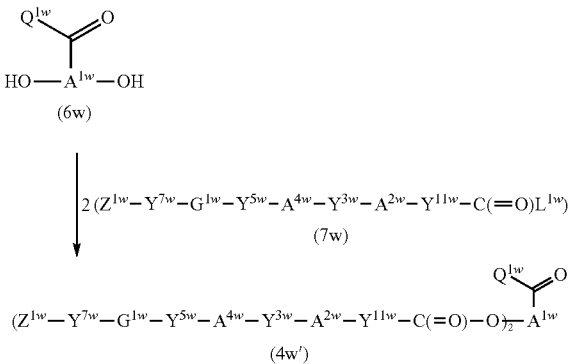

(wherein $Y^{3w}$, $Y^{5w}$, $Y^{7w}$, $G^{1w}$, $Z^{1w}$, $A^{1w}$, $A^{2w}$, $A^{4w}$, $Q^{1w}$, and $L^{1w}$ have the same meanings as described above. $Y^{11}$ is a group having a structure such that $Y^{11w}$—C(=O)—O— corresponds to $Y^{1w}$. $Y^{1w}$ has the same meanings as described above.)

In the reaction, a dihydroxy compound represented by the formula (6w) (compound (6w)) may be reacted with a compound represented by the formula (7w) (compound (7w)) at a molar ratio of (compound (6w):compound (7w)) of 1:2 to 1:4, and preferably 1:2 to 1:3 to highly selectively produce a target compound (4w') in high yield.

When the compound (7w) is a compound in which $L^{1w}$ in the formula (7w) is a hydroxyl group (carboxylic acid), the reaction may be carried out in the presence of a dehydration condensation agent such as 1-ethyl-3-(3-dimethylaminopropyl)carbodiimide hydrochloride or dicyclohexyl carbodiimide to obtain a target compound.

The amount of the dehydration condensation agent to be used is usually 1 to 3 mol relative to 1 mol of the compound (7w).

When the compound (7w) is a compound in which $L^{1w}$ in the formula (7w) is a hydroxyl group (carboxylic acid), the reaction may be carried out in the presence of sulfonyl halide such as methanesulfonyl chloride or p-toluenesulfonyl chloride and a base such as triethylamine, diisopropylethylamine, pyridine, or 4-(dimethylamino)pyridine, to obtain a target compound.

The amount of the sulfonyl halide to be used is usually 1 to 3 mol relative to 1 mol of the compound (7w).

The amount of the base to be used is usually 1 to 3 mol relative to 1 mol of the compound (7w).

In this case, the compound in which $L^{1w}$ in the formula (7w) is a sulfonyloxy group (mixed acid anhydride) may be isolated, to perform the subsequent reaction.

When the compound (7w) is a compound in which $L^{1w}$ in the formula (7w) is a halogen atom (acid halide), the reaction may be carried out in the presence of a base to obtain a target compound.

Examples of the base for use may include an organic base such as triethylamine and pyridine; and an inorganic base such as sodium hydroxide, sodium carbonate, and sodium hydrogen carbonate.

The amount of the base to be used is usually 1 to 3 mol relative to 1 mol of the compound (7w).

Examples of the solvent used in the reaction may include a chlorinated solvent such as chloroform and methylene chloride; an amide-based solvent such as N-methyl pyrrolidone, N,N-dimethyl formamide, N,N-dimethyl acetamide, and triamide hexamethylphosphate; an ether such as 1,4-dioxane, cyclopentyl methyl ether, tetrahydrofuran, tetrahydropyran, and 1,3-dioxolan; a sulfur-containing solvent such as dimethyl sulfoxide and sulfolane; an aromatic hydrocarbon-based solvent such as benzene, toluene, and xylene; an aliphatic hydrocarbon-based solvent such as n-pentane, n-hexane, and n-octane; an alicyclic hydrocarbon-based solvent such as cyclopentane and cyclohexane; and a mixed solvent of two or more types thereof.

The amount of the solvent to be used is not particularly limited, and may be appropriately determined in consideration of type of compound to be used and reaction scale. The amount is usually 1 to 50 g relative to 1 g of the hydroxy compound (6).

Many of the compounds (6w) are known substances, and may be produced by a known method.

For example, the compound (6w) may be produced by a process shown in the following reaction formula (see WO2009/042544 and the Journal of Organic Chemistry, 2011, 76, 8082-8087). A product commercially available as the compound (6w) may also be used with optional purification process.

[Chemical Formula 60]

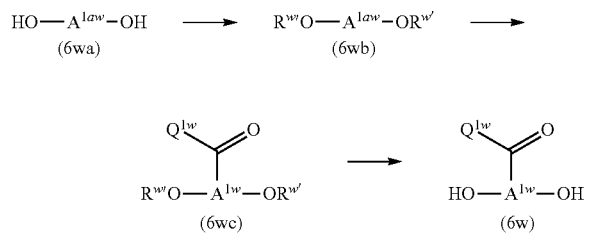

(wherein $A^{1w}$ and $Q^{1w}$ have the same meanings as described above, $A^{1aw}$ represents a divalent aromatic group that is formylated or acylated to form $A^{11w}$, and $R^{w'}$ represents a protecting group of a hydroxyl group such as an alkyl group having 1 to 6 carbon atoms such as a methyl group and an ethyl group and an alkoxyalkyl group having 2 to 6 carbon atoms such as a methoxymethyl group.)

Specifically, the hydroxyl groups in the dihydroxy compound (1,4-dihydroxybenzene, 1,4-dihydroxynaphthalene, etc.) represented by the formula (6wa) may be alkylated to obtain a compound represented by the formula (6wb), the ortho position of the $OR^{w'}$ group may be formylated or acylated by a known method to obtain a compound represented by the formula (6wc), and the compound may be deprotected (dealkylated) to obtain the target compound (6w).

The product commercially available as the compound (6w) may be used as it is or if desired, with purification.

Many of the compounds (7w) are known compounds, and may be produced by appropriately bonding and modifying a plurality of known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NH—C(=O)—).

For example, when the compound (7w) is a compound represented by the following formula (7w') (compound (7w')), the compound (7w) may be produced as follows, using a dicarboxylic acid represented by the formula (9w') (compound (9w')).

[Chemical Formula 61]

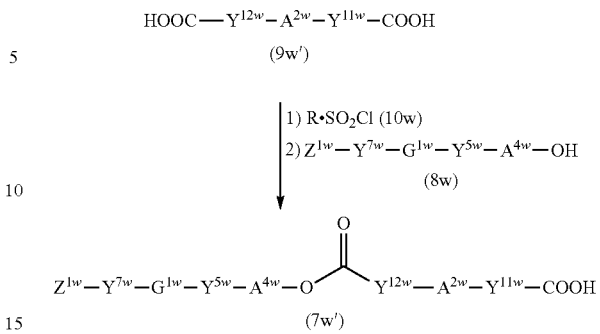

(wherein $Y^{5w}$, $Y^{7w}$, $G^{1w}$, $Z^{1w}$, $A^{2w}$, $A^{4w}$, and $Y^{11w}$ have the same meanings as described above. $Y^{12w}$ is a group having a structure such that —O—C(=O)—$Y^{12w}$ corresponds to $Y^{3w}$. $R^w$ is an alkyl group such as a methyl group and an ethyl group; or an aryl group optionally having a substituent such as a phenyl group and a p-methylphenyl group.)

The compound (9w') is first reacted with sulfonyl chloride represented by the formula (10w) in the presence of a base such as triethylamine or 4-(dimethylamino)pyridine.

Subsequently, to the reaction mixture, a compound (8w) and a base such as triethylamine or 4-(dimethylamino) pyridine are added to carry out a reaction.

The amount of the sulfonyl chloride to be used is usually 0.5 to 0.7 equivalent weight relative to 1 equivalent weight of the compound (9w').

The amount of the compound (8w) to be used is usually 0.5 to 0.6 equivalent weight relative to 1 equivalent weight of the compound (9w').

The amount of the base to be used is usually 0.5 to 0.7 equivalent weight relative to 1 equivalent weight of the compound (3w).

The reaction temperature is 20 to 30° C., and the reaction time may vary depending on the reaction scale, or the like, and is several minutes to several hours.

Examples of the solvent used in the reaction may include those exemplified as the examples of the solvent that may be used for production of the compound (4w'). Among these, ethers are preferable.

The amount of the solvent to be used is not particularly limited, and may be appropriately determined in consideration of type of compound to be used and reaction scale. The amount is usually 1 to 50 g relative to 1 g of the hydrazine compound (9w').

In any of the reactions, a usual post-treatment operation in organic synthesis chemistry may be carried out after completion of the reactions, and if desired, a known separation and purification operation such as column chromatography, recrystallization, and distillation may be carried out to isolate a target compound.

The structure of the target compound may be identified by, e.g., measurements such as of NMR spectrometry, IR spectrometry, and mass spectrometry, as well as elemental analysis.

[1.5. Polymerizable Monomer]

The composition (A) contains a polymerizable monomer. In this application, "polymerizable monomer" is, among compounds that have polymerization ability and thus have capability of acting as a monomer, a compound that is particularly other than the polymerizable liquid crystal compound with reverse wavelength dispersion.

As the polymerizable monomer, e.g., a compound having one or more polymerizable groups per one molecule may be used. By having such a polymerizable group, polymerization can be achieved in formation of an optically anisotropic layer. When the polymerizable monomer is a crosslinkable monomer having two or more polymerizable groups per one molecule, a cross-linking polymerization can be achieved. Examples of the polymerizable groups may include groups that are the same as the groups of $Z^1$—$Y^5$— and $Z^2$—$Y^6$— in the compound (I), and specifically an acryloyl group, a methacryloyl group, and an epoxy group.

The polymerizable monomer usually has one or more mesogens per one molecule, and is capable of being polymerized together with the polymerizable liquid crystal compound with reverse wavelength dispersion in formation of the optically anisotropic layer. In the optically anisotropic layer formed by such polymerization, the mesogen of the polymerizable monomer usually has wavelength dispersion property of birefringence Δn that is different from that of the polymerizable liquid crystal compound with reverse wavelength dispersion.

In a preferred embodiment, the mesogen of the polymerizable monomer may be a mesogen that is capable of being oriented in parallel to any one of the main chain mesogen and the side chain mesogen of the polymerizable liquid crystal compound with reverse wavelength dispersion. For example, the polymerizable monomer may have a mesogen of a structure similar to one of the main chain mesogen and the side chain mesogen of the polymerizable liquid crystal compound with reverse wavelength dispersion. By having such a mesogen, the polymerizable monomer can have wavelength dispersion property of birefringence Δn that is different from that of the polymerizable liquid crystal compound with reverse wavelength dispersion, and can be oriented in parallel to the main chain mesogen or the side chain mesogen of the polymerizable liquid crystal compound with reverse wavelength dispersion.

Examples of the polymerizable monomer may include a compound represented by the following formula (II) and a compound represented by the following formula (III) (they may be referred to hereinbelow as "compound (II)" and "compound (III), respectively").

[Chemical Formula 62]

$$Z^1-Y^5-G^1-Y^3-A^2-Y^1-\overset{\overset{R^{10}}{|}}{A^1}-Y^2-A^3-Y^4-G^2-Y^6-Z^2 \quad \text{(II)}$$

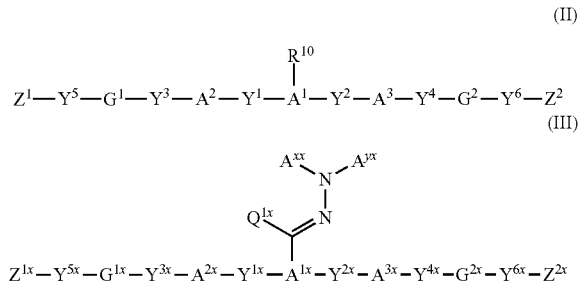

(III)

$$Z^{1x}-Y^{5x}-G^{1x}-Y^{3x}-A^{2x}-Y^{1x}-A^{1x}-Y^{2x}-A^{3x}-Y^{4x}-G^{2x}-Y^{6x}-Z^{2x}$$

In the formula (II), $Y^1$ to $Y^6$, $G^1$, $G^2$, $Z^1$, $Z^2$, and $A^1$ to $A^3$ each have the same meanings as described in description of the formula (I). $R^{10}$ is a hydrogen atom or a methyl group. $Y^1$ to $Y^6$, $G^1$, $G^2$, $Z^1$, $Z^2$, and $A^1$ to $A^3$ in the structure of the compound (II) may be the same as or different from corresponding groups in the co-used compound (I).

It is preferable that the mesogen moiety and the polymerizable group moiety of the compound (II) are the same as those in the co-used compound (I) in view of obtaining favorable orientation. Specifically, it is preferable that $Y^1$ to $Y^6$, $Z^1$, $Z^2$, and $A^1$ to $A^3$ in the compound (II) are in common with those in the compound (I).

$Y^{1x}$ to $Y^{6x}$, $G^{1x}$, $G^{2x}$, $Z^{1x}$, $Z^{2x}$, $A^{xx}$, $A^{yx}$, $A^{1x}$ to $A^{3x}$, and $Q^{1x}$ in the formula (III) have the same meanings as $Y^1$ to $Y^6$, $G^1$, $G^2$, $Z^1$, $Z^2$, $A^x$, $A^y$, $A^1$ to $A^3$, and $Q^1$, respectively, in the formula (I). However, at least one of them is different from the corresponding group in the co-used compound (I).

Specific examples of the compound (III) may include compounds in which $Y^{1x}$ to $Y^{6x}$, $G^{1x}$, $G^{2x}$, $Z^{1x}$, $Z^{2x}$, $A^{xx}$, $A^{yx}$, $A^{2x}$ to $A^{3x}$, and $Q^{1x}$ in the formula (III) are the same as $Y^1$ to $Y^6$, $G^1$, $G^2$, $Z^1$, $Z^2$, $A^x$, $A^y$, $A^2$ to $A^3$, and $Q^1$, respectively, in the co-used compound (I) and $A^{1x}$ is different from $A^1$ in the co-used compound (I). Specific examples of combination of the compound (I) and the compound (III) may include a combination of the compounds (I) and (III) in which $A^1$ in the compound (I) is a group represented by the following formula (A25), $A^{1x}$ in the compound (III) is a group represented by the following formula (A26), and other groups are the same as described above.

In the following, $A^1$ and $A^{1x}$ are shown with $Y^1$ and $Y^2$ for the sake of convenience of illustration.

[Chemical Formula 63]

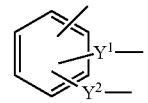

(A25)

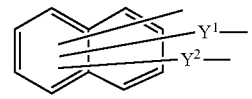

(A26)

When the polymerizable monomer is the compound (II), the —$Y^3$-$A^2$-$Y^1$-$A^1(R^{10})$—$Y^2$-$A^3$-$Y^4$— group acts as a mesogen. When the polymerizable monomer is the compound (III), the —$Y^{3x}$-$A^{2x}$-$Y^{1x}$-$A^{1x}$-$Y^{2x}$-$A^{3x}$-$Y^{4x}$— group and the >$A^{1x}$-$C(Q^{1x})$=N—N($A^{xx}$)$A^{yx}$ group acts as mesogens.

Specific examples of the compound (II) may include a compound represented by the following formula (II)-1.

[Chemical Formula 64]

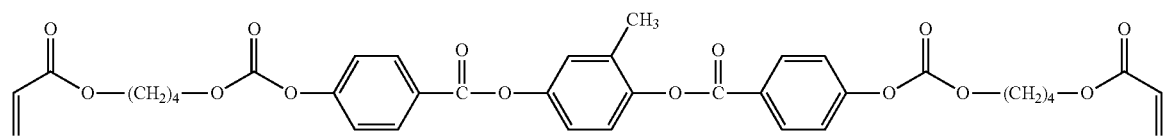

(II)-1

Specific examples of the compound (III) may include compounds represented by the following formulae (III)-1 to (III)-4.
[Chemical Formula 65]
(III)-1
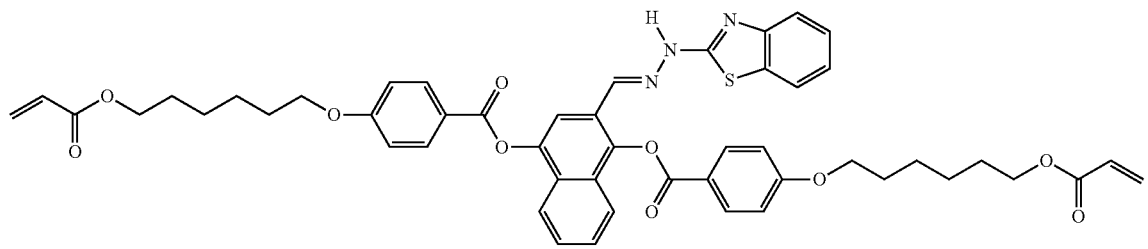
(III)-2
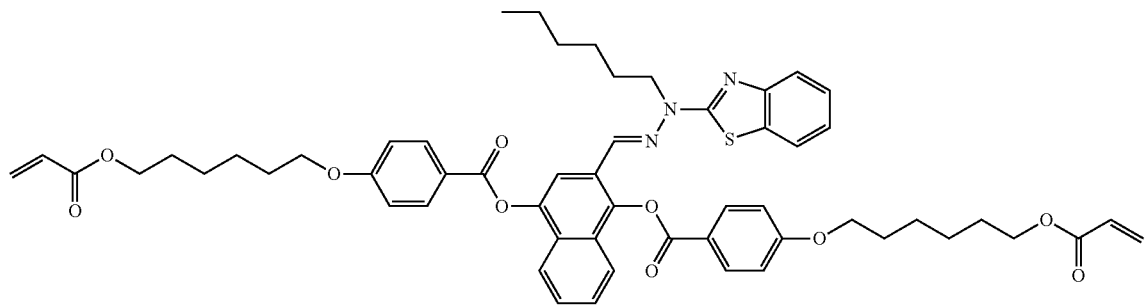
(III)-3
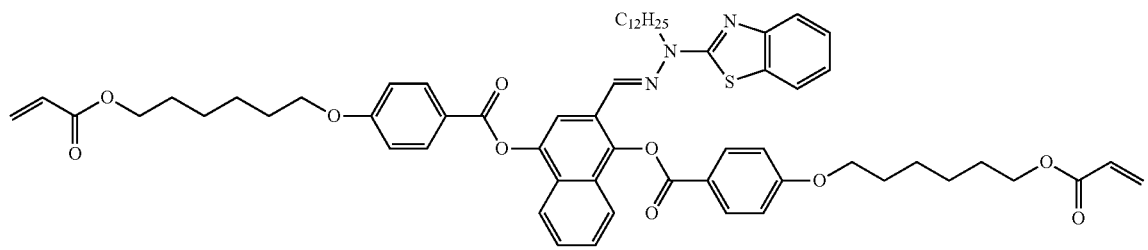
(III)-4
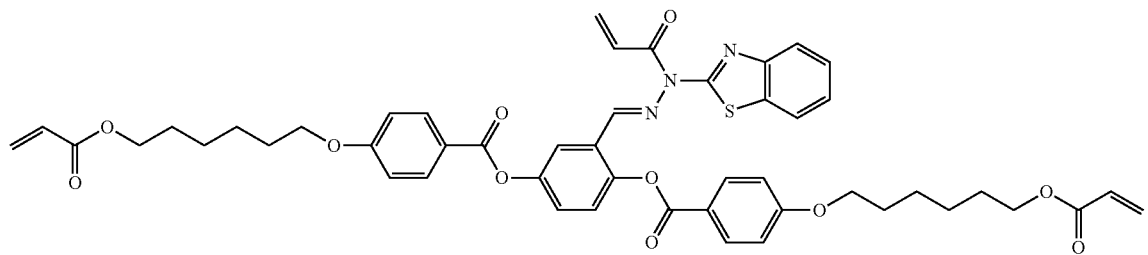

Other examples of the polymerizable monomer may include a compound represented by the following formula (IV) (this may be referred to hereinbelow as "compound (IV)").

[Chemical Formula 66]

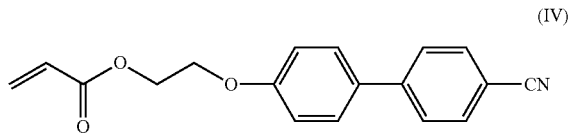

(IV)

The polymerizable monomer itself may have liquid crystallinity or may have non-liquid crystallinity. It is preferable that the polymerizable monomer is a monomer having non-liquid crystallinity, and it is particularly preferable that the monomer is the compound (III) having non-liquid crystallinity.

Herein, "non-liquid crystallinity" of the compound itself means that when the polymerizable monomer itself is left at any temperature of room temperature to 200° C., the monomer does not exhibit orientation on a substrate subjected to an orientation treatment. The presence or absence of orientation is determined by the presence or absence of light-dark contrast when a rubbing direction is rotated in a plane in cross-Nicol transmission observation with a polarizing microscope.

The ratio of the polymerizable monomer in the composition (A) is usually 1 to 100 parts by weight, and preferably 5 to 50 parts by weight, relative to 100 parts by weight of the polymerizable liquid crystal compound with reverse wavelength dispersion. When the ratio of the polymerizable monomer is appropriately adjusted to the range so as to exhibit desired reverse wavelength dispersion property, the reverse wavelength dispersion property can be easily controlled with precision.

The polymerizable monomer may be produced by a known production method. When the polymerizable monomer has a structure similar to the compound (I), it may be produced in accordance with the method for producing the compound (I).

[1.6. Other Components in Composition (A)]

In addition to the polymerizable liquid crystal compound with reverse wavelength dispersion and the polymerizable monomer, the composition (A) may contain an optional component such as those exemplified in the following, if necessary.

The composition (A) may contain an optional monomer copolymerizable with the polymerizable liquid crystal compound with reverse wavelength dispersion.

Examples of the optional monomer may include 4'-methoxyphenyl 4-(2-methacryloyloxyethyloxy)benzoate, biphenyl 4-(6-methacryloyloxyhexyloxy)benzoate, 4'-cyanobiphenyl 4-(2-acryloyloxyethyloxy)benzoate, 4'-cyanobiphenyl 4-(2-methacryloyloxyethyloxy)benzoate, 3',4'-difluorophenyl 4-(2-methacryloyloxyethyloxy)benzoate, naphthyl 4-(2-methacryloyloxyethyloxy)benzoate, 4-acryloyloxy-4'-decylbiphenyl, 4-acryloyloxy-4'-cyanobiphenyl, 4-(2-acryloyloxyethyloxy)-4'-cyanobiphenyl, 4-(2-methacryloyloxyethyloxy)-4'-methoxybiphenyl, 4-(2-methacryloyloxyethyloxy)-4'-(4''-fluorobenzyloxy)-biphenyl, 4-acryloyloxy-4'-propylcyclohexylphenyl, 4-methacryloyl-4'-butylbicyclohexyl, 4-acryloyl-4'-amyltolan, 4-acryloyl-4'-(3,4-difluorophenyl)bicyclohexyl, 4-amylphenyl 4-(2-acryloyloxyethyloxy)benzoate, and 4-(4'-propylcyclohexyl)phenyl 4-(2-acyloyloxyethyl)benzoate.

As a commercially available product, LC-242 (product available from BASF) may be used. Compounds disclosed in Japanese Patent Application Laid-Open No. 2007-002208 A, Japanese Patent Application Laid-Open No. 2009-173893 A, Japanese Patent Application Laid-Open No. 2009-274984 A, Japanese Patent Application Laid-Open No. 2010-030979 A, Japanese Patent Application Laid-Open No. 2010-031223 A, and Japanese Patent Application Laid-Open No. 2011-006360 A may also be used.

When the composition (A) contains an optional monomer, the ratio of the optional monomer is preferably less than 50% by weight, and more preferably 30% by weight or less, relative to the total of the polymerizable liquid crystal compound with reverse wavelength dispersion, the polymerizable monomer, and the optional monomer. The lower limit of ratio of the optional monomer may be 0% by weight. When it falls within the range, the resulting optically anisotropic layer can have a high glass transition temperature (Tg), and high membrane hardness can be achieved. Therefore, this is preferable.

The composition (A) may contain a polymerization initiator. The polymerization initiator may be appropriately selected in accordance with the type of polymerizable group in the polymerizable liquid crystal compound with reverse wavelength dispersion, the polymerizable monomer, and the other polymerizable compound in the composition (A). For example, when the polymerizable group is radically polymerizable, a radical polymerization initiator may be used. When the polymerizable group is anionically polymerizable, an anionic polymerization initiator may be used. When the polymerizable group is cationically polymerizable, a cationic polymerization initiator may be used.

As the radical polymerization initiator, any of a thermal radical generator that is a compound that generates by heating an active species capable of initiating polymerization of the polymerizable compound; and a photoradical generator that is a compound that generates active species capable of initiating polymerization of the polymerizable compound by exposure to exposure light such as visible light, ultraviolet light (i-line, etc.), far-ultraviolet light, electron beam, and X-ray may be used. The photoradical generator is suitably used.

Examples of the photoradical generator may include an acetophenone-based compound, a biimidazole-based compound, a triazine-based compound, an O-acyl oxime-based compound, an onium salt-based compound, a benzoin-based compound, a benzophenone-based compound, an α-diketone-based compound, a polynuclear quinone-based compound, a xanthone-based compound, a diazo-based compound, and an imide sulfonate-based compound. These compounds serve as a component that generates one or both of active radical and active acid by the light exposure. One type of the photoradical generator may be used alone, or two or more types thereof may be used in combination.

Specific examples of the acetophenone-based compound may include 2-hydroxy-2-methyl-1-phenylpropan-1-one, 2-methyl-1-[4-(methylthio)phenyl]-2-morpholinopropan-1-one, 2-benzyl-2-dimethylamino-1-(4-morpholinophenyl)-butan-1-one, 1-hydroxycyclohexyl phenyl ketone, 2,2-dimethoxy-1,2-diphenylethan-1-one, 1,2-octanedione, and 2-benzyl-2-dimethylamino-4'-morpholinobutylphenone.

Specific examples of the biimidazole-based compound may include 2,2'-bis(2-chlorophenyl)-4,4',5,5'-tetrakis(4-ethoxycarbonylphenyl)-1,2'-biimidazole, 2,2'-bis(2-bromophenyl)-4,4',5,5'-tetrakis(4-ethoxycarbonylphenyl)-1,2'- biimidazole, 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2-bromophenyl)-4,4',5,5'-tetraphenyl-1,2'-biimidazole, 2,2'-bis(2,4-dibromophenyl)-4,4',5,5'-tetraphenyl-1,2'-biimidazole, and 2,2'-bis(2,4,6-tribromophenyl)-4,4',5,5'-tetraphenyl-1,2'-biimidazole.

When the biimidazole-based compound is used as the photopolymerization initiator, it is preferable that a hydrogen donor is used in combination because the sensitivity is further improved.

"Hydrogen donor" means a compound capable of donating a hydrogen atom to a radical generated from the biimidazole-based compound by light exposure. It is preferable that the hydrogen donor is a mercaptane-based compound or an amine-based compound, which will be defined as follows.

Examples of the mercaptane-based compound may include 2-mercaptobenzothiazole, 2-mercaptobenzoxazole, 2-mercaptobenzimidazole, 2,5-dimercapto-1,3,4-thiadizole, and 2-mercapto-2,5-dimethylaminopyridine. Examples of the amine-based compound may include 4,4'-bis(dimethylamino)benzophenone, 4,4'-bis(diethylamino)benzophenone, 4-diethylaminoacetophenone, 4-dimethylaminopropiophenone, ethyl-4-dimethylaminobenzoate, 4-dimethylaminobenzoic acid, and 4-dimethylaminobenzonitrile.

Examples of the triazine-based compound may include a triazine-based compound having a halomethyl group such as 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, and 2-(4-n-butoxyphenyl)-4,6-bis(trichloromethyl)-s-triazine.

Specific examples of the O-acyl oxime-based compound may include 1-[4-(phenylthio)phenyl]-heptane-1,2-dione 2-(O-benzoyloxime), 1-[4-(phenylthio)phenyl]-octane-1,2-dione 2-(O-benzoyloxime), 1-[4-(benzoyl)phenyl]-octane-1,2-dione 2-(O-benzoyloxime), 1-[9-ethyl-6-(2-methylbenzoyl)-9H-carbazol-3-yl]-ethanone 1-(O-acetyloxime), 1-[9-ethyl-6-(3-methylbenzoyl)-9H-carbazol-3-yl]-ethanone 1-(O-acetyloxime), 1-(9-ethyl-6-benzoyl-9H-carbazol-3-yl)-ethanone 1-(O-acetyloxime), ethanone-1-[9-ethyl-6-(2-methyl-4-tetrahydrofuranylbenzoyl)-9.H.-carbazol-3-yl]-1-(O-acetyloxime), ethanone-1-[9-ethyl-6-(2-methyl-4-tetrahydropyranylbenzoyl)-9.H.-carbazol-3-yl]-1-(O-acetyloxime), ethanone-1-[9-ethyl-6-(2-methyl-5-tetrahydrofuranylbenzoyl)-9.H.-carbazol-3-yl]-1-(O-acetyloxime), ethanone-1-[9-ethyl-6-(2-methyl-5-tetrahydropyranylbenzoyl)-9.H.-carbazol-3-yl]-1-(0-acetyloxime), ethanone-1-[9-ethyl-6-{2-methyl-4-(2,2-dimethyl-1,3-dioxolanyl)benzoyl}-9.H.-carbazol-3-yl]-1-(O-acetyloxime), ethanone-1-[9-ethyl-6-(2-methyl-4-tetrahydrofuranylmethoxybenzoyl)-9.H.-carbazol-3-yl]-1-(O-acetyloxime), ethanone-1-[9-ethyl-6-(2-methyl-4-tetrahydropyranylmethoxybenzoyl)-9.H.-carbazol-3-yl]-1-(O-acetyloxime), ethanone-1-[9-ethyl-6-(2-methyl-5-tetrahydrofuranylmethoxybenzoyl)-9.H.-carbazol-3-yl]-1-(O-acetyloxime), ethanone-1-[9-ethyl-6-(2-methylbenzoyl)-9H-carbazol-3-yl]-1-(O-acetyloxime), ethanone-1-[9-ethyl-6-(2-methyl-5-tetrahydropyranylmethoxybenzoyl)-9.H.-carbazol-3-yl]-1-(0-acetyloxime), and ethanone-1-[9-ethyl-6-{2-methyl-4-(2,2-dimethyl-1,3-dioxolanyl)methoxybenzoyl}-9.H.-carbazol-3-yl]-1-(O-acetyloxime).

As the photoradical generator, a commercially available product may be used as it is. Specific examples thereof may include trade name: Irgacure 907, trade name: Irgacure 184, trade name: Irgacure 369, trade name: Irgacure 651, trade name: Irgacure 819, trade name: Irgacure 907, and trade name: Irgacure OXE02, available from BASF, and trade name: ADEKA OPTOMER N1919 available from ADEKA CORPORATION.

Examples of the anionic polymerization initiator may include an alkyl lithium compound; a monolithium salt or a monosodium salt of biphenyl, naphthalene, and pyrene; and a polyfunctional initiator such as a dilithium salt and a trilithium salt.

Examples of the cationic polymerization initiator may include a protic acid such as sulfuric acid, phosphoric acid, perchloric acid, and trifluoromethanesulfonic acid; Lewis acid such as boron trifluoride, aluminum chloride, titanium tetrachloride, and tin tetrachloride; and an aromatic onium salt, and a combination of an aromatic onium salt with a reducing agent.

One type of the polymerization initiator may be used alone, or two or more types thereof may be used in combination.

The ratio of the polymerization initiator in the composition (A) is usually 0.1 to 30 parts by weight, and preferably 0.5 to 10 parts by weight, relative to 100 parts by weight of the polymerizable compound.

The composition (A) may contain a surfactant for surface tension adjustment. The surfactant is not particularly limited, and usually a nonionic surfactant is preferable. As the nonionic surfactant, a commercially available product may be used. Examples thereof may include a nonionic surfactant that is an oligomer having a molecular weight of several thousands, e.g., KH-40 available from Seimi Chemical Co., Ltd. The ratio of the surfactant in the composition (A) is usually 0.01 to 10 parts by weight, and preferably 0.1 to 2 parts by weight, relative to 100 parts by weight of the polymerizable compound.

The composition (A) may contain a solvent such as an organic solvent. Examples of the organic solvent may include a ketone such as cyclopentanone, cyclohexanone, methyl ethyl ketone, acetone, and methyl isobutyl ketone; an acetate ester such as butyl acetate and amyl acetate; halogenated hydrocarbon such as chloroform, dichloromethane, and dichloroethane; an ether such as 1,4-dioxane, cyclopentyl methyl ether, tetrahydrofuran, tetrahydropyran, 1,3-dioxolan, and 1,2-dimethoxyethane; and aromatic hydrocarbon such as toluene, xylene, and mesitylene. The boiling point of the solvent is preferably 60 to 250° C., and 60 to 150° C. from the viewpoint of excellent handleability. The amount of the solvent to be used is usually 100 to 1,000 parts by weight relative to 100 parts by weight of the polymerizable compound.

The composition (A) may further contain an optional additive such as a metal, a metal complex, a dye, a pigment, a fluorescent material, a phosphorescent material, a leveling agent, a thixotropic agent, a gelator, a polysaccharide, a ultraviolet absorber, an infrared absorber, an antioxidant, an ion exchange resin, and a metal oxide such as titanium oxide. The ratio of the optional additive in the polymerizable composition of the present invention is usually 0.1 to 20 parts by weight relative to 100 parts by weight of the polymerizable compound.

The composition (A) may be usually prepared by mixing the aforementioned components.

[1.7. Method for Producing Optically Anisotropic Layer]

The optically anisotropic layer is a layer obtained by curing the composition (A).

Upon curing, a portion of the components in the composition (A) may be chemically changed, and may also be discharged to the outside of the system and disappear. For example, the all or most of the polymerizable compound is usually polymerized during curing to form a polymer, and the all or most of the solvent is volatilized and disappears.

Curing of the composition (A) may be usually achieved as follows. The composition (A) is applied onto a surface of a support or an orientation film formed on the support, the polymerizable liquid crystal compound in the layer of the composition (A) is oriented in a desired direction, and if necessary, the layer of the composition (A) is dried. Then the polymerizable compound is polymerized. The support and orientation film used in this production process may be used as components of the phase difference plate as they are. Alternatively, the support and the orientation film may be peeled off, and only the optically anisotropic layer may be used as the phase difference plate.

The support is not particularly limited, and may be a plate or a film formed from a known organic or inorganic material. Examples of the organic material may include polycycloolefin [for example, ZEONEX, ZEONOR (registered trademark; available from ZEON CORPORATION), ARTON (registered trademark; available from JSR Corporation), and APEL (registered trademark; available from Mitsui Chemicals, Inc.)], polyethylene terephthalate, polycarbonate, polyimide, polyamide, polymethyl methacrylate, polystyrene, polyvinyl chloride, polytetrafluoroethylene, cellulose, cellulose triacetate, and polyether sulfone. Examples of the inorganic material may include silicon, glass, and calcite. In terms of cost and favorable handleability, the organic material is preferable.

On the surface of the support, the orientation film may be formed. In this case, the optically anisotropic layer may be formed on the orientation film. With the orientation film, a liquid crystal compound in the composition (A) may be oriented in one direction on the surface.

The orientation film contains, e.g., a polymer such as polyimide, polyvinyl alcohol, polyester, polyallylate, polyamideimide, and polyetherimid. A solution containing such a polymer (composition for orientation film) may be applied onto a substrate to be in a film shape, dried, and subjected to a rubbing treatment in one direction, whereby, the orientation film can be obtained.

The thickness of the orientation film is preferably 0.001 to 5 μm, and more preferably 0.001 to 1 μm.

The surface of the support or the orientation film may be subjected to a rubbing treatment, if necessary. Such a rubbing treatment can impart orientation ability to the surface for orienting the compound that is capable of exhibiting liquid crystallinity in the composition (A).

The method for rubbing treatment is not particularly limited, and examples thereof may include a method in which the surface of the support or the orientation film is rubbed in a constant direction with a roll wrapped with cloth or felt formed of synthetic fibers such as nylon or natural fibers such as cotton. In order to remove powders (foreign substance) generated during the rubbing treatment to render the treated surface clean, it is preferable that the treated surface is cleaned after the rubbing treatment with isopropyl alcohol or the like.

Other than the rubbing treatment method, a method of irradiating the surface of the orientation film with polarized ultraviolet light can also impart a function of restraining orientation of a cholesteric liquid crystal layer having cholesteric regularity in one direction in the surface to the orientation film.

In addition, an ion beam orientation method in which the support is irradiated obliquely with an ion beam such as $Ar^+$ or the like to impart orientation performance to the support may be used.

Examples of the method for applying the composition (A) may include a curtain coating method, an extrusion coating method, a roll coating method, a spin coating method, a dip coating method, a bar coating method, a spray coating method, a slide coating method, a printing coating method, a gravure coating method, a die coating method, a cap coating method, and a dipping method.

The layer of the composition (A) may be formed by such application, to orient the liquid crystal compound in the layer into a desired manner. The orientation may be immediately achieved by the application. If necessary, the orientation may be achieved by subjecting the layer to an orientation treatment such as heating after the application.

In the layer of the composition (A) exhibiting orientation of desired form, the main chain mesogen and the side chain mesogen of the polymerizable liquid crystal compound with reverse wavelength dispersion are oriented in different directions. The angle between the orientation direction of the main chain mesogen and the orientation direction of the side chain mesogen may be any angle that is not 0°, and preferably 70 to 110° for achieving favorable reverse wavelength dispersion. The orientation may be achieved by, e.g., appropriately selecting the compound that forms desirable orientation as the polymerizable liquid crystal compound with reverse wavelength dispersion from the compounds in the aforementioned examples.

In the layer of the composition (A) formed by such application, it is preferable that the mesogen of the polymerizable monomer is also oriented in addition to the polymerizable liquid crystal compound with reverse wavelength dispersion. It is further preferable that the mesogen of the polymerizable monomer is oriented in parallel to any one of the main chain mesogen and the side chain mesogen of the polymerizable liquid crystal compound with reverse wavelength dispersion. When the polymerizable monomer is oriented in such a form, favorable orientation can be achieved, and reverse wavelength dispersion can be adjusted with precision. Such orientation may be achieved by, e.g., appropriately selecting the compound that forms desirable orientation as the polymerizable monomer from the compounds in the aforementioned examples.

Drying of the layer of the composition (A) may be achieved by a drying method such as air drying, heated-air drying, drying under reduced pressure, and heated-air drying under reduced pressure. By the drying, the solvent can be removed.

As the method of polymerizing the polymerizable compound in the layer of the composition (A), a method that suits the nature of components of the composition (A) such as a polymerizable compound and a polymerization initiator may be appropriately selected. Examples thereof may include an active energy ray irradiation method and a thermal polymerization method. The active energy ray irradiation method is preferable since the reaction can proceed at room temperature without heating. Examples of active energy ray to be irradiated in this case may include light such as visible light, ultraviolet light, and infrared light, and any energy ray such as an electron beam. A method of irradiation with light such as ultraviolet light is preferable because of simple operation. The temperature during irradiation of ultraviolet light is preferably 30° C. or lower. The lower limit of temperature during irradiation of ultraviolet light may be 15° C. or higher. The ultraviolet light irradiation intensity usually falls within a range of 0.1 mW/cm$^2$ to 1,000 mW/cm$^2$, and preferably 0.5 mW/cm$^2$ to 200 mW/cm$^2$.

[1.8. Optically Anisotropic Layer]

In the optically anisotropic layer, the main chain mesogen and the side chain mesogen of the polymerizable liquid crystal compound with reverse wavelength dispersion are oriented in different directions. The "mesogen of the polymerizable liquid crystal compound with reverse wavelength dispersion" in the optically anisotropic layer is the mesogen that existed in the molecule of the polymerizable liquid crystal compound with reverse wavelength dispersion and is the mesogen in the polymer produced by polymerization of the polymerizable liquid crystal compound with reverse wavelength dispersion. When the main chain mesogen and the side chain mesogen are oriented in different directions in this manner, the birefringence Δn of the optically anisotropic layer has reverse wavelength dispersion property, and properties for favorable phase difference plate can thereby be expressed.

The presence of reverse wavelength dispersion property of birefringence Δn of the optically anisotropic layer may be confirmed by measurement of birefringence Δn at a variety of wavelengths λ with a phase difference analyzer (trade name "AxoScan" manufactured by Axometrics, Inc., etc.).

In addition to the mesogen of the polymerizable liquid crystal compound with reverse wavelength dispersion, it is preferable that the mesogen of the polymerizable monomer is also oriented in the optically anisotropic layer. The "mesogen of the polymerizable monomer" in the optically anisotropic layer is a mesogen that existed in the molecule of the polymerizable monomer and is the mesogen in the polymer produced by polymerization of the polymerizable monomer.

It is preferable that the mesogen of the polymerizable monomer is oriented in parallel to any one of the main chain mesogen and the side chain mesogen of the polymerizable liquid crystal compound with reverse wavelength dispersion. When the polymerizable monomer is oriented in such a form, favorable orientation can be achieved, and reverse wavelength dispersion can be adjusted with precision. When the polymerizable monomer has two or more mesogens per one molecule, one of the mesogens may be oriented in parallel to the main chain mesogen of the polymerizable liquid crystal compound with reverse wavelength dispersion and the other may be oriented in parallel to the side chain mesogen of the polymerizable liquid crystal compound with reverse wavelength dispersion.

In the phase difference plate of the present application, the retardation of the optically anisotropic layer satisfies the following relationship. Specifically, retardations Re0 (450 nm), Re0 (550 nm), and Re0 (650 nm) at wavelengths of 450 nm, 550 nm, and 650 nm of a layer obtained by curing a composition (A0) and retardations Re (450 nm), Re (550 nm), and Re (650 nm) at wavelengths of 450 nm, 550 nm, and 650 nm of an optically anisotropic layer satisfy relationship of the following expressions (i) and (ii) or relationship of the following expressions (iii) and (iv).

Re0(450 nm)/Re0(550 nm)>Re(450 nm)/Re(550 nm)  Expression (i)

Re0(650 nm)/Re0(550 nm)<Re(650 nm)/Re(550 nm)  Expression (ii)

Re0(450 nm)/Re0(550 nm)<Re(450 nm)/Re(550 nm) Expression (iii)

Re0(650 nm)/Re0(550 nm)>Re(650 nm)/Re(550 nm) Expression (iv)

The composition (A0) herein is a composition wherein the polymerizable monomer in the composition (A) is replaced by a polymerizable liquid crystal compound with reverse wavelength dispersion. For example, when the composition (A) contains a polymerizable liquid crystal compound with reverse wavelength dispersion, a polymerizable monomer, a photopolymerization initiator, a surfactant, and a solvent and the ratio of total of the polymerizable liquid crystal compound with reverse wavelength dispersion and the polymerizable monomer is x % by weight, the composition (A0) is a composition that contains a polymerizable liquid crystal compound with reverse wavelength dispersion, a polymerizable monomer, a photopolymerization initiator, a surfactant, and a solvent and in which the ratio of the polymerizable liquid crystal compound with reverse wavelength dispersion is x % by weight and the ratios of the photopolymerization initiator, the surfactant, and the solvent are the same as those in the composition (A).

The conditions for formation of the layer obtained by curing the composition (A0) are the same as the conditions for formation of the layer obtained by curing the composition (A). When the optical properties with respect to the layer obtained by curing the thus obtained composition (A0) satisfy the specific condition, the reverse wavelength dispersion property can be controlled with precision.

The thickness of the optically anisotropic layer is not particularly limited, and may be appropriately adjusted so that properties such as retardation fall within a desired range. Specifically, the lower limit of the thickness is preferably 0.1 μm or more, and more preferably 0.5 μm or more, whereas the upper limit of the thickness is preferably 10 μm or less, and more preferably 5 μm or less.

[1.9. Phase Difference Plate: Other Components]

The phase difference plate of the present invention may solely consist of the optically anisotropic layer, or may have another layer, if necessary. For example, a member such as the support and the orientation film used in production of the optically anisotropic layer may remain as it is without being peeled off for use as the phase difference plate. In this case, the layer other than the optically anisotropic layer may be usually made as an optically isotropic layer. Examples of the optional layer may include an adhesion layer for effecting adhesion of a layer to another, a mat layer for improving the sliding property of the film, a hard-coat layer such as an impact-resistant polymethacrylate resin layer, an anti-reflection layer, and an anti-fouling layer.

[2. Circularly Polarizing Plate]

The circularly polarizing plate of the present invention includes the phase difference plate of the present invention and a linear polarizer.

As the linear polarizer, a publicly known polarizer used in devices such as a liquid crystal display device may be used. Examples of the linear polarizer may include a linear polarizer obtained by adsorbing iodine or a dichroic dye to a polyvinyl alcohol film and then uniaxially stretching the film in a boric acid bath, and a linear polarizer obtained by adsorbing iodine or a dichroic dye to a polyvinyl alcohol film, then stretching the film, and then further modifying one portion of polyvinyl alcohol unit in the molecular chain into a polyvinylene unit. Other examples of the linear polarizer may include a polarizer having a function of separating polarized light into reflected light and transmitted light, such as a grid polarizer, a multi-layer polarizer, and a cholesteric liquid crystal polarizer. Among these, a polarizer containing polyvinyl alcohol is preferable.

When natural light is caused to be incident on the polarizer for use in the present invention, only one type of polarized light is transmitted therethrough. The degree of polarization of the polarizer for use in the present invention is not particularly limited, and is preferably 98% or more, and more preferably 99% or more. The upper limit of the degree of polarization is ideally 100%. The average thickness of the polarizer is preferably 5 to 80 μm.

When the phase difference plate of the present invention is used for the circularly polarizing plate of the present invention, it is preferable that the phase difference at a wavelength of 550 nm is 100 to 150 nm. In the circularly polarizing plate of the present invention, it is preferable that the angle between a slow axis of the phase difference plate and a transmission axis of the linear polarizer are 45° or near 45°, specifically 40 to 50°. When the circularly polarizing plate has such a phase difference and angle, the circularly polarizing plate may be usefully used for application as a component of a liquid crystal display device, and the like.

The phase difference plate of the present invention may solely consist of the optically anisotropic layer, or may have an optional layer such as a support and an orientation film in addition to the optically anisotropic layer. Therefore, the circularly polarizing plate of the present invention may similarly have any layer such as a support and an orientation film as an optional component.

[3. Image Display Device]

The image display device of the present invention has the phase difference plate of the present invention. In the imaging display device of the present invention, the phase difference plate may be combined with a linear polarizer to be provided as a circularly polarizing plate.

Examples of the image display device of the present invention may include a liquid crystal display device, an organic electroluminescent display device, a plasma display device, a FED (field emission) display device, and a SED (surface field emission) display device. The liquid crystal display device is particularly preferable.

Examples of the driving mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode. Among these, the in-plane switching mode and the vertical alignment mode are preferable, and the in-plane switching mode is particularly preferable. A liquid crystal cell of the in-plane switching mode has a wide viewing angle. However, by applying the phase difference plate, the viewing angle can be further increased.

The image display device of the present invention may have only one sheet of the phase difference plate of the present invention or two or more sheets thereof. In the image display device of the present invention, the phase difference plate of the present invention may be provided by bonding the plate to another component such as a liquid crystal cell via an adhesive.

EXAMPLES

The present invention will be specifically described hereinbelow with reference to Examples. However, the present invention is not limited to the following Examples. The present invention may be implemented with any modifications without departing from the scope of the claims of the present invention and equivalents thereof.

Unless otherwise stated, "%" and "part" that represent an amount in the following description are based on weight. Unless otherwise stated, operations described in the following were performed under conditions of normal temperature and normal pressure.

(Preparative Example 1) Synthesis of Compound (I)-1

[Chemical Formula 67]

(I)-1

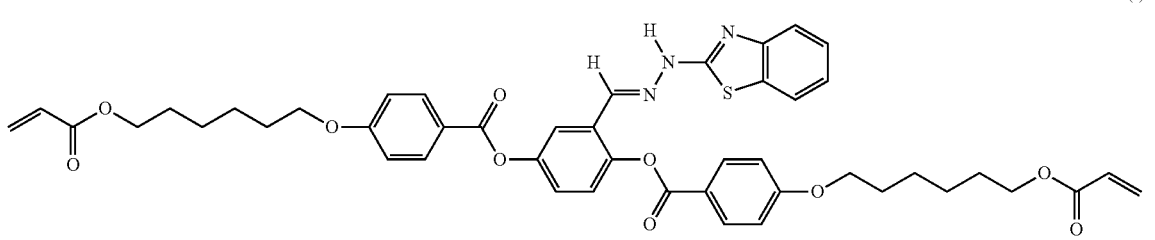

Step 1: Synthesis of Intermediate Product A

[Chemical Formula 68]

Intermediate product A

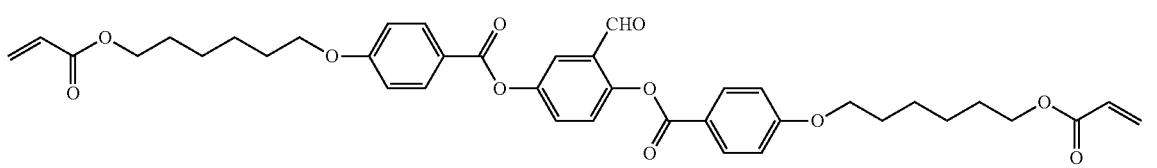

20 g (144.8 mmol) of 2,5-dihydroxybenzaldehyde, 105.8 g (362.0 mmol) of 4-(6-acryloyl-hex-1-yloxy) benzoic acid (available from DKSH), 5.3 g (43.4 mmol) of 4-(dimethylamino)pyridine, and 200 mL of N-methylpyrrolidone were placed in a four-necked reaction vessel equipped with a thermometer under nitrogen flow, and a homogeneous solution was produced. To the solution, 83.3 g (434.4 mmol) of 1-ethyl-3-(3-dimethylaminopropyl) carbodiimide hydrochloride (WSC) was added, and the mixture was stirred at 25° C. for 12 hours. After completion of the reaction, the reaction solution was added to 1.5 L of water, and the mixture was extracted with 500 mL of ethyl acetate. The ethyl acetate layer was dried over anhydrous sodium sulfate, and the sodium sulfate was removed by filtration. Ethyl acetate was distilled off under reduced pressure from the filtrate with a rotary evaporator to obtain a pale yellow solid. The pale yellow solid was purified by silica gel column chromatography (toluene:ethyl acetate=9:1 (by volume)) to obtain 75 g of an intermediate product A as a white solid (yield: 75.4%).

The structure thereof was identified by $^1$H-NMR.

$^1$H-NMR (400 MHz, CDCl$_3$, TMS, δ ppm): 10.20 (s, 1H), 8.18-8.12 (m, 4H), 7.78 (d, 1H, J=2.8 Hz), 7.52 (dd, 1H, J=2.8 Hz, 8.7 Hz), 7.38 (d, 1H, J=8.7 Hz), 7.00-6.96 (m, 4H), 6.40 (dd, 2H, J=1.4 Hz, 17.4 Hz), 6.12 (dd, 2H, J=10.6 Hz, 17.4 Hz), 5.82 (dd, 2H, J=1.4 Hz, 10.6 Hz), 4.18 (t, 4H, J=6.4 Hz), 4.08-4.04 (m, 4H), 1.88-1.81 (m, 4H), 1.76-1.69 (m, 4H), 1.58-1.42 (m, 8H)

Step 2: Synthesis of Compound (I)-1

10.5 g (15.3 mmol) of the intermediate product A synthesized in the previous Step 1, 3.0 g (18.3 mmol) of 2-hydrazinobenzothiazole, and 80 mL of tetrahydrofuran (THF) were placed in a 4-necked reaction vessel equipped with a thermometer under nitrogen flow, and a homogeneous solution was produced. To the solution, 18 mg (0.08 mmol) of (±)-camphorsulfonic acid was added, and the mixture was stirred at 25° C. for 3 hours. After completion of the reaction, the reaction solution was added to 800 mL of 10% sodium bicarbonate water, and the mixture was extracted with 100 mL of ethyl acetate twice. The ethyl acetate layers were collected, and dried over anhydrous sodium sulfate, and the sodium sulfate was removed by filtration. Ethyl acetate was distilled off under reduced pressure from the filtrate with a rotary evaporator to obtain a pale yellow solid. The pale yellow solid was purified by silica gel column chromatography (toluene:ethyl acetate=8:2 (by volume)) to obtain 8.0 g of a compound (I)-1 as a pale yellow solid (yield: 62.7%). The structure of the target compound was identified by 1H-NMR and mass spectrum.

$^1$H-NMR (500 MHz, DMSO-d$_6$, TMS, δ ppm): 12.30 (br, 1H), 8.19 (s, 1H), 8.17-8.12 (m, 4H), 7.76 (d, 1H, J=3.0 Hz), 7.68 (d, 1H, J=7.5 Hz), 7.45-7.39 (m, 3H), 7.28 (t, 1H, J=8.0 Hz), 7.18-7.14 (m, 4H), 7.09 (t, 1H, J=8.0 Hz), 6.33 (dd, 2H, J=1.5 Hz, 17.5 Hz), 6.18 (dd, 2H, J=10.5 Hz, 17.5 Hz), 5.944 (dd, 1H, J=1.5 Hz, 10.5 Hz), 5.941 (dd, 1H, J=1.5 Hz, 10.5 Hz), 4.14-4.10 (m, 8H), 1.80-1.75 (m, 4H), 1.69-1.63 (m, 4H), 1.53-1.38 (m, 8H) LCMS (APCI): calcd for C$_{46}$H$_{47}$N$_3$O$_{10}$S: 833 [M$^+$]. Found: 833.

<Measurement of Phase Transition Temperature>

10 mg of the compound (I)-1 was weighted, and placed between two glass substrates with a polyimide orientation film that had been subjected to a rubbing treatment while the compound (I)-1 was in a solid state. The substrates was placed on a hot plate, and the temperature was increased from 50° C. to 200° C., and then decreased to 50° C. A histological change during the increase and decrease in the temperature was observed with a polarizing microscope (ECLIPSE LV100POL manufactured by Nikon Corporation). As a result, during the increase in the temperature, a solid phase was transformed into a nematic liquid crystal phase at 102° C., and then into an isotropic liquid phase at 165° C. In contrast, during the decrease in the temperature, the isotropic liquid phase was transformed into a nematic liquid crystal phase at 140° C., and then into a solid phase at 50° C. or lower.

Comparative Example 1

(C1-1. Preparation of Composition (A0))

A mixture of a composition shown in the following Table 1 was stirred homogeneously, and filtered through a 0.6-μm filter, to obtain a composition (A0).

TABLE 1

| | |
|---|---|
| Polymerizable liquid crystal compound with reverse wavelength dispersion (I)-1 (Prepared in Preparative Example 1) | 19.3 Parts |
| Photopolymerization initiator: Irgacure-379 (Produced by BASF Japan Ltd.) | 0.6 Parts |
| Surfactant: Ftergent 209F 1% solution (Neos Company Limited) | 5.8 Parts |
| Cyclopentanone | 74.2 Parts |

(C1-2. Production of Phase Difference Plate)

One surface of a support (ZEONOR Film, trade name "ZF16", available from ZEON CORPORATION) was subjected to an orientation treatment by rubbing. The composition (A0) obtained in Step (C1-1) was applied onto the surface with a spin coater so that the dried film thickness was 1.4 μm. The support was heated at 130° C. for 2 minutes to dry the layer of the composition (A0). A multiple-layered product including the support and the dried layer of the composition (A0) formed on the support was thereby obtained.

Subsequently, the multiple-layered product was irradiated with ultraviolet light using a metal halide lamp to polymerize the polymerizable liquid crystal compound. In the irradiation dose of ultraviolet light, an illuminance was 16 mW/cm$^2$, and an light exposure dose was 100 mJ/cm$^2$. A phase difference plate including the support and an optically anisotropic layer with a film thickness of 1.4 μm formed on the support was thereby obtained.

(C1-3. Measurement of Wavelength Dispersion)

For the phase difference plate produced in Step (C1-2), a birefringence Δn was measured at a variety of wavelengths λ with a phase difference analyzer (trade name: AxoScan) manufactured by Axometrics, Inc., and wavelength dispersion property of Δn was determined. The measured wavelength dispersion property is shown in FIG. 1.

From the measurement results, Re0 (450 nm)/Re0 (550 nm)=0.918 and Re0 (650 nm)/Re0 (550 nm)=0.982.

(C1-4. Measurement of Refractive Index Wavelength Dispersion)

Figure 2:
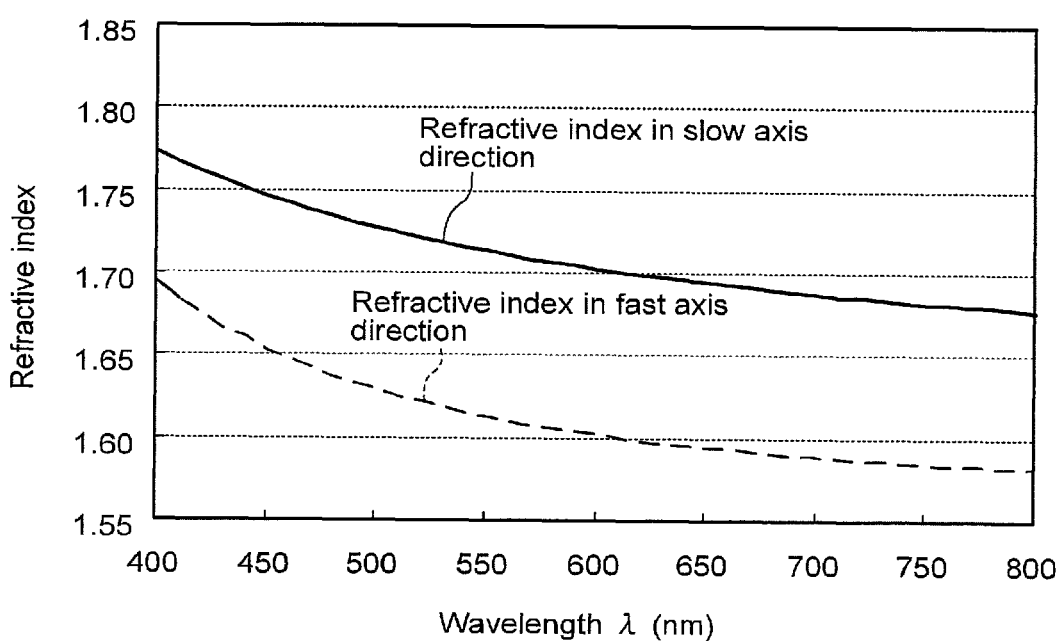
FIG. 2 is a graph showing wavelength dispersion property of refractive index of the phase difference plate, which is measured in Comparative Example 1.

For the phase difference plate produced in Step (C1-2), the refractive index was measured with a refractive index meter: prism coupler manufactured by Metricon Corporation. The refractive index was measured at wavelengths λ of 407 nm, 532 nm, and 633 nm, and the measured values at the three wavelengths were fit to a Cauchy model. The results are shown in FIG. 2. The refractive index in a fast axis direction had lower values and larger wavelength dispersion as compared with the refractive index in a slow axis direction. This shows that the phase difference plate exhibits reverse wavelength dispersion property.

Reference Example 1

The phase difference plate obtained in Step (C1-2) of Comparative Example 1 was irradiated with polarized ultraviolet light, and the absorption spectrum was measured. In the measurement, a spectrophotometer (main instrument trade name "V7200", light reception portion trade name "VAR7020" manufactured by JASCO Corporation) was used.

Figure 3:
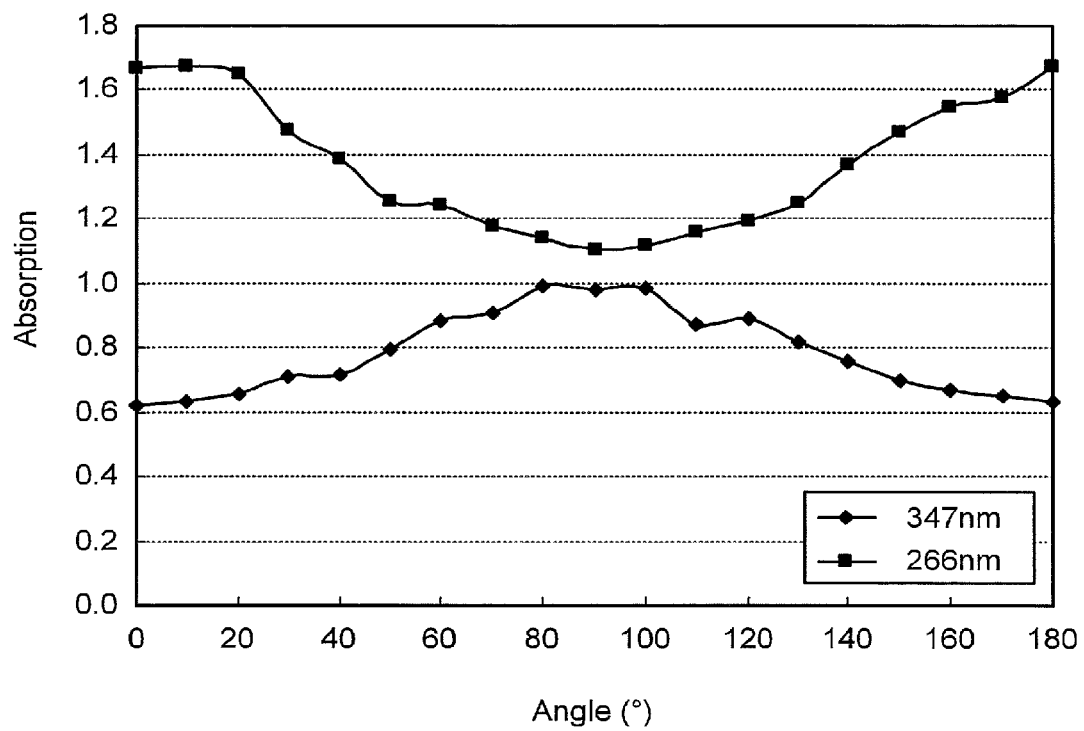
FIG. 3 is a graph showing a relationship between the azimuth angle of polarization and the measured absorption, which are measured in Reference Example 1.

As a result, two absorption peaks at 266 nm and 347 nm were observed. When the polarization direction was rotated, the height of the peaks was changed. When the rubbing direction was set to 0° among a variety of directions in parallel to the surface of the phase difference plate, the azimuth angle of polarization in which the absorption at 347 nm reached the maximum was 90°. The relationship between the azimuth angle of polarization and the measured absorption is shown in FIG. 3.

The wavelength dispersion of refractive index of a compound having a structure similar to the main chain mesogen of the compound (I)-1 and a compound having a structure similar to the side chain mesogen of the compound (I)-1 in the visible light region was examined. The wavelength dispersion of the latter was larger. In general, a compound having a large visible light wavelength dispersion tends to have an absorption peak close to the visible light region. Further, when the polarization direction is generally parallel to the long axis direction, the absorption peak reaches the maximum. Therefore, attribution was determined that the peak at 266 nm was derived from the main chain mesogen, and the peak at 347 nm was derived from the side chain mesogen. In addition, this shows that the orientation direction of the main chain mesogen is orthogonal to the orientation direction of the side chain mesogen.

Example 1

(1-1. Preparation of Composition (A))

A mixture of a composition shown in the following Table 2 was stirred homogeneously, and filtered through a 0.6-μm filter, to obtain a composition (A-1).

TABLE 2

| | |
|---|---|
| Polymerizable liquid crystal compound with reverse wavelength dispersion (I)-1 (Prepared in Preparative Example 1) | 17.4 Parts |
| Polymerizable monomer (II)-1 (Compound represented by the following formula (II)-1) | 1.9 Parts |

TABLE 2-continued

| | |
|---|---|
| Photopolymerization initiator: Irgacure-379 (Produced by BASF Japan Ltd.) | 0.6 Parts |
| Surfactant: Ftergent 209F 1% solution (Neos Company Limited) | 5.8 Parts |
| Cyclopentanone | 74.2 Parts |

[Chemical Formula 69]

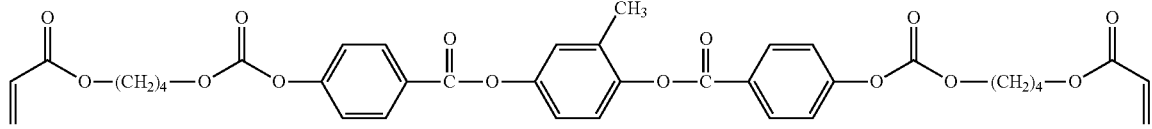

(II)-1

Separately from the composition (A-1), a composition was prepared by adding 20.0% by weight of a polymerizable monomer (II)-1 to cyclopentanone. The composition was applied onto a substrate having been subjected to an orientation treatment, and a solvent was dried once. After that, the temperature was changed in a range of room temperature to 200° C., and the presence or absence of liquid crystallinity was observed with a polarizing microscope. Liquid crystallinity was observed at 122° C.

(1-2. Production and Evaluation of Phase Difference Plate)

A phase difference plate was produced in the same manner as in Step (C1-2) of Comparative Example 1 except that the composition (A-1) obtained in Step (1-1) was used in place of the composition (A0) obtained in Step (C1-1). The film thickness of the optically anisotropic layer of the phase difference plate thus obtained was 1.2 μm.

Figure 4:
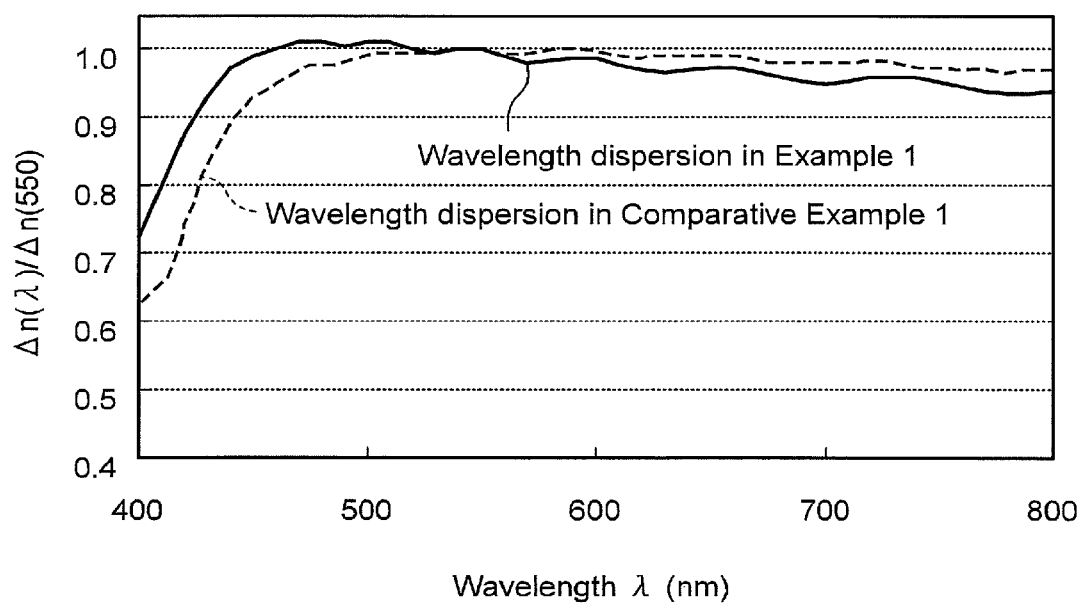
FIG. 4 is a graph showing wavelength dispersion property of birefringence Δn of a phase difference plate, which is measured in Example 1, in comparison with Comparative Example 1.

For the phase difference plate thus obtained, the birefringence Δn was measured at a variety of wavelengths λ in the same manner as in Step (C1-3) of Comparative Example 1, whereby the wavelength dispersion property of Δn was determined. The measured wavelength dispersion property is shown in FIG. 4 in comparison with the results of Comparative Example 1.

From the measurement results, Re (450 nm)/Re (550 nm)=0.99, and Re (650 nm)/Re (550 nm)=0.97, which showed that the reverse dispersibility became smaller as compared with Comparative Example 1.

Figure 5:
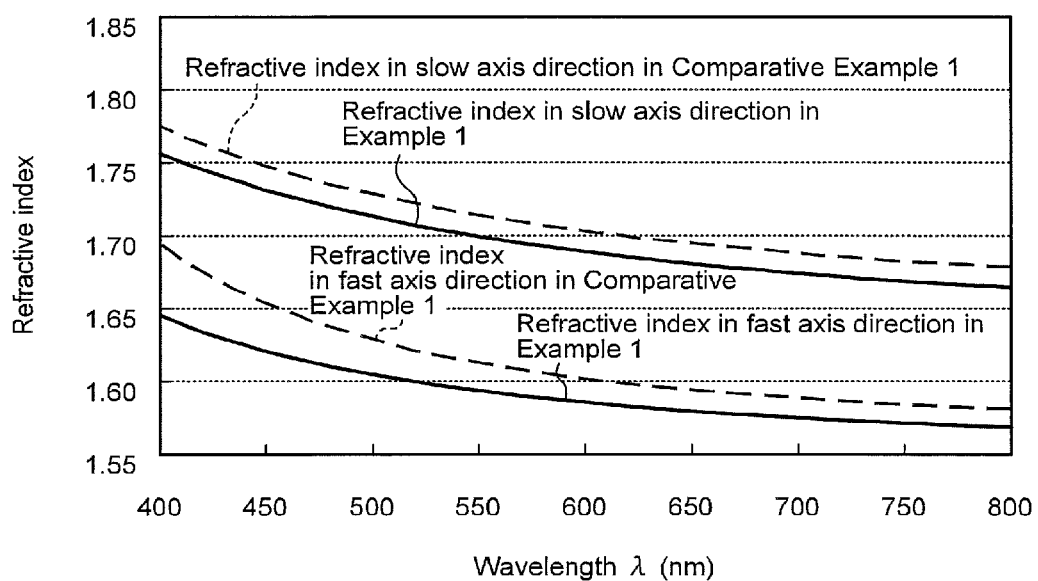
FIG. 5 is a graph showing wavelength dispersion property of refractive index of the phase difference plate, which is measured in Example 1, in comparison with Comparative Example 1.

For the phase difference plate thus obtained, the refractive index was measured in the same manner as in Step (C1-4) of Comparative Example 1. The measured values at three wavelengths were fit to a Cauchy model. The results are shown in FIG. 5 in comparison with the results of Comparative Example 1. The wavelength dispersion of refractive index in the slow axis direction was not largely different from that in Comparative Example 1, but the wavelength dispersion of refractive index in the fast axis direction became smaller as compared with Comparative Example 1. Therefore, the reverse wavelength dispersion property of Δn of the phase difference plate became small.

Example 2

(2-1. Preparation of Composition (A-2))

A mixture of a composition shown in the following Table 3 was stirred homogeneously, and filtered through a 0.6-μm filter, to obtain a composition (A-2).

TABLE 3

| | |
|---|---|
| Polymerizable liquid crystal compound with reverse wavelength dispersion (I)-1 (Prepared in Preparative Example 1) | 17.4 Parts |
| Polymerizable monomer (IV) (Compound represented by the following formula (IV)) | 1.9 Parts |
| Photopolymerization initiator: Irgacure-379 (Produced by BASF Japan Ltd.) | 0.6 Parts |
| Surfactant: Ftergent 209F 1% solution (Neos Company Limited) | 5.8 Parts |
| Cyclopentanone | 74.2 Parts |

[Chemical Formula 70]

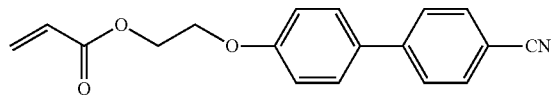

(IV)

Separately from the composition (A-2), a composition was prepared by adding 20.0% by weight of a polymerizable monomer (IV) to cyclopentanone. The composition was applied onto a substrate having been subjected to an orientation treatment, and a solvent was dried once. After that, the temperature was changed in a range of room temperature to 200° C., and the presence or absence of liquid crystallinity was observed with a polarizing microscope. It showed non-liquid crystallinity.

(2-2. Production and Evaluation of Phase Difference Plate)

A phase difference plate was produced in the same manner as in Step (C1-2) of Comparative Example 1 except that the composition (A-2) obtained in Step (2-1) was used in place of the composition (A0) obtained in Step (C1-1). The film thickness of the optically anisotropic layer of the phase difference plate thus obtained was 1.5 μm.

Figure 6:
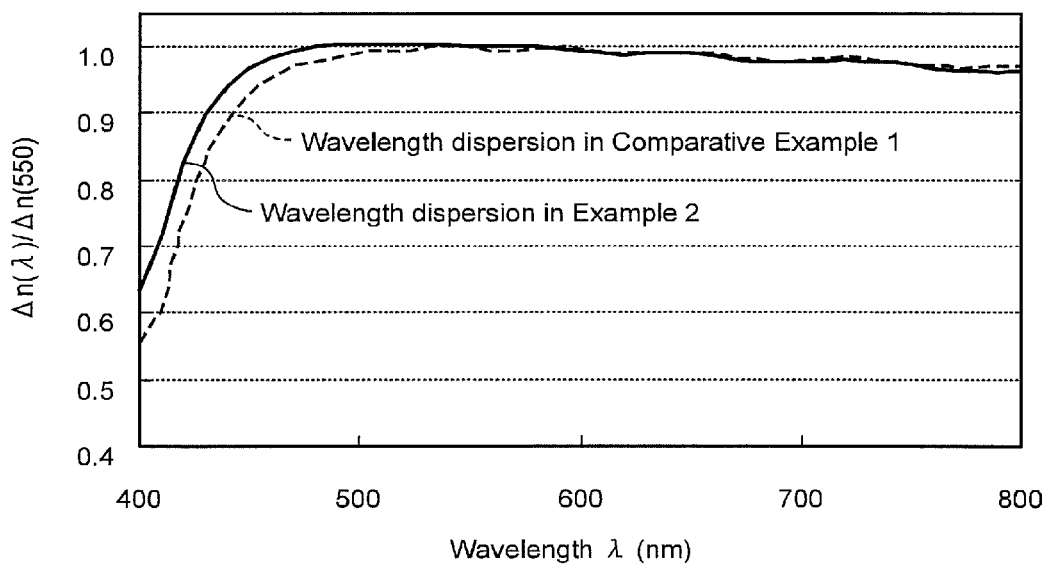
FIG. 6 is a graph showing wavelength dispersion property of birefringence Δn of a phase difference plate, which is measured in Example 2, in comparison with Comparative Example 1.

For the phase difference plate thus obtained, the birefringence Δn was measured at a variety of wavelengths λ in the same manner as in Step (C1-3) of Comparative Example 1, whereby the wavelength dispersion property of Δn was determined. The measured wavelength dispersion property is shown in FIG. 6 in comparison with the results of Comparative Example 1.

From the measurement results, Re (450 nm)/Re (550 nm)=0.963, and Re (650 nm)/Re (550 nm)=0.979, which showed that the reverse dispersibility became smaller as compared with Comparative Example 1.

Figure 7:
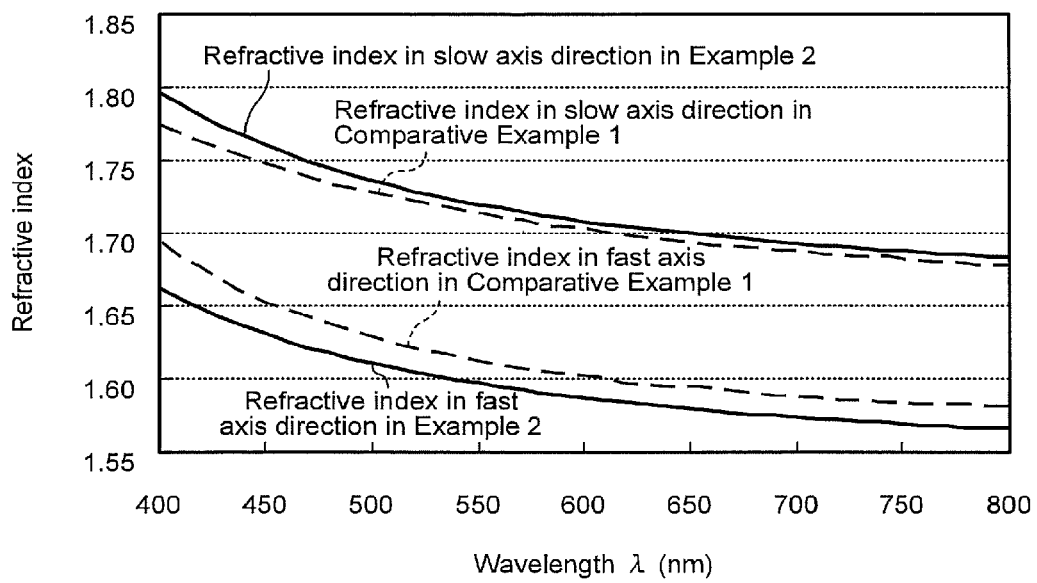
FIG. 7 is a graph showing wavelength dispersion property of refractive index of the phase difference plate, which is measured in Example 2, in comparison with Comparative Example 1.

For the phase difference plate thus obtained, the refractive index was measured in the same manner as in Step (C1-4) of Comparative Example 1. The measured values at three wavelengths were fit to a Cauchy model. The results are shown in FIG. 7 in comparison with the results of Comparative Example 1. The wavelength dispersion of refractive index in the slow axis direction became larger than that in Comparative Example 1, and the wavelength dispersion of refractive index in the fast axis direction was not largely changed as compared with Comparative Example 1. Therefore, the reverse wavelength dispersion property of Δn of the phase difference plate became small.

Example 3

(3-1. Preparation of Composition (A-3))

A mixture of a composition shown in the following Table 4 was stirred homogeneously, and filtered through a 0.6-μm filter, to obtain a composition (A-3).

TABLE 4

| | |
|---|---|
| Polymerizable liquid crystal compound with reverse wavelength dispersion (I)-1 (Prepared in Preparative Example 1) | 17.4 Parts |
| Polymerizable monomer (III)-4 (Compound represented by the following formula (III)-4) | 1.9 Parts |
| Photopolymerization initiator: Irgacure-379 (Produced by BASF Japan Ltd.) | 0.6 Parts |
| Surfactant: Ftergent 209F 1% solution (Neos Company Limited) | 5.8 Parts |
| Cyclopentanone | 74.2 Parts |

[Chemical Formula 71]

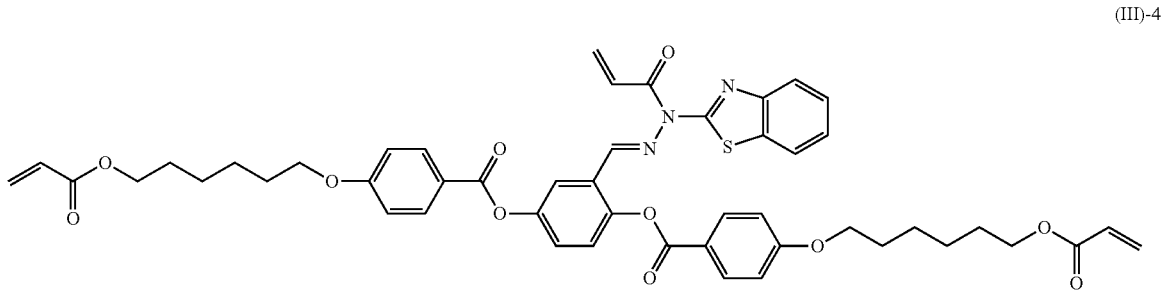

(III)-4

Separately from the composition (A-3), a composition was prepared by adding 20.0% by weight of a polymerizable monomer (III)-4 to cyclopentanone. The composition was applied onto a substrate having been subjected to an orientation treatment, and a solvent was dried once. After that, the temperature was changed in a range of room temperature to 200° C., and the presence or absence of liquid crystallinity was observed with a polarizing microscope. It showed non-liquid crystallinity.

(3-2. Production and Evaluation of Phase Difference Plate)

A phase difference plate was produced in the same manner as in Step (C1-2) of Comparative Example 1 except that the composition (A-3) obtained in Step (3-1) was used in place of the composition (A0) obtained in Step (C1-1). The film thickness of the optically anisotropic layer of the phase difference plate thus obtained was 1.3 μm.

Figure 8:
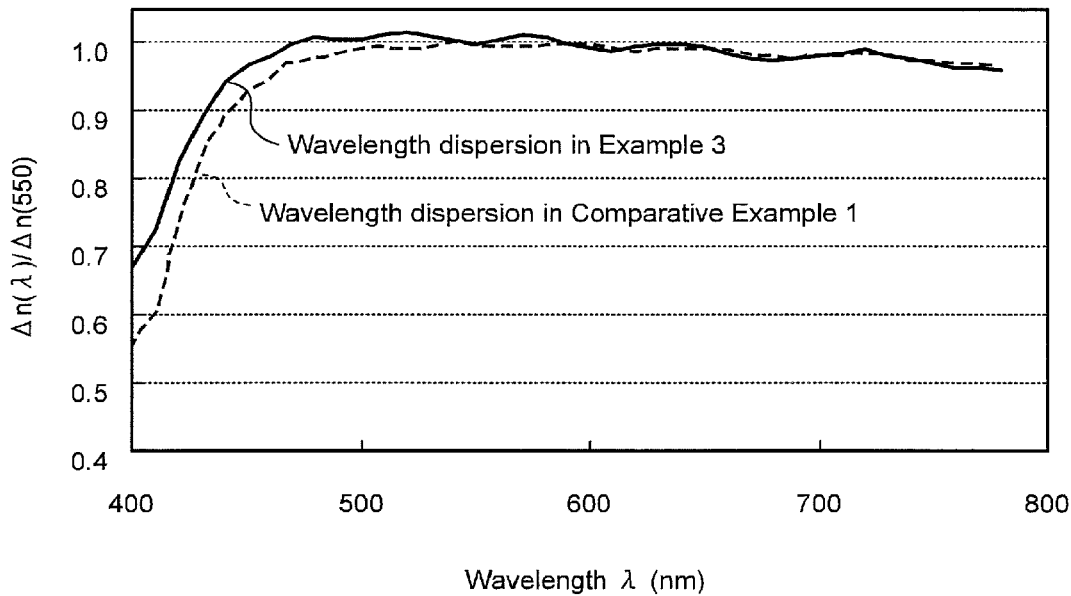
FIG. 8 is a graph showing wavelength dispersion property of birefringence Δn of a phase difference plate, which is measured in Example 3, in comparison with Comparative Example 1.

For the phase difference plate thus obtained, the birefringence Δn was measured at a variety of wavelengths λ in the same manner as in Step (C1-3) of Comparative Example 1, whereby the wavelength dispersion property of Δn was determined. The measured wavelength dispersion property is shown in FIG. 8 in comparison with the results of Comparative Example 1.

From the measurement results, Re (450 nm)/Re (550 nm)=0.969, and Re (650 nm)/Re (550 nm)=0.980, which showed that the reverse dispersibility became smaller as compared with Comparative Example 1.

Figure 9:
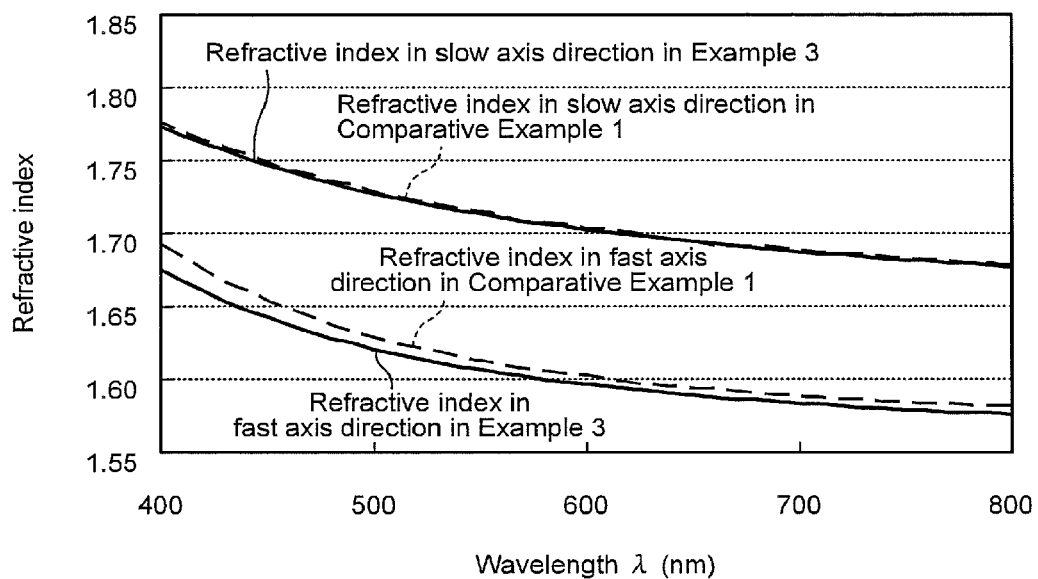
FIG. 9 is a graph showing wavelength dispersion property of refractive index of the phase difference plate, which is measured in Example 3, in comparison with Comparative Example 1.

For the phase difference plate thus obtained, the refractive index was measured in the same manner as in Step (C1-4) of Comparative Example 1. The measured values at three wavelengths were fit to a Cauchy model. The results are shown in FIG. 9 in comparison with the results of Comparative Example 1. The wavelength dispersion of refractive index in the slow axis direction was not largely different from that in Comparative Example 1, but the wavelength dispersion of refractive index in the fast axis direction became smaller as compared with Comparative Example 1. Therefore, the reverse wavelength dispersion property of Δn of the phase difference plate became small.

Example 4

(4-1. Preparation of Composition (A-4))

A mixture of a composition shown in the following Table 5 was stirred homogeneously, and filtered through a 0.6-μm filter, to obtain a composition (A-4).

TABLE 5

| | |
|---|---|
| Polymerizable liquid crystal compound with reverse wavelength dispersion (I)-1 (Prepared in Preparative Example 1) | 9.7 Parts |
| Polymerizable monomer (III)-1 (Compound represented by the following formula (III)-1) | 9.6 Parts |
| Photopolymerization initiator: | 0.6 Parts |

TABLE 5-continued

| | |
|---|---|
| Irgacure-379 (Produced by BASF Japan Ltd.) Surfactant: Ftergent 209F 1% solution (Neos Company Limited) | 5.8 Parts |
| Cyclopentanone | 74.2 Parts |

[Chemical Formula 72]

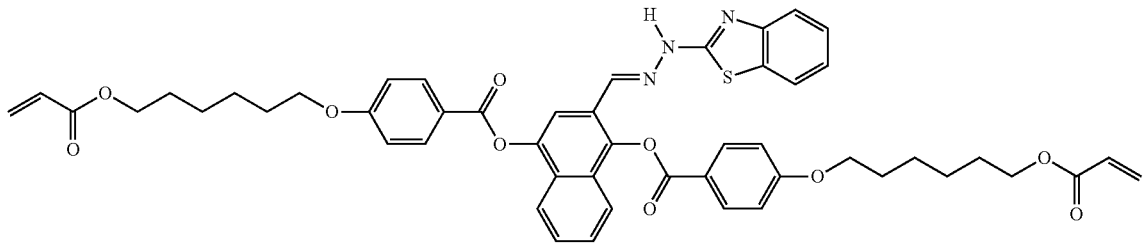

(III)-1

Separately from the composition (A-4), a composition was prepared by adding 20.0% by weight of a polymerizable monomer (III)-1 to cyclopentanone. The composition was applied onto a substrate having been subjected to an orientation treatment, and a solvent was dried once. After that, the temperature was changed in a range of room temperature to 200° C., and the presence or absence of liquid crystallinity was observed with a polarizing microscope. It showed non-liquid crystallinity.

(4-2. Production and Evaluation of Phase Difference Plate)

A phase difference plate was produced in the same manner as in Step (C1-2) of Comparative Example 1 except that the composition (A-4) obtained in Step (4-1) was used in place of the composition (A0) obtained in Step (C1-1). The film thickness of the optically anisotropic layer of the phase difference plate thus obtained was 1.7 μm.

Figure 10:
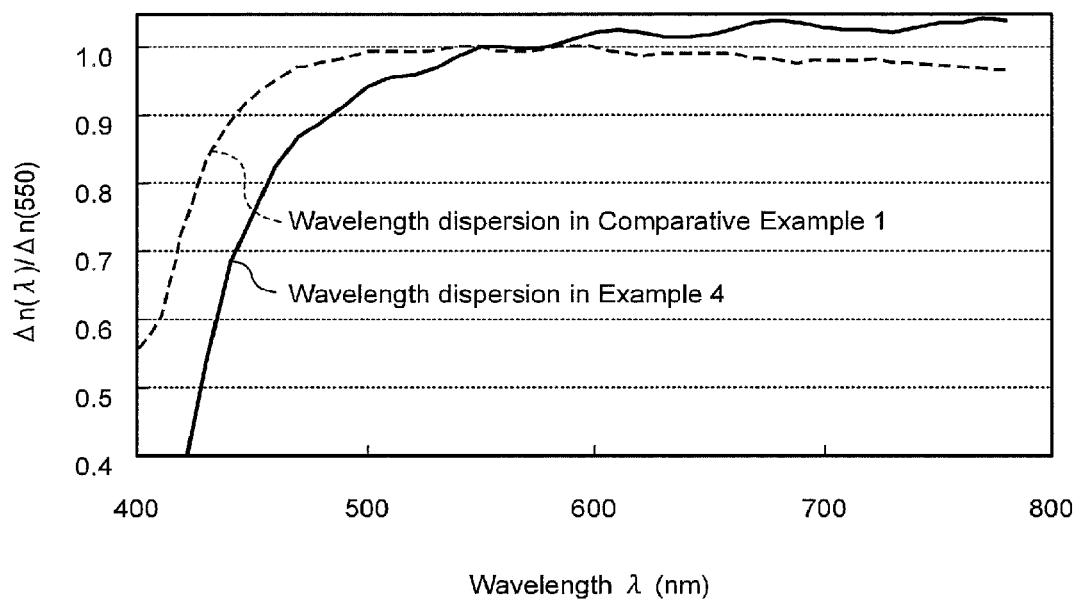
FIG. 10 is a graph showing wavelength dispersion property of birefringence Δn of a phase difference plate, which is measured in Example 4, in comparison with Comparative Example 1.

For the phase difference plate thus obtained, the birefringence Δn was measured at a variety of wavelengths λ in the same manner as in Step (C1-3) of Comparative Example 1, whereby the wavelength dispersion property of Δn was determined. The measured wavelength dispersion property is shown in FIG. 10 in comparison with the results of Comparative Example 1.

From the measurement results, Re (450 nm)/Re (550 nm)=0.761, and Re (650 nm)/Re (550 nm)=1.019, which showed that the reverse dispersibility became larger as compared with Comparative Example 1.

Figure 11:
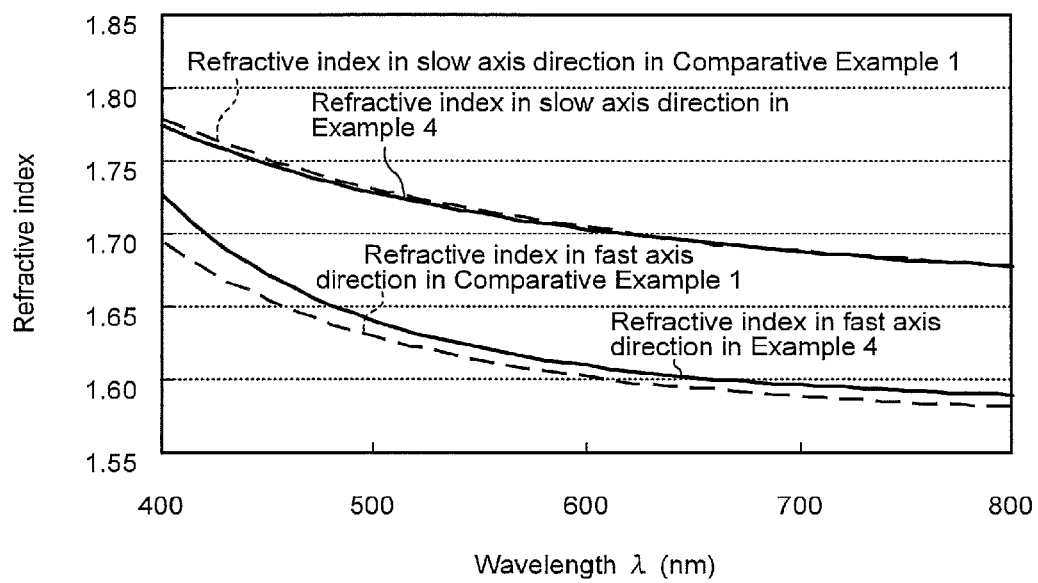
FIG. 11 is a graph showing wavelength dispersion property of refractive index of the phase difference plate, which is measured in Example 4, in comparison with Comparative Example 1.

For the phase difference plate thus obtained, the refractive index was measured in the same manner as in Step (C1-4) of Comparative Example 1. The measured values at three wavelengths were fit to a Cauchy model. The results are shown in FIG. 11 in comparison with the results of Comparative Example 1. The wavelength dispersion of refractive index in the slow axis direction was not largely different from that in Comparative Example 1, but the wavelength dispersion of refractive index in the fast axis direction became larger as compared with Comparative Example 1. Therefore, the reverse wavelength dispersion property of Δn of the phase difference plate became large.

Example 5

(5-1. Preparation of Composition (A-5))

A mixture of a composition shown in the following Table 6 was stirred homogeneously, and filtered through a 0.6-μm filter, to obtain a composition (A-5).

TABLE 6

| | |
|---|---|
| Polymerizable liquid crystal compound with reverse wavelength dispersion (I)-1 (Prepared in Preparative Example 1) | 17.4 Parts |
| Polymerizable monomer (III)-2 (Compound represented by the following formula (III)-2) | 1.9 Parts |
| Photopolymerization initiator: Irgacure-379 (Produced by BASF Japan Ltd.) | 0.6 Parts |
| Surfactant: Ftergent 209F 1% solution (Neos Company Limited) | 5.8 Parts |
| Cyclopentanone | 74.2 Parts |

[Chemical Formula 73]

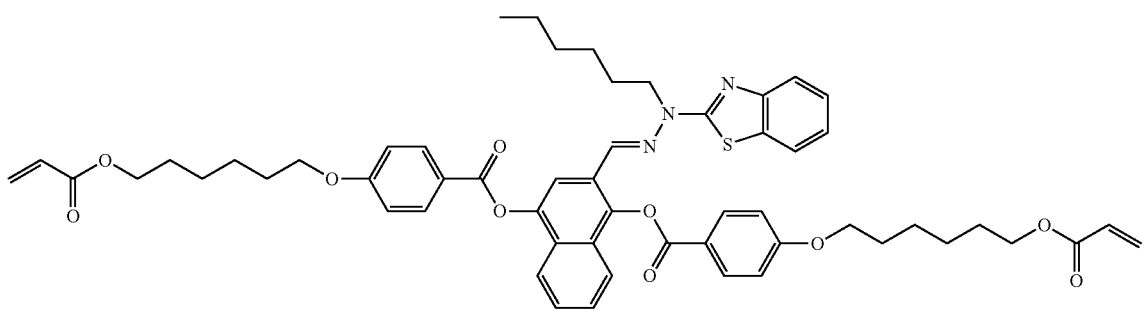

(III)-2

Separately from the composition (A-5), a composition was prepared by adding 20.0% by weight of a polymerizable monomer (III)-2 to cyclopentanone. The composition was applied onto a substrate having been subjected to an orientation treatment, and a solvent was dried once. After that, the temperature was changed in a range of room temperature to 200° C., and the presence or absence of liquid crystallinity was observed with a polarizing microscope. It showed non-liquid crystallinity.

(5-2. Production and Evaluation of Phase Difference Plate)

A phase difference plate was produced in the same manner as in Step (C1-2) of Comparative Example 1 except that the composition (A-5) obtained in Step (5-1) was used in place of the composition (A0) obtained in Step (C1-1). The film thickness of the optically anisotropic layer of the phase difference plate thus obtained was 1.3 μm.

Figure 12:
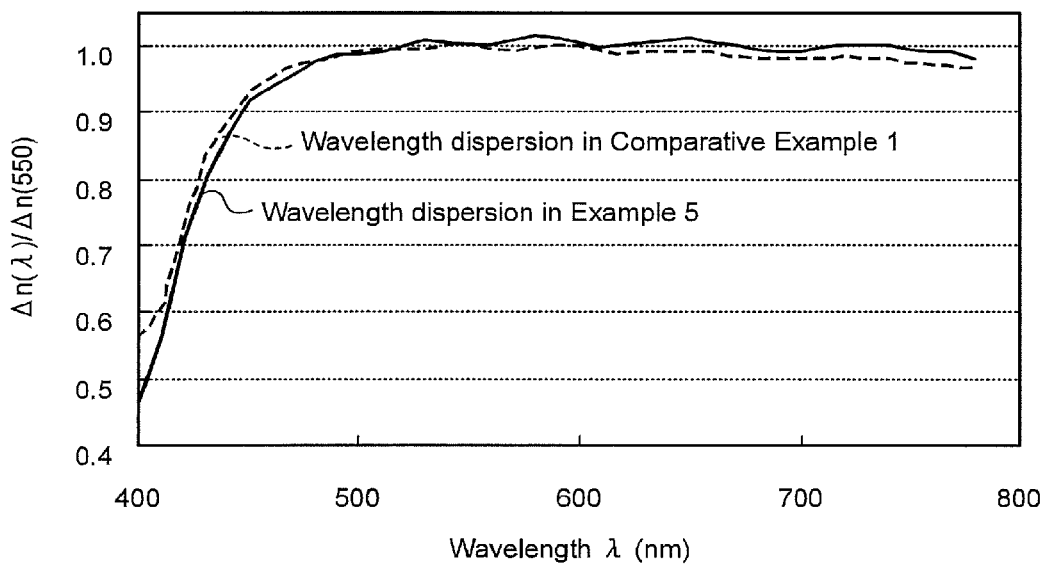
FIG. 12 is a graph showing wavelength dispersion property of birefringence Δn of a phase difference plate, which is measured in Example 5, in comparison with Comparative Example 1.

For the phase difference plate thus obtained, the birefringence Δn was measured at a variety of wavelengths λ in the same manner as in Step (C1-3) of Comparative Example 1, whereby the wavelength dispersion property of Δn was determined. The measured wavelength dispersion property is shown in FIG. 12 in comparison with the results of Comparative Example 1.

From the measurement results, Re (450 nm)/Re (550 nm)=0.916, and Re (650 nm)/Re (550 nm)=1.010, which showed that the reverse dispersibility became larger as compared with Comparative Example 1.

Figure 13:
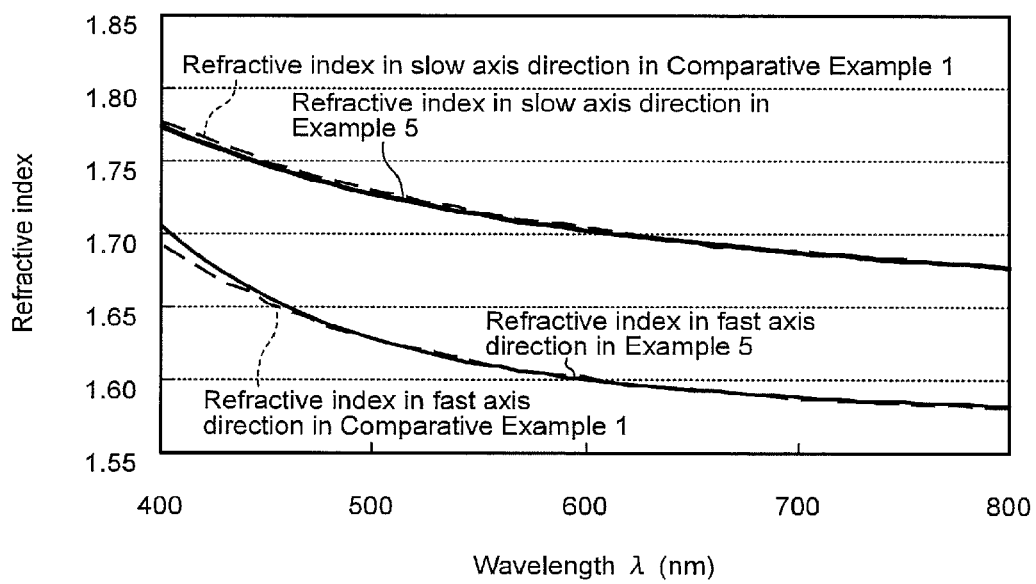
FIG. 13 is a graph showing wavelength dispersion property of refractive index of the phase difference plate, which is measured in Example 5, in comparison with Comparative Example 1.

For the phase difference plate thus obtained, the refractive index was measured in the same manner as in Step (C1-4) of Comparative Example 1. The measured values at three wavelengths were fit to a Cauchy model. The results are shown in FIG. 13 in comparison with the results of Comparative Example 1. The wavelength dispersion of refractive index in the slow axis direction was not largely different from that in Comparative Example 1, but the wavelength dispersion of refractive index in the fast axis direction became larger as compared with Comparative Example 1. Therefore, the reverse wavelength dispersion property of Δn of the phase difference plate became large.

(Preparative Example 2) Synthesis of Compound 25

[Chemical Formula 74]

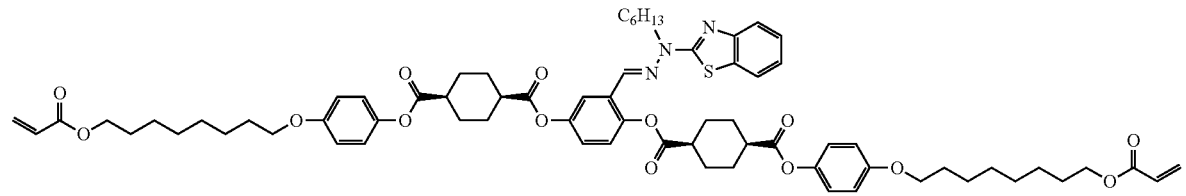

Compound 25

Step 1: Synthesis of Intermediate Product H1

[Chemical Formula 75]

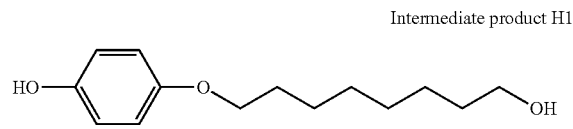

Intermediate product H1

7.28 g (66.1 mmol) of hydroquinone, 2.38 g (59.5 mmol) of sodium hydroxide, and 50 mL of distilled water were placed in a 3-necked reaction vessel equipped with a thermometer under nitrogen flow. To the solution, 9.90 g (60.1 mmol) of 8-chloro-1-n-octanol was added dropwise over 30 minutes. After completion of dropwise addition, the entire volume was refluxed for 5 hours. After completion of the reaction, the reaction solution was cooled to 25° C., to deposit a white solid, and the white solid was collected by filtration. The resulting solid was recrystallized using 120 mL of toluene to obtain 7.93 g of an intermediate product H1 as a white solid (yield: 56.1%).

The structure of the target compound was identified by $^1$H-NMR.

$^1$H-NMR (500 MHz, DMSO-d$_6$, TMS, δ ppm): 8.86 (s, 1H), 6.72 (dd, 2H, J=2.5 Hz, 8.0 Hz), 6.65 (dd, 2H, J=2.5 Hz, 8.0 Hz), 4.33 (t, 1H, J=5.0 Hz), 3.82 (t, 2H, J=6.5 Hz), 3.37 (dt, 2H, J=5.0 Hz, 6.5 Hz), 1.65 (tt, 2H, J=6.5 Hz, 6.5 Hz), 1.28-1.42 (m, 10H)

Step 2: Synthesis of Intermediate Product I1

[Chemical Formula 76]

Intermediate product I1

HO—⟨⟩—O~~~~~~O—C(=O)—CH=CH$_2$ 7.84 g (32.9 mmol) of the intermediate product H1 synthesized in Step 1, 2.61 g (36.2 mmol) of acrylic acid, 40.8 mg (0.329 mmol) of 4-methoxyphenol, 316 mg (3.29 mmol) of methanesulfonic acid, and 40 mL of toluene were placed in a 3-necked reaction vessel equipped with a thermometer under nitrogen flow, and the entire volume was refluxed for 6 hours. The reaction solution was cooled to 25° C., 200 mL of water was added, and the mixture was extracted with 100 mL of ethyl acetate. The ethyl acetate layer was dried over anhydrous sodium sulfate, and the sodium sulfate was removed by filtration. Ethyl acetate was distilled off under reduced pressure from the filtrate with a rotary evaporator to obtain a brown solid. The brown solid was purified by silica gel column chromatography (toluene:THF=95:5) to obtain 6.95 g of an intermediate product I1 as a white solid (yield: 71.9%).

The structure of the target compound was identified by $^1$H-NMR.

$^1$H-NMR (500 MHz, DMSO-d$_6$, TMS, δ ppm): 8.86 (s, 1H), 6.72 (dd, 2H, J=2.5 Hz, 9.0 Hz), 6.65 (dd, 2H, J=2.5 Hz, 8.0 Hz), 6.31 (dd, 1H, J=1.5 Hz, 17.5 Hz), 6.17 (dd, 1H, J=10.5 Hz, 17.5 Hz), 5.93 (dd, 1H, J=1.5 Hz, 10.5 Hz), 4.10 (t, 2H, J=6.5 Hz), 3.83 (t, 2H, J=6.5 Hz), 1.58-1.68 (m, 4H), 1.30-1.39 (m, 8H)

Step 3: Synthesis of Intermediate Product J1

[Chemical Formula 77]

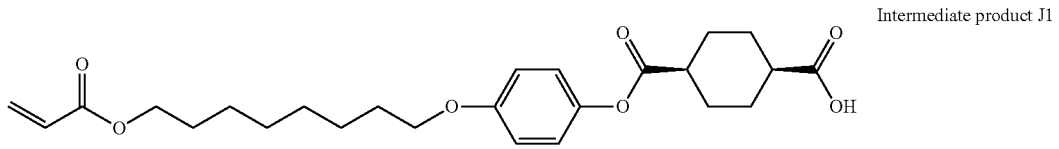

Intermediate product J1

6.86 g (39.8 mmol) of trans-1,4-cyclohexanedicarboxylic acid, 70 mL of THF, and 14 mL of DMF were placed in a 3-necked reaction vessel equipped with a thermometer under nitrogen flow. To the mixture, 2.28 g (19.9 mmol) of methanesulfonyl chloride was added, and the reaction vessel was placed in a water bath to adjust the inner temperature of the reaction solution to 20° C. Subsequently, 2.20 g (21.7 mmol) of triethylamine was added dropwise over 5 minutes while the inner temperature of the reaction solution was maintained at 20 to 30° C. After completion of dropwise addition, the entire volume was further stirred at 25° C. for 2 hours. To the obtained reaction mixture, 221 mg (1.81 mmol) of 4-(dimethylamino)pyridine and 5.30 g (18.1 mmol) of the intermediate product I1 synthesized in the aforementioned Step 2 were added, and the reaction vessel was placed in a water bath again to adjust the inner temperature of the reaction solution to 15° C. Further, 2.20 g (21.7 mmol) of triethylamine was added dropwise over 5 minutes while the inner temperature of the reaction solution was maintained at 20 to 30° C. After completion of dropwise addition, the entire volume was further stirred at 25° C. for 2 hours. After completion of the reaction, 300 mL of distilled water and 100 mL of saturated saline solution were added to the reaction solution, and the mixture was extracted with 100 mL of ethyl acetate twice. The organic layer was dried over anhydrous sodium sulfate, and the sodium sulfate was removed by filtration. The filtrate was concentrated with a rotary evaporator. The concentrate was then purified by silica gel column chromatography (toluene:THF=85:15) to obtain 5.23 g of an intermediate product J1 as a white solid (yield: 64.6%).

The structure of the target compound was identified by $^1$H-NMR.

$^1$H-NMR (500 MHz, DMSO-$d_6$, TMS, δ ppm): 12.1 (s, 1H), 6.98 (dd, 2H, J=2.5 Hz, 9.0 Hz), 6.92 (dd, 2H, J=2.5 Hz, 8.0 Hz), 6.31 (dd, 1H, J=1.5 Hz, 17.5 Hz), 6.17 (dd, 1H, J=10.5 Hz, 17.5 Hz), 5.92 (dd, 1H, J=1.5 Hz, 10.5 Hz), 4.10 (t, 2H, J=6.5 Hz), 3.93 (t, 2H, J=6.5 Hz), 2.19-2.25 (m, 1H), 2.04-2.10 (m, 2H), 1.94-1.98 (m, 2H), 1.69 (tt, 2H, J=6.5 Hz, 6.5 Hz), 1.57-1.64 (m, 2H), 1.31-1.52 (m, 13H)

Step 4: Synthesis of Intermediate Product K1

[Chemical Formula 78]

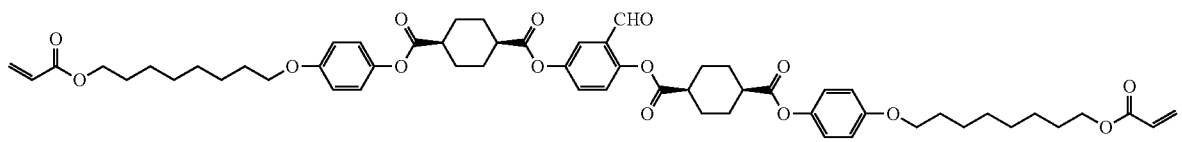

Intermediate product K1

4.00 g (8.96 mmol) of the intermediate product J1 synthesized in the aforementioned Step 3 was dissolved in 60 mL of THF in a 3-necked reaction vessel equipped with a thermometer under nitrogen flow. To the solution, 1.07 g (9.32 mmol) of methanesulfonyl chloride was added, and the reaction vessel was placed in a water bath to adjust the inner temperature of the reaction solution to 20° C. To the reaction solution, 944 mg (9.32 mmol) of triethylamine was added dropwise over 5 minutes while the inner temperature of the reaction solution was maintained at 20 to 30° C. The entire volume was stirred at 25° C. for 2 hours. To the reaction mixture, 92.0 mg (0.748 mmol) of 4-(dimethylamino)pyridine and 548 mg (3.97 mmol) of 2,5-dihydroxybenzaldehyde were added, and the reaction vessel was placed in a water bath again to adjust the inner temperature of the reaction solution to 15° C. 944 mg (9.32 mmol) of triethylamine was added dropwise over 5 minutes while the inner temperature of the reaction solution was maintained at 20 to 30° C. After completion of dropwise addition, the entire volume was further stirred at 25° C. for 2 hours. After completion of the reaction, 350 mL of distilled water and 50 mL of saturated saline solution were added to the reaction solution, and the mixture was extracted with 150 mL of chloroform twice. The organic layer was dried over anhydrous sodium sulfate, and the sodium sulfate was removed by filtration. The filtrate was concentrated with a rotary evaporator. The concentrate was dissolved in 15 mL of THF. To the solution, 200 mL of methanol was added to deposit a crystal, and the deposited crystal was collected by filtration. The resulting crystal was washed with methanol, and dried in vacuo to obtain 2.85 g of an intermediate product K1 as a white solid (yield: 72.3%).

The structure of the target compound was identified by $^1$H-NMR.

$^1$H-NMR (500 MHz, CDCl$_3$, TMS, δ ppm): 10.1 (s, 1H), 7.61 (d, 1H, J=2.5 Hz), 7.37 (dd, 1H, J=2.5 Hz, 8.5 Hz), 7.20 (d, 1H, J=8.5 Hz), 6.97 (dd, 4H, J=2.0 Hz, 9.0 Hz), 6.88 (dd, 4H, J=2.0 Hz, 9.0 Hz), 6.40 (dd, 2H, J=1.5 Hz, 17.5 Hz), 6.12 (dd, 2H, J=10.5 Hz, 17.5 Hz), 5.82 (dd, 2H, J=1.5 Hz, 10.5 Hz), 4.16 (t, 4H, J=6.5 Hz), 3.93 (t, 4H, J=6.5 Hz), 2.57-2.74 (m, 4H), 2.26-2.37 (m, 8H), 1.65-1.80 (m, 16H), 1.35-1.48 (m, 16H)

Step 5: Synthesis of Intermediate Product J

[Chemical Formula 79]

Intermediate product J

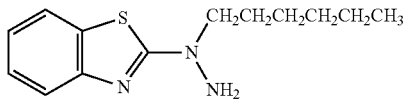

2.00 g (12.1 mmol) of 2-hydrazinobenzothiazole and 20 mL of DMF were placed in a 4-necked reaction vessel equipped with a thermometer under nitrogen flow, and a homogeneous solution was produced. To the solution, 8.36 g of (60.5 mmol) of potassium carbonate and 3.08 g (14.5 mmol) of 1-iodohexane were added, and the entire volume was stirred at 50° C. for 7 hours. After completion of the reaction, the reaction solution was cooled to 20° C., 200 mL of water was added to the reaction solution, and the mixture was extracted with 300 mL of ethyl acetate. The ethyl acetate layer was dried over anhydrous sodium sulfate, and the sodium sulfate was removed by filtration. Ethyl acetate was distilled off under reduced pressure from the filtrate with a rotary evaporator to obtain a yellow solid. The yellow solid was purified by silica gel column chromatography (hexane:ethyl acetate=75:25) to obtain 2.10 g of an intermediate product J as a white solid (yield: 69.6%).

The structure of the target compound was identified by $^1$H-NMR.

$^1$H-NMR (500 MHz, CDCl$_3$, TMS, δ ppm): 7.60 (dd, 1H, J=1.0 Hz, 8.0 Hz), 7.53 (dd, 1H, J=1.0 Hz, 8.0 Hz), 7.27 (ddd, 1H, J=1.0 Hz, 8.0 Hz, 8.0 Hz), 7.06 (ddd, 1H, J=1.0 Hz, 8.0 Hz, 8.0 Hz), 4.22 (s, 2H), 3.74 (t, 2H, J=7.5 Hz), 1.69-1.76 (m, 2H), 1.29-1.42 (m, 6H), 0.89 (t, 3H, J=7.0 Hz)

Step 6: Synthesis of Compound 25

1.95 g (1.96 mmol) of the intermediate product K1 synthesized in the aforementioned Step 4, 441 mg (1.76 mmol) of the intermediate product J synthesized in the aforementioned Step 5, 45.6 mg (0.196 mmol) of (+)-10-camphorsulfonic acid, 24 mL of THF, and 6 mL of ethanol were placed in a 3-necked reaction vessel equipped with a thermometer under nitrogen flow, and a homogeneous solution was produced. After that, the entire volume was stirred at 40° C. for 5 hours. After completion of the reaction, the reaction solution was added to 100 mL of water, and the mixture was extracted with 200 mL of chloroform. The chloroform layer was dried over anhydrous sodium sulfate, and the sodium sulfate was removed by filtration. Chloroform was distilled off under reduced pressure from the filtrate with a rotary evaporator to obtain a yellow solid. The yellow solid was purified by silica gel column chromatography (toluene:ethyl acetate=95:5) to obtain 1.56 g of a compound 25 as a pale yellow solid (yield: 64.9%).

The structure of the target compound was identified by $^1$H-NMR.

$^1$H-NMR (500 MHz, CDCl$_3$, TMS, δ ppm): 7.75 (d, 1H, J=1.5 Hz), 7.66-7.70 (m, 3H), 7.34 (dd, 1H, J=1.5 Hz, 7.8 Hz), 7.09-7.18 (m, 3H), 6.96-7.00 (m, 4H), 6.86-6.90 (m, 4H), 6.41 (dd, 2H, J=1.5 Hz, 17.5 Hz), 6.12 (dd, 2H, J=10.5 Hz, 17.5 Hz), 5.81 (dd, 2H, J=1.5 Hz, 10.5 Hz), 4.30 (t, 2H, J=7.5 Hz), 4.16 (t, 4H, J=6.5 Hz), 3.94 (t, 4H, J=6.5 Hz), 2.56-2.72 (m, 4H), 2.27-2.38 (m, 8H), 1.65-1.81 (m, 18H), 1.32-1.49 (m, 22H), 0.90 (t, 3H, J=7.5 Hz)

Comparative Example 2

(C2-1. Preparation of Composition (A0-1))

A mixture of a composition shown in the following Table 7 was stirred homogeneously, and filtered through a 0.6-μm filter, to obtain a composition (A0-1).

TABLE 7

| | |
|---|---|
| Polymerizable liquid crystal compound with reverse wavelength dispersion 25 (Prepared in Preparative Example 2) | 19.4 Parts |
| Photopolymerization initiator: Irgacure-379 (Produced by BASF Japan Ltd.) | 0.6 Parts |
| Surfactant: Ftergent 209F 1% solution (Neos Company Limited) | 5.8 Parts |
| Cyclopentanone | 74.2 Parts |

(C2-2. Production of Phase Difference Plate)

A multiple-layered product including a layer of the composition (A0-1) was obtained in the same manner as in (C1-2) of Comparative Example 1 except that the composition (A0-1) was used in place of the composition (A0). Further, a phase difference plate including a support and an optically anisotropic layer with a film thickness of 1.5 µm formed on the support was obtained.

(C2-3. Measurement of Wavelength Dispersion)

Figure 14:
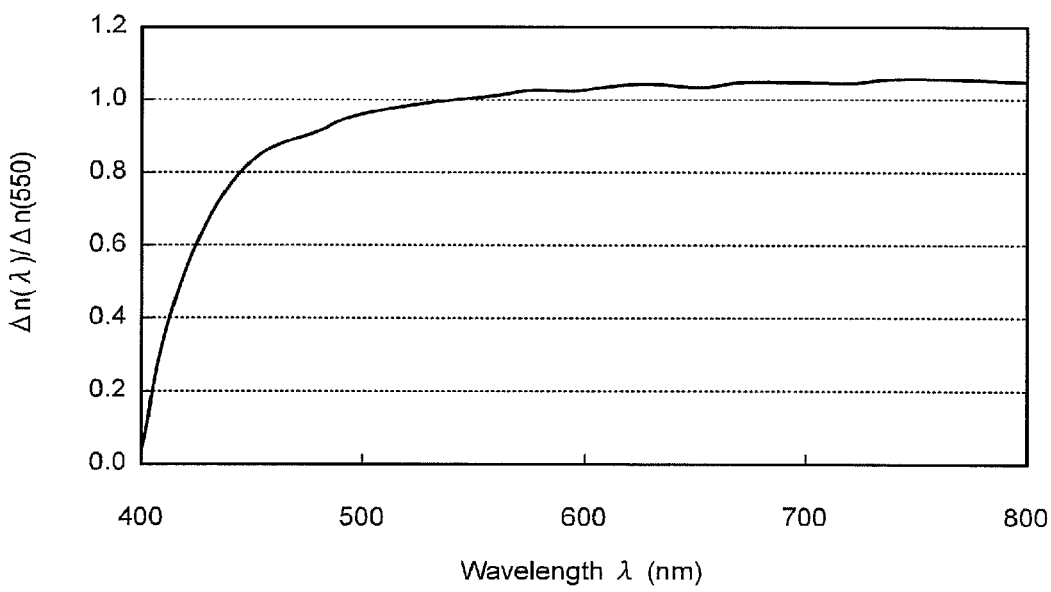
FIG. 14 is a graph showing wavelength dispersion property of birefringence Δn of a phase difference plate, which is measured in Comparative Example 2.

For the phase difference plate produced in Step (C2-2), the birefringence Δn was measured at a variety of wavelengths λ in the same manner as in Step (C1-3) of Comparative Example 1, and the wavelength dispersion property of Δn was determined. The measured wavelength dispersion property is shown in FIG. 14.

From the measurement results, Re0 (450 nm)/Re0 (550 nm)=0.824 and Re0 (650 nm)/Re0 (550 nm)=1.031.

(C2-4. Measurement of Refractive Index Wavelength Dispersion)

Figure 15:
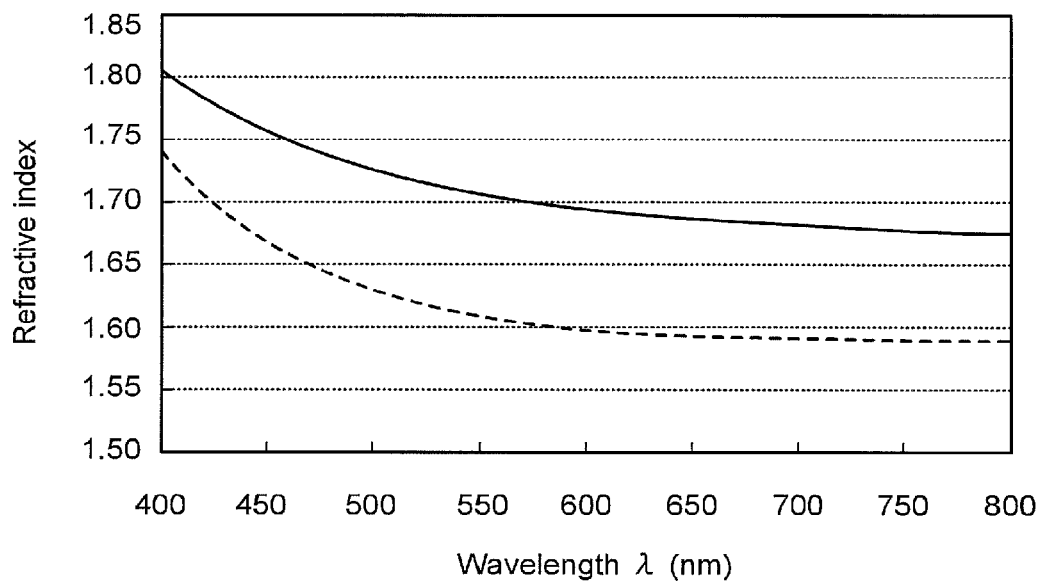
FIG. 15 is a graph showing wavelength dispersion property of refractive index of the phase difference plate, which is measured in Comparative Example 2.

For the phase difference plate produced in Step (C2-2), the refractive index was measured in the same manner as in Step (C1-4) of Comparative Example 1. The refractive index was measured at wavelengths λ of 407 nm, 532 nm, and 633 nm, and the measured values at the three wavelengths were fit to a Cauchy model. The results are shown in FIG. 15. In FIG. 15, a dashed line shows a refractive index in a fast axis direction, and a solid line shows a refractive index in a slow axis direction. The refractive index in the fast axis direction had lower values and larger wavelength dispersion as compared with the refractive index in the slow axis direction. This shows that the phase difference plate exhibits reverse wavelength dispersion property.

Example 6

(6-1. Preparation of Composition (A-6))

A mixture of a composition shown in the following Table 8 was stirred homogeneously, and filtered through a 0.6-µm filter, to obtain a composition (A-6).

TABLE 8

| | |
|---|---|
| Polymerizable liquid crystal compound with reverse wavelength dispersion 25 (Prepared in Preparative Example 2) | 17.8 Parts |
| Polymerizable monomer (IV) (Compound represented by the formula (IV) above) | 2.2 Parts |
| Photopolymerization initiator: Irgacure-379 (Produced by BASF Japan Ltd.) | 0.6 Parts |
| Surfactant: Ftergent 209F 1% solution (Neos Company Limited) | 5.8 Parts |
| Cyclopentanone | 73.6 Parts |

Separately from the composition (A-6), a composition was prepared by adding 20.0% by weight of a polymerizable monomer (IV) to cyclopentanone. The composition was applied onto a substrate having been subjected to an orientation treatment, and a solvent was dried once. After that, the temperature was changed in a range of room temperature to 200° C., and the presence or absence of liquid crystallinity was observed with a polarizing microscope. It showed non-liquid crystallinity.

(6-2. Production and Evaluation of Phase Difference Plate)

A phase difference plate was produced in the same manner as in Step (C2-2) of Comparative Example 2 except that the composition (A-6) obtained in Step (6-1) was used in place of the composition (A0-1) obtained in Step (C2-1). The film thickness of the optically anisotropic layer of the phase difference plate thus obtained was 1.3 µm.

Figure 16:
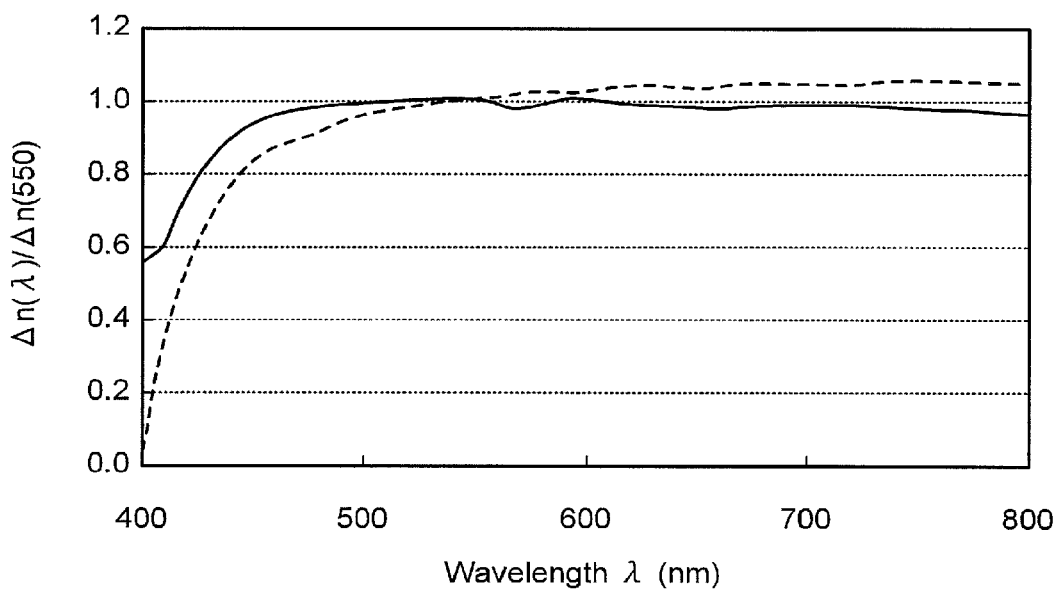
FIG. 16 is a graph showing wavelength dispersion property of birefringence Δn of a phase difference plate, which is measured in Example 6, in comparison with Comparative Example 2.

For the phase difference plate thus obtained, the birefringence Δn was measured at a variety of wavelengths λ in the same manner as in Step (C2-3) of Comparative Example 2, whereby the wavelength dispersion property of Δn was determined. The measured wavelength dispersion property is shown in FIG. 16 in comparison with the results of Comparative Example 2. In FIG. 16, the results of Example 6 are shown by a solid line while the results of Comparative Example 2 are shown by a dashed line.

From the measurement results, Re (450 nm)/Re (550 nm)=0.918, and Re (650 nm)/Re (550 nm)=0.982, which showed that the reverse dispersibility became smaller as compared with Comparative Example 2.

Figure 17:
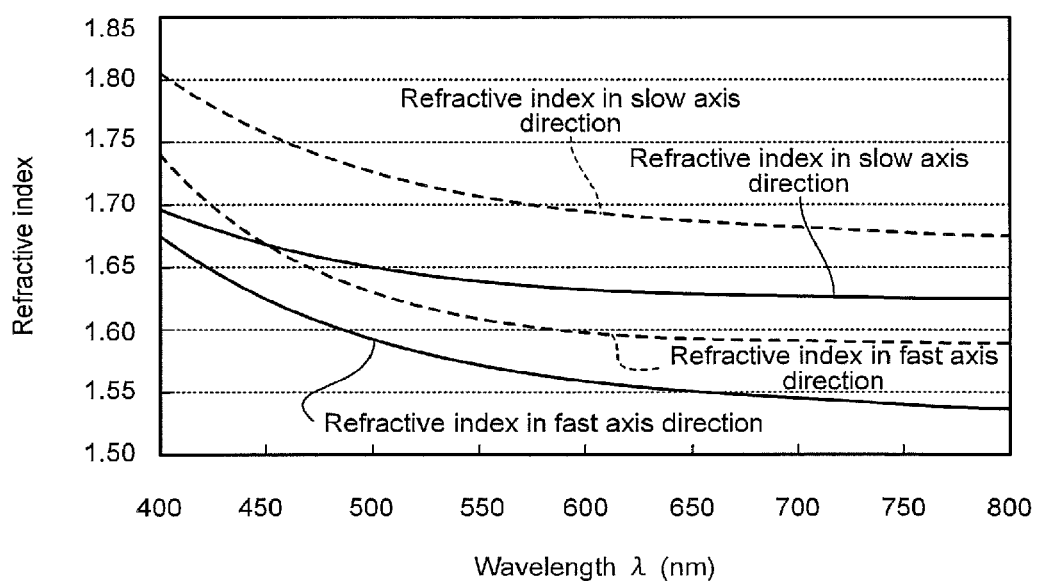
FIG. 17 is a graph showing wavelength dispersion property of refractive index of the phase difference plate, which is measured in Example 6, in comparison with Comparative Example 2.

For the phase difference plate thus obtained, the refractive index was measured in the same manner as in Step (C2-4) of Comparative Example 2. The measured values at three wavelengths were fit to a Cauchy model. The results are shown in FIG. 17 in comparison with the results of Comparative Example 2. In FIG. 17, the results of Example 6 are shown by a solid line while the results of Comparative Example 2 are shown by a dashed line. The wavelength dispersion of refractive index in the slow axis direction became smaller than that in Comparative Example 2, and the wavelength dispersion of refractive index in the fast axis direction became smaller as compared with Comparative Example 2. Therefore, the reverse wavelength dispersion property of Δn of the phase difference plate became large.

The invention claimed is:

1. A phase difference plate comprising an optically anisotropic layer obtained by curing a composition (A) containing a polymerizable liquid crystal compound with reverse wavelength dispersion and a polymerizable monomer, wherein:

the polymerizable liquid crystal compound with reverse wavelength dispersion has a main chain mesogen and a side chain mesogen bonded to the main chain mesogen in the molecule thereof;

the main chain mesogen and the side chain mesogen of the polymerizable liquid crystal compound with reverse wavelength dispersion are oriented in different directions in the optically anisotropic layer, whereby a birefringence Δn of the optically anisotropic layer has reverse wavelength dispersion property; and retardations Re0 (450 nm), Re0 (550 nm), and Re0 (650 nm) at wavelengths of 450 nm, 550 nm, and 650 nm of a layer obtained by curing a composition (A0) in which the polymerizable monomer in the composition (A) is replaced by the polymerizable liquid crystal compound with reverse wavelength dispersion and retardations Re (450 nm), Re (550 nm), and Re (650 nm) at wavelengths of 450 nm, 550 nm, and 650 nm of the optically anisotropic layer satisfy relationship of the following expressions (i) and (ii):

Re0(450 nm)/Re0(550 nm)>Re(450 nm)/Re(550 nm)  Expression (i)

Re0(650 nm)/Re0(550 nm)<Re(650 nm)/Re(550 nm)  Expression (ii).

2. The phase difference plate according to claim 1, wherein the polymerizable liquid crystal compound with reverse wavelength dispersion is a compound represented by the following formula (I):

[Chemical Formula I]

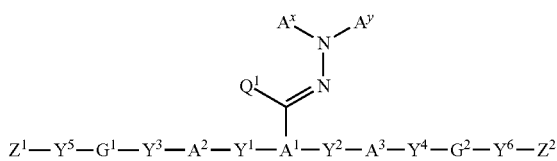

(I)

in the formula, $Y^1$ to $Y^6$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group having 1 to 6 carbon atoms;

$G^1$ and $G^2$ are each independently a divalent aliphatic group having 1 to 20 carbon atoms and optionally having a substituent, the aliphatic group optionally comprises one or more of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted thereinto per one aliphatic group, provided that a case where two or more —O— groups or —S— groups are adjacently inserted is excluded, wherein R$^2$ is a hydrogen atom or an alkyl group having 1 to 6 carbon atoms;

$Z^1$ and $Z^2$ are each independently an alkenyl group having 2 to 10 carbon atoms that may be substituted by a halogen atom;

$A^x$ is an organic group of 2 to 30 carbon atoms having at least one aromatic ring selected from the group consisting of an aromatic hydrocarbon ring and an aromatic heterocyclic ring; $A^y$ is a hydrogen atom, an alkyl group having 1 to 12 carbon atoms and optionally having a substituent, an alkenyl group having 2 to 12 carbon atoms and optionally having a substituent, a cycloalkyl group having 3 to 12 carbon atoms and optionally having a substituent, —C(=O)—R$^3$, —SO$_2$—R$^6$, or an organic group of 2 to 30 carbon atoms having at least one aromatic ring selected from the group consisting of an aromatic hydrocarbon ring and an aromatic heterocyclic ring, wherein the aromatic ring of A$^x$ and A$^y$ may have a substituent, and A$^x$ and A$^y$ may together form a ring, and wherein R$^3$ is an alkyl group having 1 to 12 carbon atoms and optionally having a substituent, an alkenyl group having 2 to 12 carbon atoms and optionally having a substituent, and a cycloalkyl group having 3 to 12 carbon atoms and optionally having a substituent, and R$^6$ is an alkyl group having 1 to 12 carbon atoms, an alkenyl group having 2 to 12 carbon atoms, a phenyl group, or a 4-methylphenyl group;

$A^1$ is a trivalent aromatic group optionally having a substituent;

$A^2$ and $A^3$ are each independently a divalent aromatic group having 6 to 30 carbon atoms and optionally having a substituent; and $Q^1$ is a hydrogen atom or an alkyl group having 1 to 6 carbon atoms and optionally having a substituent].

3. The phase difference plate according to claim 1, wherein the polymerizable liquid crystal compound with reverse wavelength dispersion is a compound represented by the following formula (V):

[Chemical Formula V]

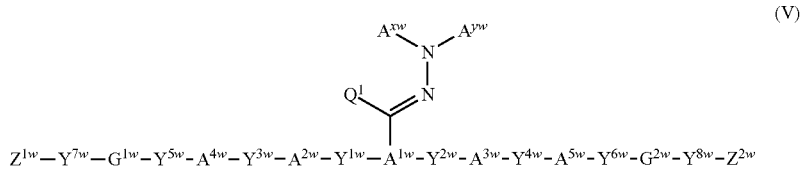

(V)

in the formula $Y^{1w}$ to $Y^{8w}$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group having 1 to 6 carbon atoms;

$G^{1w}$ and $G^{2w}$ are each independently a divalent linear aliphatic group having 1 to 20 carbon atoms and optionally having a substituent, wherein the linear aliphatic group optionally comprises one or more of —O—, —S—, —O—C(=O)—, —C(=O)—O—, —O—C(=O)—O—, —NR$^{2w}$—C(=O)—, —C(=O)—NR$^{2w}$—, —NR$^{2w}$—, or —C(=O)— inserted thereinto per one aliphatic group, provided that a case where two or more —O— groups or —S— groups are adjacently inserted is excluded, and wherein R$^{2w}$ is a hydrogen atom or an alkyl group having 1 to 6 carbon atoms;

$Z^{1w}$ and $Z^{2w}$ are each independently an alkenyl group having 2 to 10 carbon atoms that may be substituted by a halogen atom;

$A^{xw}$ is an organic group of 2 to 30 carbon atoms having at least one aromatic ring selected from the group consisting of an aromatic hydrocarbon ring and an aromatic heterocyclic ring;

$A^{yw}$ is a hydrogen atom, an alkyl group having 1 to 20 carbon atoms and optionally having a substituent, an alkenyl group having 2 to 20 carbon atoms and optionally having a substituent, an alkynyl group having 2 to 20 carbon atoms and optionally having a substituent, a cycloalkyl group having 3 to 12 carbon atoms and optionally having a substituent, —C(=O)—R$^{3w}$, —SO$_2$—R$^{4w}$, —C(=S)NH—R$^{9w}$, or an organic group of 2 to 30 carbon atoms having at least one aromatic ring selected from the group consisting of an aromatic hydrocarbon ring and an aromatic heterocyclic ring, wherein R$^{3w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic hydrocarbon group having 5 to 12 carbon atoms, $R^{4w}$ is an alkyl group having 1 to 20 carbon atoms, an alkenyl group having 2 to 20 carbon atoms, a phenyl group, or a 4-methylphenyl group, and $R^{9w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic group having 5 to 20 carbon atoms and optionally having a substituent, wherein the aromatic ring of $A^{xw}$ and $A^{yw}$ may have a substituent, and $A^{xw}$ and $A^{yw}$ may together form a ring;

$A^{1w}$ is a trivalent aromatic group optionally having a substituent;

$A^{2w}$ and $A^{3w}$ are each independently a divalent alicyclic hydrocarbon group having 3 to 30 carbon atoms and optionally having a substituent;

$A^{4w}$ and $A^{5w}$ are each independently a divalent aromatic group having 6 to 30 carbon atoms and optionally having a substituent; and $Q^{1w}$ is a hydrogen atom or an alkyl group having 1 to 6 carbon atoms and optionally having a substituent.

4. The phase difference plate according to claim 2, wherein the polymerizable monomer is a non-liquid crystal compound represented by the following formula (III):

[Chemical Formula III]

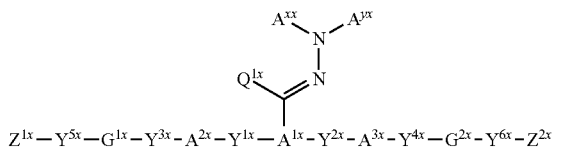

(III)

$Z^{1x} - Y^{5x} - G^{1x} - Y^{3x} - A^{2x} - Y^{1x} - A^{1x} - Y^{2x} - A^{3x} - Y^{4x} - G^{2x} - Y^{6x} - Z^{2x}$ in the formula (III), $Y^{1x}$ to $Y^{6x}$, $G^{1x}$, $G^{2x}$, $Z^{1x}$, $Z^{2x}$, $A^{xx}$, $A^{yx}$, $A^{1x}$ to $A^{3x}$, and $Q^{1x}$ have the same meanings as $Y^1$ to $Y^6$, $G^1$, $G^2$, $Z^1$, $Z^2$, $A^x$, $A^y$, $A^1$ to $A^3$, and $Q^1$, respectively, in the formula (I), and at least one of them is different from the corresponding group in the co-used compound (I).

5. The phase difference plate according to claim 1, wherein the polymerizable monomer has a mesogen, and the mesogen of the polymerizable monomer is oriented in parallel to a main chain mesogen of the polymerizable liquid crystal compound with reverse wavelength dispersion in the optically anisotropic layer.

6. The phase difference plate according to claim 1, wherein the polymerizable monomer has a mesogen, and the mesogen of the polymerizable monomer is oriented in parallel to a side chain mesogen of the polymerizable liquid crystal compound with reverse wavelength dispersion in the optically anisotropic layer.

7. The phase difference plate according to claim 1, wherein a ratio of the polymerizable monomer in the composition (A) is 1 to 100 parts by weight relative to 100 parts by weight of the polymerizable liquid crystal compound with reverse wavelength dispersion.

8. A circularly polarizing plate comprising the phase difference plate according to claim 1 and a linear polarizer.

9. The circularly polarizing plate according to claim 8, wherein a phase difference of the phase difference plate at a wavelength of 550 nm is 100 to 150 nm, and an angle between a slow axis of the phase difference plate and a transmission axis of the linear polarizer is 45°.

10. An image display device comprising the phase difference plate according to claim 1.

* * * * *